United States Patent
Kawamoto et al.

(10) Patent No.: US 10,717,189 B2
(45) Date of Patent: Jul. 21, 2020

(54) DISPLAY CONTROL DEVICE, DISPLAY CONTROL METHOD, COMPUTER PROGRAM PRODUCT, AND COMMUNICATION SYSTEM

(71) Applicant: Sony Corporation, Tokyo (JP)

(72) Inventors: Kenta Kawamoto, Tokyo (JP); Yoshiaki Iwai, Tokyo (JP); Satoru Shimizu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/211,241

(22) Filed: Dec. 6, 2018

(65) Prior Publication Data
US 2019/0105771 A1  Apr. 11, 2019

Related U.S. Application Data

(63) Continuation of application No. 15/722,102, filed on Oct. 2, 2017, now Pat. No. 10,500,720, which is a (Continued)

(30) Foreign Application Priority Data

Aug. 2, 2011  (JP) .................................. 2011-168922

(51) Int. Cl.
*G06F 19/00* (2018.01)
*B25J 9/16* (2006.01)
(Continued)

(52) U.S. Cl.
CPC .................. *B25J 9/16* (2013.01); *B25J 5/007* (2013.01); *B25J 9/0003* (2013.01); *B25J 9/1661* (2013.01);
(Continued)

(58) Field of Classification Search
CPC ... B25J 9/16; B25J 5/007; B25J 9/0003; B25J 9/1661; B25J 9/1664; B25J 9/1697;
(Continued)

(56) References Cited

U.S. PATENT DOCUMENTS 7,554,262 B2  6/2009  Lee
7,554,282 B2  6/2009  Nakamoto
(Continued)

FOREIGN PATENT DOCUMENTS

EP  2263837 A1  12/2010
JP  06-68171 A   3/1994
(Continued)

OTHER PUBLICATIONS

International Search Report and Written Opinion for International Application No. PCT/JP2012/004744, dated Nov. 6, 2012.
(Continued)

*Primary Examiner* — Ronnie M Mancho
(74) *Attorney, Agent, or Firm* — Xsensus LLP

(57) ABSTRACT

A control system, method and computer program product cooperate to assist control for an autonomous robot. An interface receives recognition information from an autonomous robot, said recognition information including candidate target objects to interact with the autonomous robot. A display control unit causes a display image to be displayed on as display of candidate target objects, wherein at least two of the candidate target objects are displayed with an associated indication of a target object score.

30 Claims, 49 Drawing Sheets

Related U.S. Application Data continuation of application No. 14/954,066, filed on Nov. 30, 2015, now Pat. No. 9,815,199, which is a continuation of application No. 14/701,152, filed on Apr. 30, 2015, now Pat. No. 9,802,311, which is a continuation of application No. 14/233,536, filed as application No. PCT/JP2012/004744 on Jul. 25, 2012, now Pat. No. 9,067,315.

(51) Int. Cl.
- *B25J 13/08* (2006.01)
- *B25J 5/00* (2006.01)
- *B25J 9/00* (2006.01)
- *B25J 13/06* (2006.01)

(52) U.S. Cl.
CPC .......... *B25J 9/1664* (2013.01); *B25J 9/1697* (2013.01); *B25J 13/06* (2013.01); *B25J 13/08* (2013.01); *B25J 13/084* (2013.01); *G05B 2219/40099* (2013.01); *G05B 2219/40123* (2013.01); *G05B 2219/40409* (2013.01); *G05B 2219/40411* (2013.01); *Y10S 901/01* (2013.01)

(58) Field of Classification Search
CPC .......... B25J 13/06; B25J 13/08; B25J 13/084; G05B 2219/40099; G05B 2219/40123; G05B 2219/40409; G05B 2219/40411; Y10S 901/01
USPC .......................................................... 700/257
See application file for complete search history.

(56) References Cited

U.S. PATENT DOCUMENTS

| | | | |
|---|---|---|---|
| 8,108,092 B2* | 1/2012 | Phillips | G05D 1/0033 701/23 |
| 8,577,126 B2 | 11/2013 | Jones et al. | |
| 8,781,629 B2 | 7/2014 | Ota | |
| 8,918,213 B2* | 12/2014 | Rosenstein | B25J 5/007 700/245 |
| 2005/0057689 A1 | 3/2005 | Sakagami | |
| 2006/0111811 A1* | 5/2006 | Okamoto | B25J 5/007 700/214 |
| 2006/0111812 A1* | 5/2006 | Okamoto | B25J 5/007 700/214 |
| 2006/0112034 A1 | 5/2006 | Okamoto et al. | |
| 2006/0223637 A1* | 10/2006 | Rosenberg | A63F 13/10 463/47 |
| 2008/0079383 A1 | 4/2008 | Nakamoto | |
| 2009/0087029 A1 | 4/2009 | Coleman et al. | |
| 2009/0232506 A1 | 9/2009 | Hudson et al. | |
| 2010/0017046 A1 | 1/2010 | Cheung et al. | |
| 2010/0172733 A1 | 7/2010 | Chalubert et al. | |
| 2011/0010009 A1 | 1/2011 | Saito | |
| 2011/0035054 A1* | 2/2011 | Gal | G05D 1/0038 700/258 |
| 2011/0054689 A1 | 3/2011 | Nielsen et al. | |
| 2011/0060707 A1 | 3/2011 | Suzuki | |
| 2011/0060708 A1 | 3/2011 | Suzuki | |
| 2011/0109549 A1 | 5/2011 | Robbins et al. | |
| 2011/0172822 A1 | 7/2011 | Ziegler et al. | |
| 2012/0095619 A1* | 4/2012 | Pack | G05D 1/0038 701/2 |
| 2012/0274775 A1 | 11/2012 | Reiffel | |

FOREIGN PATENT DOCUMENTS

| | | |
|---|---|---|
| JP | 06-96193 A | 4/1994 |
| JP | 2004-268148 A | 9/2004 |
| JP | 2005-4727 A | 1/2005 |
| JP | 2007-111854 A | 5/2007 |
| JP | 2008-068348 A | 3/2008 |
| JP | 2008-304268 A | 12/2008 |
| JP | 2009-214212 A | 9/2009 |
| JP | 2011-22700 A | 2/2011 |
| JP | 2011-105156 A | 6/2011 |
| JP | 2011-108156 A | 6/2011 |
| WO | 2005/015466 A1 | 2/2005 |
| WO | 2010/131371 A1 | 11/2010 |

OTHER PUBLICATIONS

International Preliminary Report on Patentability for International Application No. PCT/JP2012/004744, dated Feb. 4, 2014.

Office Action dated Mar. 30, 2015, in Chinese Patent Application 201280036941.X.

Office Action dated Jun. 30, 2015 in the corresponding Japanese Patent Application No. 2011-168922 (with English Translation).

Office Action dated Jan. 31, 2017, in Japanese Patent Application No. 2016-037022 (with English Translation).

Asako Kanezaki, et al., Fast Object Detection for Robots in a Cluttered Indoor Environment Using Integral 3D Feature Table; Proc. of 2011 IEEE International Conference on Robotics and Automation (ICRA), May 9, 2011, pp. 4026-4033.

Muhammad Attamimi, et al., Learning Novel Objects Using Out-of-Vocabulary Word Segmentation and Object Extraction for ome Assistant Robots; Proc. of 2010 IEEE International Conference on Robotics and Automation (ICRA), May 3, 2010, pp. 745-750.

* cited by examiner

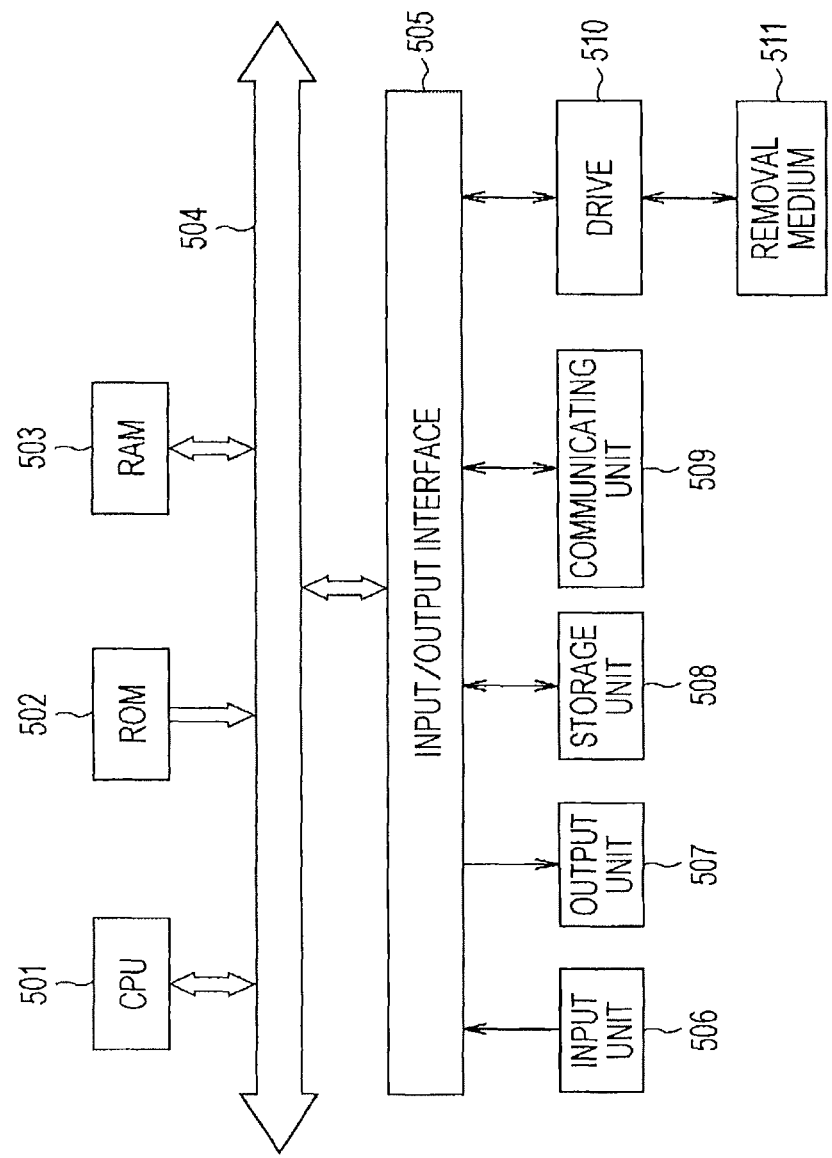

DISPLAY CONTROL DEVICE, DISPLAY CONTROL METHOD, COMPUTER PROGRAM PRODUCT, AND COMMUNICATION SYSTEM

CROSS-REFERENCE TO RELATED APPLICATION

This application is a continuation of and claims benefit of priority under 35 U.S.C. § 120 from U.S. application Ser. No. 15/722,102, filed Oct. 2, 2017, which is a continuation of and claims benefit of priority under 35 U.S.C. § 120 from U.S. application Ser. No. 14/954,066, filed Nov. 30, 2015, now U.S. Pat. No. 9,815,199, issued Nov. 14, 2017, which is a continuation of and claims benefit of priority under 35 U.S.C. § 120 from U.S. application Ser. No. 14/701,152, filed Apr. 30, 2015, now U.S. Pat. No. 9,802,311, issued Oct. 31, 2017, which is a continuation of and claims benefit of priority under 35 U.S.C. § 120 from U.S. application Ser. No. 14/233,536, filed Jan. 17, 2014, now U.S. Pat. No. 9,067,315, issued Jun. 30, 2015, which is a U.S. National Stage Entry under § 371 of International Application No. PCT/JP2012/004744, filed Jul. 25, 2012, which is based upon and claims benefit of priority under 35 U.S.C. § 119 from prior file Japanese Patent Application No. 2011-168922, filed Aug. 2, 2011, the entire contents of which being incorporated herein by reference.

TECHNICAL FIELD

The present disclosure relates to a display control device, a display control method, a comparer program product, and a communication system, for example, a display control device, a display control method, a program, and a communication system that display information for easily predicting a behavior of an autonomous robot.

BACKGROUND ART

For example, generally, an autonomous robot autonomously acts (operate) in accordance with surroundings or general instruction from a user.

For example, if a user orders to bring a PET bottled tea without specifying a brand name, the autonomous robot autonomously performs an action that searches and brings a PET bottled tea in accordance with the instruction.

That is, for example, when the autonomous robot finds a plurality of PET bottled teas, the autonomous robot selects a user-preferred PET bottled tea at its own judgment and brings the tea to the user.

Further, there is a technology with which in accordance with designation of goods mid the destination of the goods, the user allows the robot to move the goods to the destination (see, for example, Patent Document 1).

CITATION LIST

Patent Document

Patent: Document Japanese Patent Application Laid-Open No. 2004-268148

SUMMARY

As recognized by the present inventor, even though the autonomous robot acts in accordance with the instruction from the user, the robot may act against the intention of the user due to the surroundings or misinterpretation of die instruction of the user.

Therefore, the user preferably predicts the behavior of the autonomous robot to some extent.

The present disclosure has been made to consider the above problems and may easily predict the behavior of the autonomous robot.

Solutions to Problems

According to an exemplary control system for an autonomous robot comprising:

an interface that receives recognition information from the autonomous robot, said recognition information including candidate target objects to interact with the autonomous robot; and a display control unit that causes a display image to be displayed on a display of candidate target objects, wherein the candidate target objects is displayed with an associated indication of a target object score. According to one aspect of the system, the display image includes an overhead space diagram of a room that includes a location of the autonomous robot and respective locations of the candidate target objects.

According to another aspect, of the system, the system further includes the autonomous robot, wherein the autonomous robot includes in the recognition information the candidate target objects based on distance to the respective candidate target objects.

According to another aspect of the system, the system further includes the autonomous robot, wherein the autonomous robot includes in the recognition information a score for respective of the candidate target objects.

According to another aspect of the system, the autonomous robot includes in the recognition information object images of the candidate target images arranged in order of score.

According to another aspect, of the system, the system further includes the autonomous robot, wherein the autonomous robot includes in the recognition information space information regarding a space diagram of the room, and object images of the candidate target objects.

According to another aspect of the system, the system further includes a control unit that receives user input and generates a command to the autonomous robot that provides user feedback to the autonomous robot regarding user selection of one or more of the candidate target objects.

According to another aspect of the system, the system further includes the autonomous robot wherein, the autonomous robot is configured to identify non-target objects.

According to another aspect of the system, the system further includes the autonomous robot, wherein the autonomous robot is configured to identify a default selection of one or more of the candidate target objects.

According to another aspect of the system, the system further includes at least one of a tablet computer and a smartphone that includes the interface and display control unit According to another aspect of the system, the system further includes a scoring mechanism that identifies respective scores for the candidate target objects.

According to another aspect of the system, the interface is configured to receive as input a category of a target object, and transmit an indication of the category of target object to the autonomous robot and the autonomous robot configured to identify within the scene one or more target objects in the category.

According to another aspect of the system, the system further includes the autonomous robot, wherein the autonomous robot assigns degree information for candidate target objects, the degree information being an indication of a likelihood of correct detection of respective target objects in the category.

According to another aspect of the system, the interface is configured to receive voice or gesture input commands.

According to another aspect of the system, the system further includes a display that displays candidate target objects identified by the autonomous robot and user feedback sent via the communications interface to assist in controlling the autonomous robot.

According to a control method embodiment of the method includes receiving through an interface recognition information from the autonomous robot the recognition information including candidate target objects to interact with the autonomous robot; and displaying a display image on a display of candidate target objects, wherein at least two of the candidate target objects are displayed with an associated indication of a target object score.

According to one aspect of the control method, the displaying includes displaying an overhead space diagram of a room that includes a location of the autonomous robot and respective locations of the candidate target objects.

According to another aspect of the method, the method further includes receiving user input and generating a command to the autonomous robot that provides user feedback to the autonomous robot regarding user selection of one or more of the candidate target objects.

According to another aspect of the method, the method further includes receiving voice or gesture input commands.

According to a non-transitory computer readable storage medium embodiment, the storage medium includes instructions stored therein that when executed by a processing circuit execute a control method for an autonomous robot, the method including receiving through an interface recognition information from the autonomous robot, the recognition information including candidate target objects to interact with the autonomous robot; and displaying a display image on a display of candidate target objects, wherein at least two of the candidate target objects are displayed with an associated indication of a target object score.

Effects of the Disclosure

According to the present disclosure, it is possible to easily predict the behavior of the autonomous robot.

BRIEF DESCRIPTION OF DRAWINGS

FIG. 49 is a block diagram illustrating a configuration example of a computer.

DETAILED DESCRIPTION

Hereinafter, embodiments of the present disclosure (hereinafter, referred to as the present embodiment) will be described in the following order.

1. First embodiment (an example where information for predicting behavior of a robot is displayed on a display screen of an instructing device)

2. Modified example of the first embodiment

3. Second embodiment (an example where a feedback from a user is given to the robot using an instructing device)

4. Modified example of the second embodiment

5. Third embodiment (an example where a searching range of the robot is specified using an instructing device)

1. First Embodiment

[Configuration Example of Robot Control System]

Figure 1:
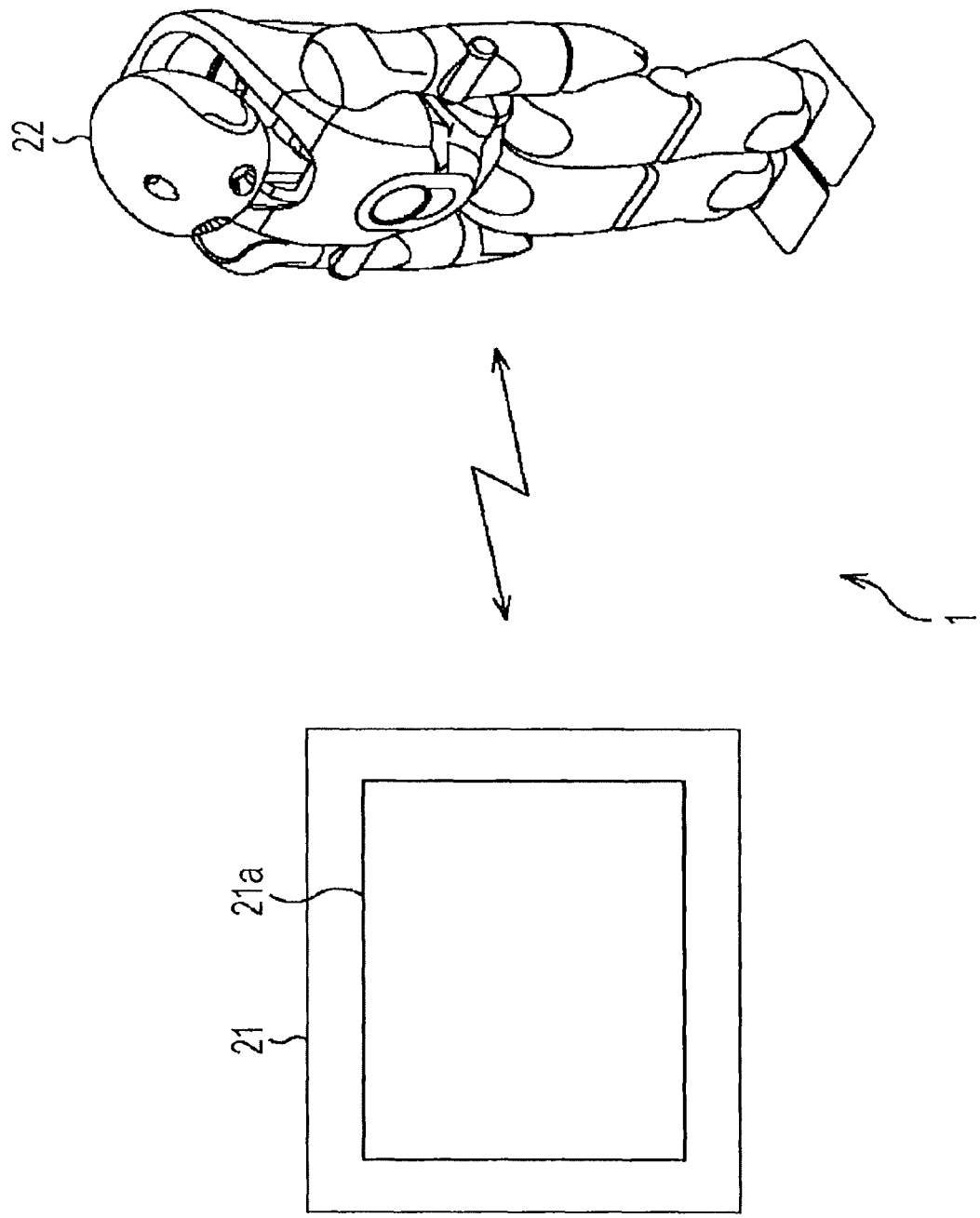
FIG. 1 is a view illustrating a configuration example of a robot control system according to the present disclosure.

FIG. 1 illustrates a configuration example of a robot control system 1 according to a first embodiment.

The robot control system 1 includes an instructing device 21 having a display screen 21a, and an autonomous robot 22. The instructing device may be a remote controller with a display screen integrated into the remote controller (e.g., a smartphone, tablet computer, or laptop computer) or a remote controller that operates wirelessly with a remote display device. For example, the instructing device, may use a television as the display device, and the instructing device serves as the tactile interface for inputting instructions.

The instructing device 21 generates instruction information for earning the robot 22 to do desired behavior (for example, behavior of bringing a predetermined object to a user) in response to manipulation of the user and transmits the information to the robot 22 through wireless communication or the like. Moreover, the robot 22 may interact with the predetermined object, where interact is not just taking images of the object, but also contact move, collect, perform electronic exchange of information with, optical character recognition of, illuminate, purchase, label, or operate (such as turn on/off) the object.

Figure 2:
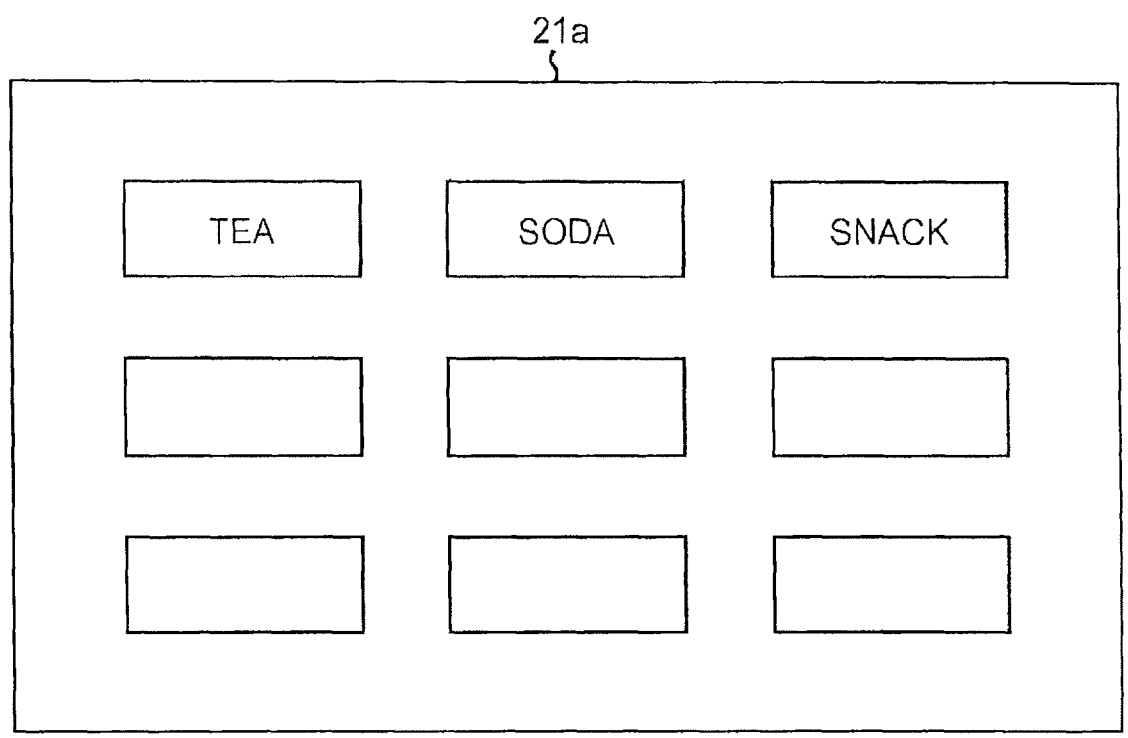
FIG. 2 is a view illustrating an example of a display screen on which a plurality of items is displayed.

For example, the instructing device 21, as shown in FIG. 2, displays a plurality of items such as "tea", "soda", "snack", . . . which may be selected by a user on the display screen 21a.

With reference to the display screen 21a as shown in FIG. 2, among the plurality of items, the user selects (specifies) an stem of object to be brought by the robot 22. Further, for example, a category of the objects to be brought by the robot 22 is displayed on the display screen 21a as the items.

In response to this, the instructing device 21 creates instruction information for bringing, as the target, the object belonging to the category (for example, "tea") as the item selected by the user to the user and transmits the information to the robot 22 by the wireless communication or the like. Further, the instruction information includes category information that represents categories as the items selected by the user.

The robot 22 autonomously performs an operation of searching, as the target the object belonging to the category as the item selected by the user based on the instruction information from the instructing device 21. The instructing device may be a remote controller with a display screen integrated into she remote controller (e.g., a smartphone, tablet computer, or laptop computer) or a remote controller that operates wirelessly with a remote display device. For example, the instructing device, may use a television as the display device, and the instructing device serves as the tactile interface for inputting instructions, Further, a method for instructing the robot 22 is not limited to the above-mentioned method that uses the instructing device 21. For example, if the robot 22 may recognize a voice of the user by the voice recognition, the user may indicate the target using a voice. The instructing device may be a remote controller with a display screen integrated into the remote controller (e.g., a smartphone, tablet computer, or laptop computer) or a remote controller that operates wirelessly with a remote display device. For example, the instructing device, may use a television as the display device, and the instructing device serves as the tactile interface for inputting instructions.

In this case, the robot 22 recognizes the instruction from the user as a voice, and autonomously performs an operation of searching the target indicated by the user based on the recognition result. Further, for example, if the robot 22 may recognize a gesture or posture of the user, the user may indicate the target by the gesture or posture.

The robot 22 is a two-legged robot that autonomously performs various actions based on the surroundings or general instruction from the user (for example, general instruction to bring "tea").

The robot 22 includes, as sensors that sense stimulus from the outside, a microphone corresponding to "ears" that sense sounds, and a camera corresponding to "eyes" that sense light, which are provided in predetermined positions. The details of the robot 22 will be described below with reference to FIG. 19.

Figure 3:
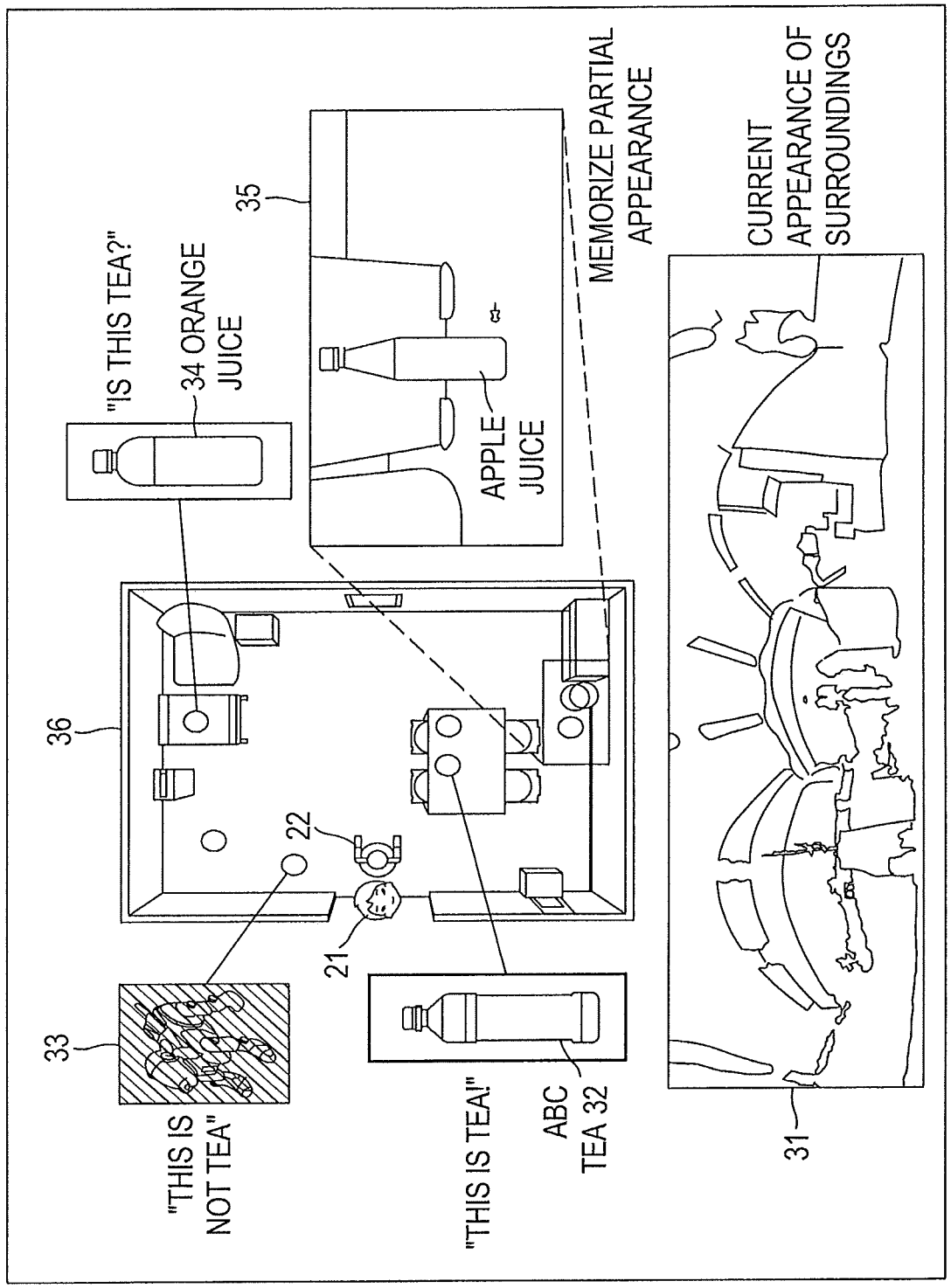
FIG. 3 is a view explaining an outline of processing carried out by a robot.

Next, FIG. 3 illustrates an outline of processing carried out by the robot 22.

FIG. 3 illustrates a surrounding image 31 (or a scene) obtained by capturing the surroundings of the robot 22, an object image 32 that indicates an object which is recognized as a target by the robot 22, an object image 33 that indicates an object which is not recognized as a target by the robot 22, an object image 34 that indicates an object which is recognized as a possible target by the robot 22, and a partial image 35 that indicates a part of a captured image obtained by capturing of the robot 22. Additionally, the scene provided by the robot 22 (or pre-stored in the controller 21), may be a computer generated graphic that includes objects within the scene, such as furniture. Thus, an image and a computer generated graphic are two examples of a scene.

Further, the robot 22 freely moves, for example, in a room 36 in which the user resides to search a target.

While searching the target, the robot 22 appropriately transmits the surrounding image 31 or the partial image 35 obtained by capturing with a built-in camera to the instructing device 21. Further, the surrounding image 31 or the partial image 35 is used when the user specifies the searching range of the robot 22 using the instructing device 21. This will be mainly described with reference to FIGS. 43 to 47.

Further, the robot 22 moves in the room 36 and calculates a score that indicates a degree that the object is the target, that is, a degree that the object is a subject to be processed by the robot 22, based on the captured image obtained by capturing the object with the built-in camera. In addition, an identifier for identifying (a function indicating) whether the object is the target is used to calculate the score.

The robot 22 determines the recognition status of the object based on the score of the object. Further, hereinafter, it is described that the robot 22 uses the image obtained using the built-in camera to calculate the score or transmits the image to the instructing device 21.

However, the image used to calculate the score or the image transmitted to the instructing device 21 is not limited to the image obtained by the built-in camera in the robot 22. For example, an image obtained by a camera provided on the ceiling of the room 36 may be used. In this case, the camera provided on the ceiling of the room 36 transmits the captured image to the robot 22 by the wireless communication. Additionally, the scene provided by the robot 22 (or pre-stored in the controller 21), may be a computer generated graphic that includes objects within the scene, such as furniture. Thus, an image and a computer generated graphic are two examples of a scene.

Figure 4:
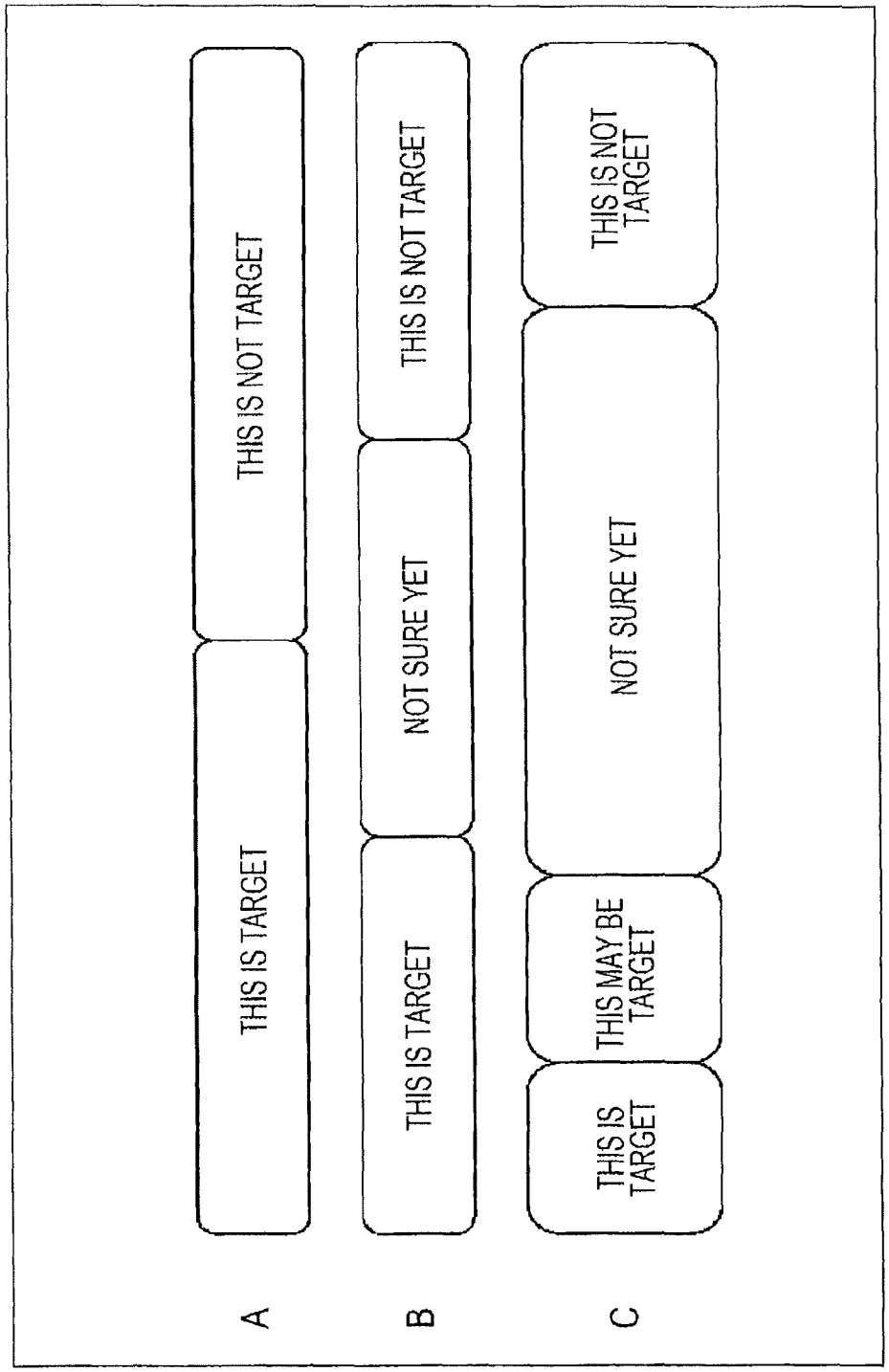
FIG. 4 is a view illustrating an example of a recognition status of an object.

Next, FIG. 4 illustrates an example of the recognition status.

FIG. 4A illustrates two kinds of the recognition statuses of the robot 22, which are "this is a target" and "this is not a target".

FIG. 4B illustrates three kinds of the recognition statuses of the robot 22, which are "this is a target", "not sure yet" and "this is not a target", FIG. 4C illustrates four kinds of the recognition statuses of the robot 22, which are "this is a target", "this may be a target", "not sure yet" and "this is not a target".

Further, in the first embodiment, as shown in FIG. 4C, the robot 22 recognizes any one of the four recognition statuses.

For example, if the score of the object is equal to or higher than a threshold th1, the robot 22 recognizes that the object "is a target", if the score of the object is lower than the threshold th1 and equal to or higher than a threshold th2 (<th1), the robot 22 recognizes that the object "may be a target".

Further, if the score of the object is lower than the threshold th2 and equal to or higher than a threshold th3 (<th2), the robot 22 recognizes the object as "not sure yet" whether the object is a target. If the score of the object is lower than the threshold th3, the robot 22 recognizes that the object "is not a target".

Here, the thresholds th1 to th3 are previously determined and then stored in the robot 22. Further, the robot 22 compares the score with the threshold in order to determine the recognition information of the object, but the method of determining the recognition information is not limited thereto.

Referring back to FIG. 3, for example, if it is judged that the score of the object "ABC tea" is equal to or higher than the threshold th1, the robot 22 displays on the display screen 21a of the instructing device 21 that the robot 22 recognizes that the object "ABC tea" "is a target".

That is, for example, as shown in FIG. 3, on the display screen 21a of the instructing device 21, the object image 32 indicating the object "ABC tea" is displayed in a state enclosed by, for example, a heavy-lined rectangle. The heavy-lined rectangle indicates that the robot 22 recognizes that the object "ABC tea" is "a target".

Further, for example, as shown in FIG. 3, if it is judged that a score of an object "dog-shaped robot" is lower than the threshold th3, the robot 22 displays on the display screen 21a of the instructing device 21 that the robot 22 recognizes that the object "dog-shaped robot" is "not a target".

That is, for example, as shown in FIG. 3, on the display screen 21a of the instructing device 21, the object image 33 indicating the object "dog-shaped robot" is displayed wish, for example, hatched lines. The hatched lines indicate that the robot 22 recognizes that the object "dog-shaped robot" is "not a target".

Further, for example, as shown in FIG. 3, if it is judged that a score of an object "orange juice" is lower than the threshold th1 and equal to or higher than the threshold th2, the robot 22 displays on the display screen 21a of the instructing device 21 that the robot 22 recognizes that the object "orange juice" "may be a target".

That is, for example, as shown in FIG. 3, on the display screen 21a of the instructing device 21, the object image 34 indicating a PET bottle on which the text "orange juice" is written is displayed in a state enclosed by, for example, a thin-lined rectangle. The thin-lined rectangle indicates that the robot 22 recognizes that the object "orange juice" "may be a target".

Further, for example, if it is judged that a score of a predetermined object is lower than the threshold th2 and equal to or higher than the threshold th3, the robot 22 displays on the display screen 21a of the instructing device 21 that the robot 22 recognizes that it is "not sure yet" whether the predetermined object is a target.

That is, for example, on the display screen 21a of the instructing device 21, the object image indicating the predetermined object is displayed as it is (not enclosed by a rectangle or without hatched lines). When the object image is displayed as it is, this indicates that the robot 22 is "not sure yet" whether the predetermined object is a target.

As described above, the information recognized by the robot 22 is displayed on the display screen 21a of the instructing device 21 so that, the user may easily predict the behavior of the robot 22.

However, the display method is not limited thereto, but as long as the user instinctively figures out the behavior of the robot 22, any display method may be used.

Further, by referring to the display screen 21a, if it is judged that an object that is not desirable as a target is recognized as a target, the user may give a feedback manipulation indicating that the object is not a target to the instructing device 21.

In this case, the robot 22 recalculates the scores of the object in response to the feedback manipulation of the user, and autonomously behaves based on the score obtained by the recalculation. Further, the feedback manipulation of the user will be described below mainly with reference to FIGS. 31 to 42.

[Configuration Example of Instructing Device 21)]

Figure 5:
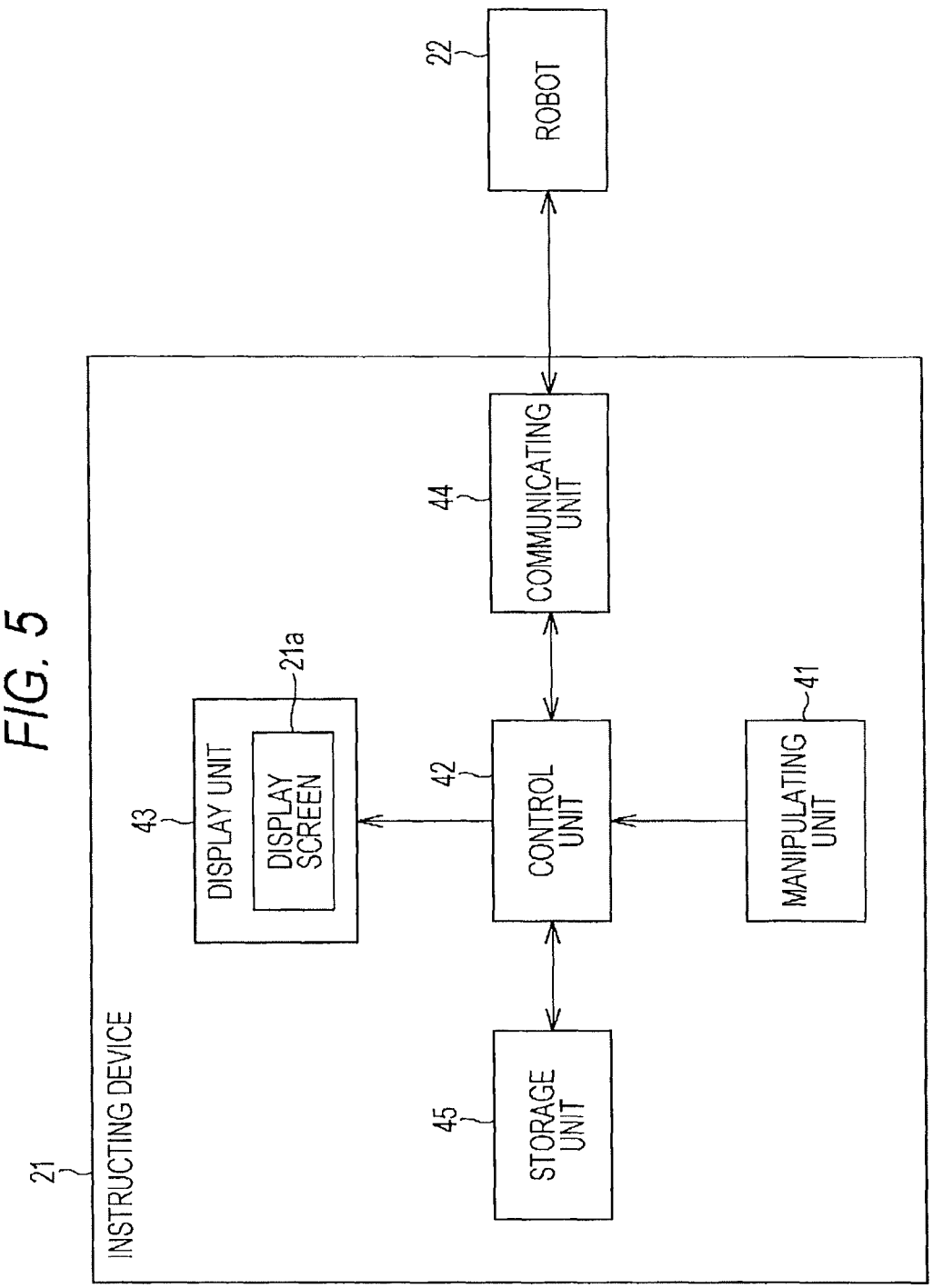
FIG. 5 is a block diagram illustrating a configuration example of an instructing device.

Next, FIG. 5 illustrates the configuration example of the instructing device 21.

The instructing device 21 includes a manipulating unit 41, a control unit 42, a display unit 43 having a display screen 21a a communicating unit 44, and a storage unit 45.

The manipulating unit 41 includes manipulating keys or manipulating buttons. For example, if the user gives an instruction to the robot 22, the manipulating unit is manipulated by the user. When the manipulating unit 41 is manipulated by the user, the manipulating unit 41 supplies a manipulating signal corresponding to the manipulation of the user to the control unit 42.

The control unit 42 creates a robot recognition image including an object image based on the robot recognition information from the communicating unit 44 and supplies the image to the display unit 43 to display the image on the display screen 21a. Further, the robot recognition information includes, for example, scores of the objects as information required to display on the display screen 21a. In addition, the display example of the display screen 21a will be described below with reference- to FIGS. 6 to 17.

Further, the control unit 42 creates instruction information, feedback information, or specified range information based on the manipulating signal from the manipulating unit 41 and supplies the information to the communicating unit 44.

Here, the feedback in formation refers to information indicating contents fed back by the user in the instructing device 21.

The user uses the manipulating unit 41, for example, to feedback that the object recognized "as a target" by the robot 22 is not a target. This will be described below with reference to FIGS. 31 to 42.

Further, the specified range information indicates, for example, the position of an area specified by the area specification of the user among the entire area on the surrounding image 31 or the partial image 35 displayed on the display screen 21a of the instructing device 21.

The user uses the manipulating unit 41, for example, to perform an area specification for specifying the searching range where the robot 22 searches the target among the entire area on the surrounding image 31 or the partial image 35. This will be described below with, reference to FIGS. 43 to 47.

The control unit 42 supplies robot recognition information from the communicating unit 44 to the storage unit 45 to be stored therein.

The display unit 43 displays the images on the display screen 21a in accordance with the control from the control unit 42.

Further, although the instructing device 21 is configured to include the display unit 43, the instructing device 21 may be configured so as not to include the display unit 43. In this case, the control unit 42 may be coupled to the display unit 43 provided outside with a cable.

The communicating unit 44 receives the robot recognition information transmitted from the robot 22 and supplies the information to the control unit 42. Further, the communicating unit 44 transmits the instruction information, the feedback information, or the specified range information from the control unit 42 to the robot 22 using wireless communication or the like.

The storage unit 45 stores, for example, a control program which is executed by the control unit 42 in advance. Further, for example, the storage unit 45 stores the robot recognition information from the control unit 42.

[Display Example of Display screen 21a]

Next FIGS. 6 to 14 illustrate an example of the display screen 21a when the instructing device 21 displays die robot recognition image based on the robot recognition information from the robot 22.

If the robot 22 is instructed to bring an object "tea" based on the instruction information from the instructing device 23, the robot 22 goes to search the object "tea".

When the robot 22 explores the room but does not detect the object the robot recognition information from the robot 22 is not transmitted to the instructing device 21.

Figure 6:
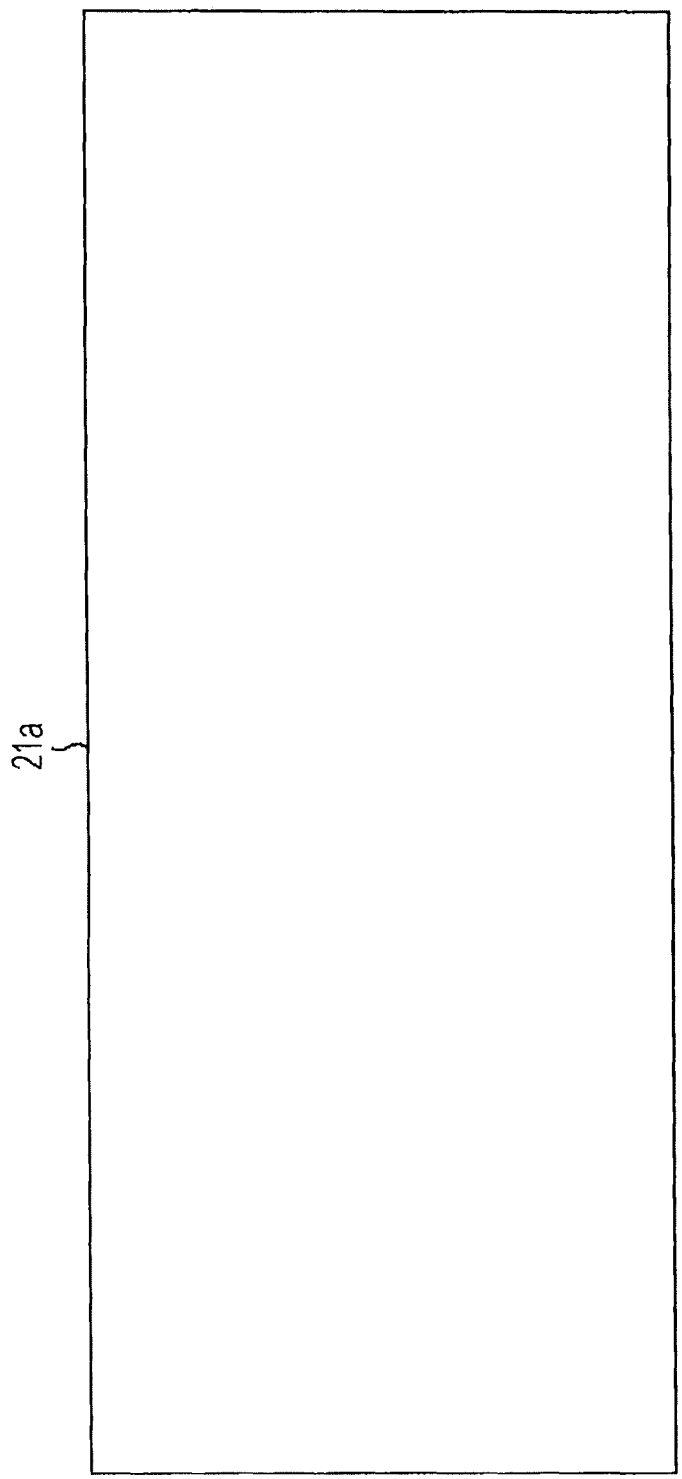
FIG. 6 is a first view illustrating an example of a display screen on which a display based on information from a robot is displayed.

Therefore, as shown in FIG. 6, the control unit 42 displays a robot recognition image in which nothing is captured on the display screen 21a, for example.

When the robot 22 detects an object "bird figurine" from the captured image obtained by capturing the inside of the room 36, the robot 22 extracts an object image 51 representing the object "bird figurine" from the captured image and adds the object image 51 to the robot recognition information to transmit the information to the communicating unit 44.

In response to this, the communicating unit 44 supplies the robot recognition information from the robot 22 to the control unit 42. The control unit 42 supplies the object image 51 included in the robot recognition information from the communicating unit 44 to the display unit 43 to display the object image 51 on the display screen 21a.

Figure 7:
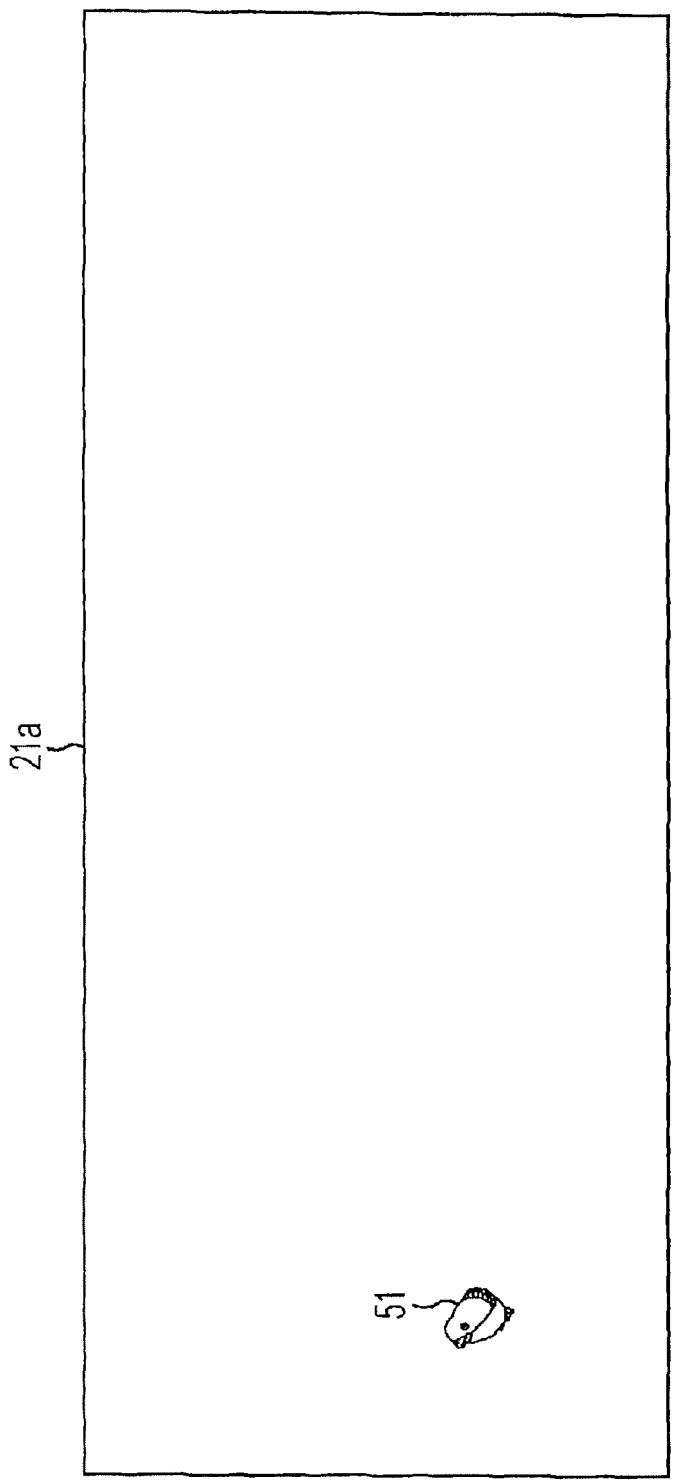
FIG. 7 is a second view illustrating an example of a display screen on which a display based on information from a robot is displayed.

As a result, the object image 51, as shown in FIG. 7, is displayed on the display screen 21a at the left side of the drawing. Therefore, the user may easily predict that the robot 22 detects the bird figurine as an object.

The robot 22 approaches the object "bird figurine" in order to discriminate whether the object "bird figurine" is a target. Then, the robot 22 extracts the object image 51 representing the "bird figurine" from a captured image obtained by approaching and capturing the object "bird figurine" and adds the object image 51 to the robot recognition information to transmit the information to the communicating unit 44.

In response to this, the communicating unit 44 supplies the robot recognition information from the robot 22 to the control unit 42. The control unit 42 supplies the object image 51 included in the robot recognition information from the communicating unit 44 to the display unit 43 to display the object image 51 on the display screen 21*a*.

Figure 8:
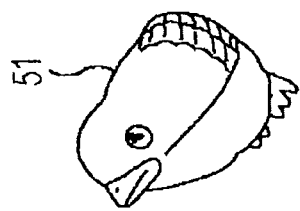
FIG. 8 is a third view illustrating an example of a display screen on which a display based on information from a robot is displayed.

As a result, as shown in FIG. 8, the object image 51 which is larger than that in FIG. 7 is displayed on the display screen 21*a* at the left side of the drawing. Further, since the score of the object "bird figurine" has not been calculated yet, the robot 22 is "not sure yet" whether the object "bird figurine" is a target. Therefore, in FIG. 8, the object image 51 is displayed as it is (not enclosed by a rectangle or without hatched lines)

The robot 22 calculates a score of the object "bird figuring" from the captured image obtained by approaching and capturing the object "bird figurine". Further, when the robot 22 recognizes that the object "bird figurine" is "not a target" based on the calculated score, the robot 22 transmits, to the communicating unit 44, the robot recognition information including (information indicating) a recognition status indicating that "the object is not a target".

In response to this, the communicating unit 44 supplies the robot recognition information, from the robot 22 to the control unit 42. The control unit 42 creates the object image 51 with hatched lines based on the recognition status included in the robot recognition information from the communicating unit 44 and supplies the object image 51 to the display unit 43 to be displayed on the display screen 21*a*.

Figure 9:
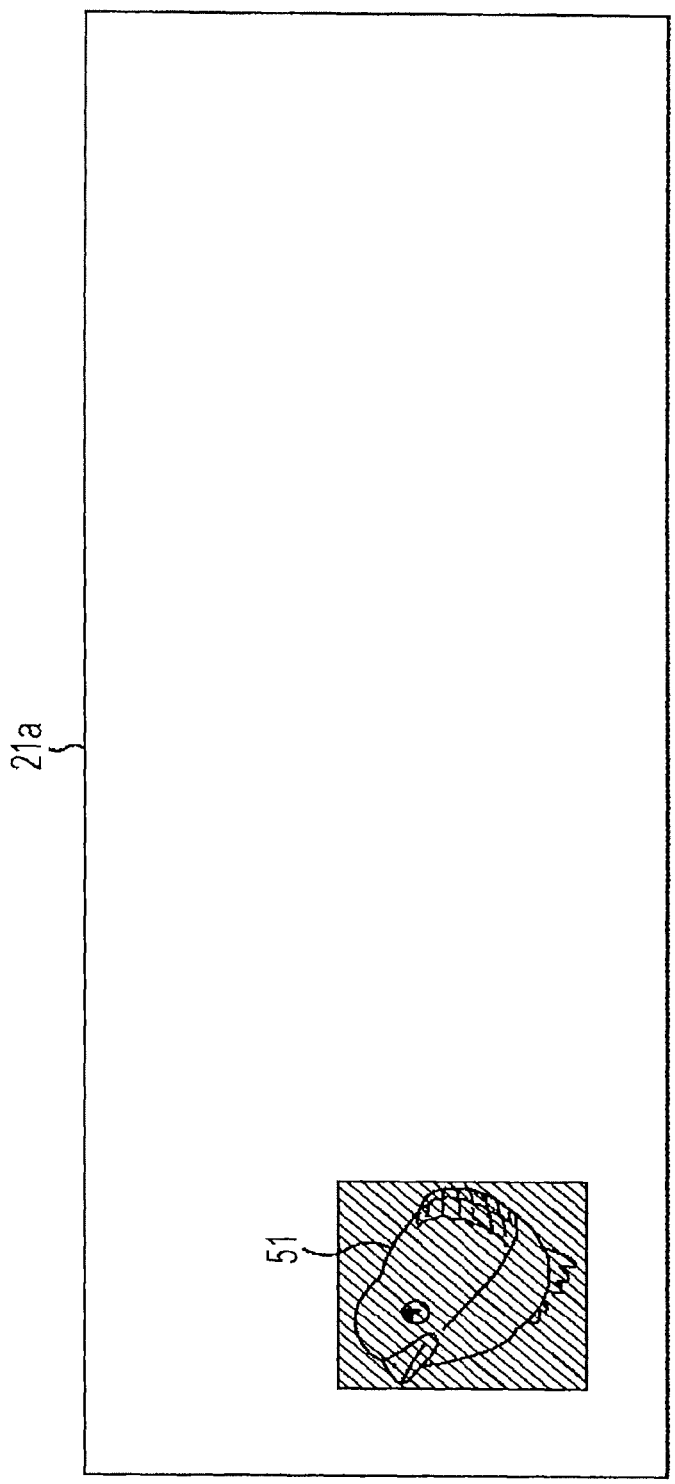
FIG. 9 is a fourth view illustrating an example of a display screen on which a display based on information from a robot is displayed.

As a result, as shown in FIG. 9, the object image 51 with the hatched lines is displayed on the display screen 21*a*.

Further, the hatched lines added to the object image 53 represent that the robot 22 recognizes that the object "bird figurine" on the object image 51 is "not a target".

Therefore, the user may easily predict that the robot 22 recognizes that the "bird figurine" on the object image 51 is "not a target".

When the robot 22 detects an object "eighteen tea" from the captured image obtained by capturing the room, the robot 22 extracts an object image 52 representing the object "eighteen tea" from the captured image.

The robot 22 transmits the robot recognition information Including the extracted object image 52 to the communicating unit 44.

In response to this, the communicating unit 44 supplies the robot recognition information from the robot 22 to the control unit 42. The control unit 42 supplies the object image 52 included in the robot recognition information from the communicating unit 44 to the display unit 43 to display the object image 52 on the display screen 21*a*.

Figure 10:
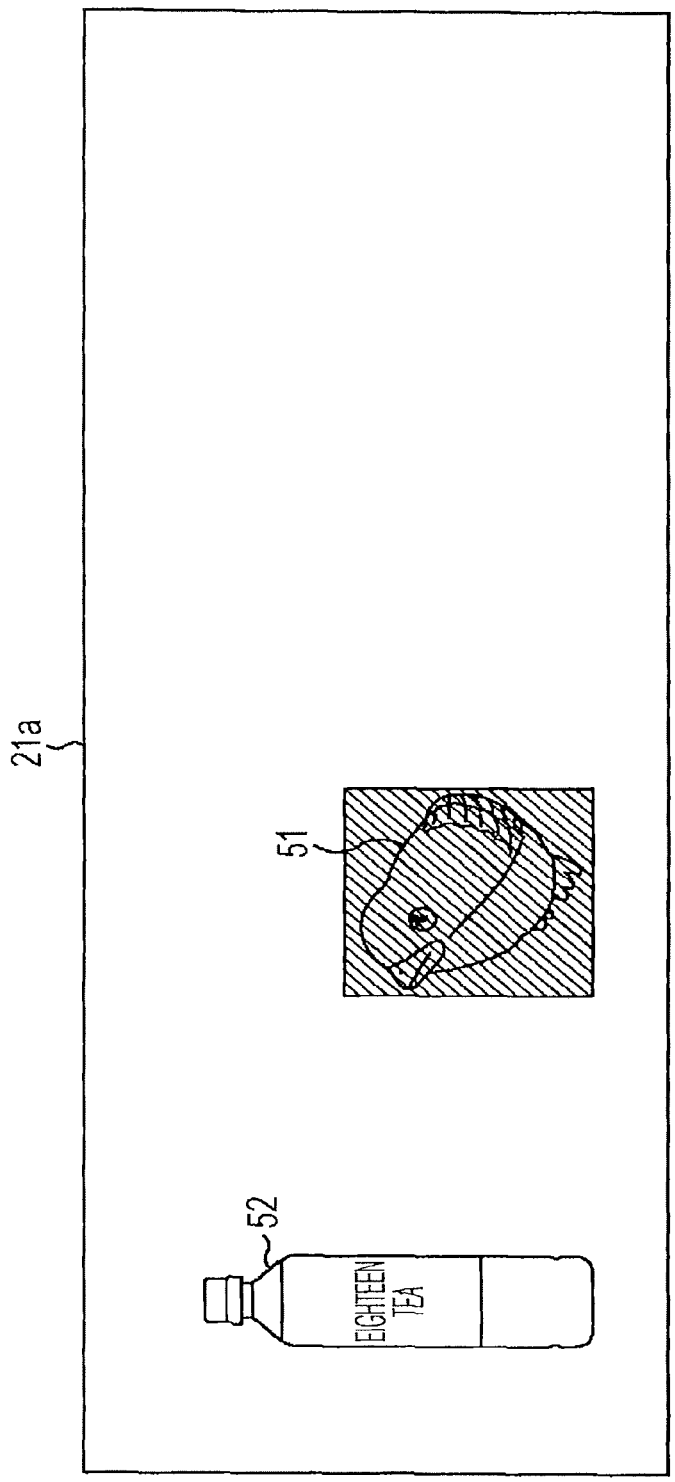
FIG. 10 is a fifth view illustrating an example of a display screen on which a display based on information from a robot is displayed.

As a result, as shown in FIG. 10, the object image 52 of the object "eighteen tea" detected by the robot 22 is displayed on the display screen 21*a* at the left side of the drawing. Therefore, the user may easily predict that the robot 22 detects the object "eighteen tea".

Further, the robot 22 calculates a score of the object "eighteen tea" from the captured image obtained by approaching and capturing the object "eighteen tea". When the robot 22 recognizes that the object "eighteen tea" is "a target" based on the calculated score, the robot 22 transmits, to the communicating unit 44, the robot recognition information including a recognition status indicating that the object "eighteen tea" is a target.

In response to this, the communicating unit 44 supplies the robot recognition information from the robot 22 to the control unit 42. The control unit 42 creates the object image 52 enclosed by a rectangle and indicated by a triangle and the object image 51 with hatched lines based on the robot recognition information from the communicating unit 44 and supplies the object images 52 and 51 to the display unit 43 to be displayed on the display screen 21*a*.

Figure 11:
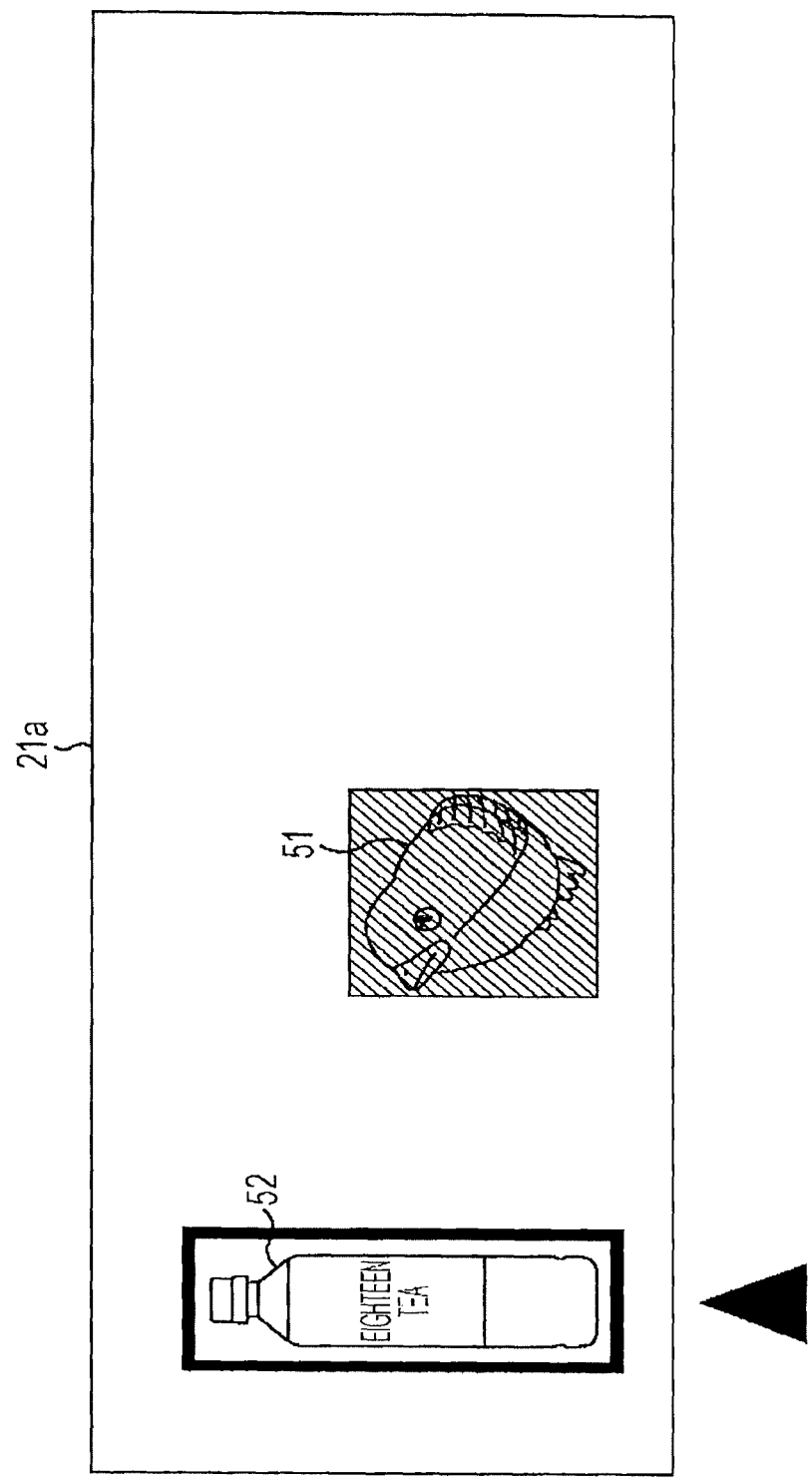
FIG. 11 is a sixth view illustrating an example of a display screen on which a display based on information from a robot is displayed.

As a result, as shown in FIG. 11, the object image 52 enclosed, by a heavy-lined rectangle and indicated by a triangle (▲ shown in FIG. 11) is displayed on the display screen 21*a* at the left side of the drawing and the object image 51 with hatched lines is displayed at the further right than the object image 52.

Further, the heavy-lined rectangle that encloses the object image 52 indicates that the robot 22 recognizes the object "eighteen tea" of the object image 52 as "a target". In addition, the triangle indicating the object image 52 indicates that the robot 22 will return with the object "eighteen tea" of the object image 52.

Further, in this case, the control unit 42 allows the object images indicating the objects to be displayed from the left to the right direction of the display screen 21*a* in the order of higher scores of the objects.

In addition, the display position of the object image corresponds to the score of the object. Therefore, for example, the displaying interval between a first object image and a second object image indicates the difference in score between the objects of the first object image and the second object image.

Accordingly, the user may instinctively notice the score of the object indicated by the object image in accordance with the position of the object image displayed on the display screen 21*a*.

From the display screen 21*a* shown in FIG. 11, the user may easily predict that the robot 22 brings the object "eighteen tea".

Further, when the robot 22 autonomously moves and detects a new object from the captured image obtained by capering using the built-in camera, as described above, the robot 22 creates robot recognition information and transmits the information to the communicating unit 44.

In response to this, the control unit 42 supplies an object image to the display unit 43 to display the object image on the display screen 21*a* based on the robot recognition information from the communicating unit 44.

As described above, the control unit 42 updates the display of the display screen 21*a* based on the robot recognition information transmitted from the robot 22 through the communicating unit 44.

Figure 12:
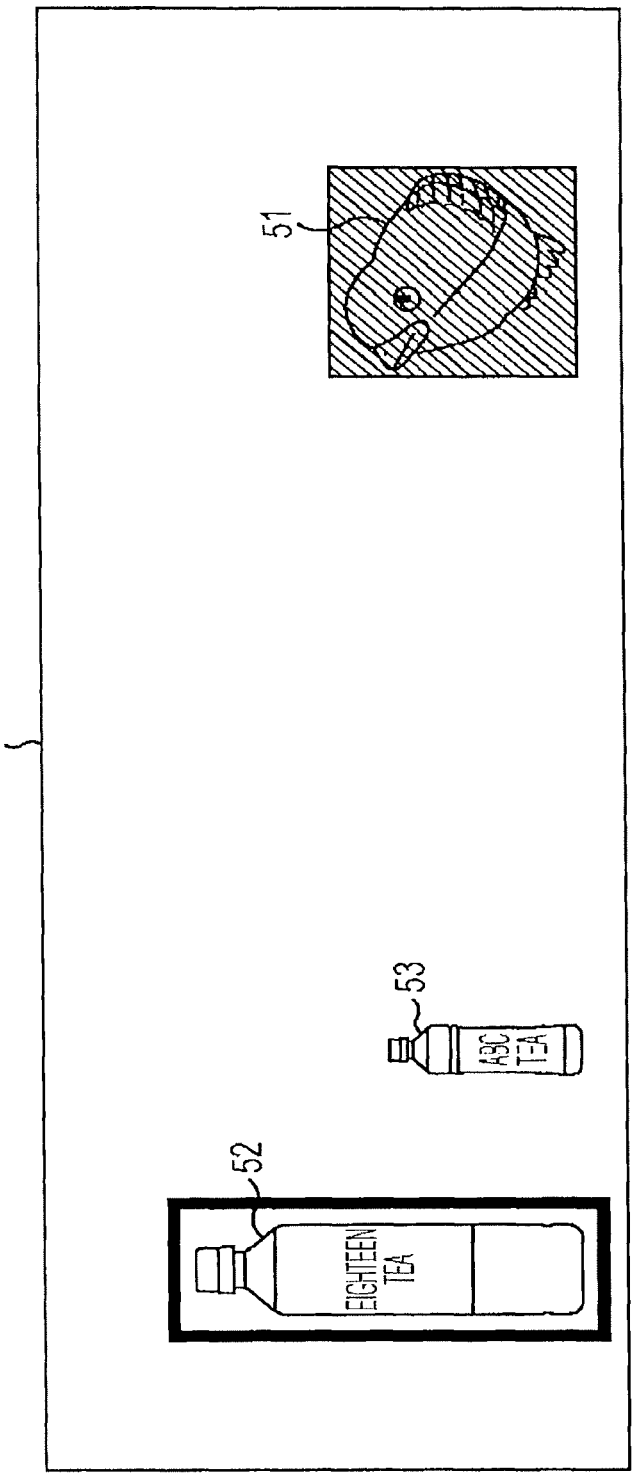
FIG. 12 is a seventh view illustrating an example of a display screen on which a display based on information from a robot is displayed.
Figure 13:
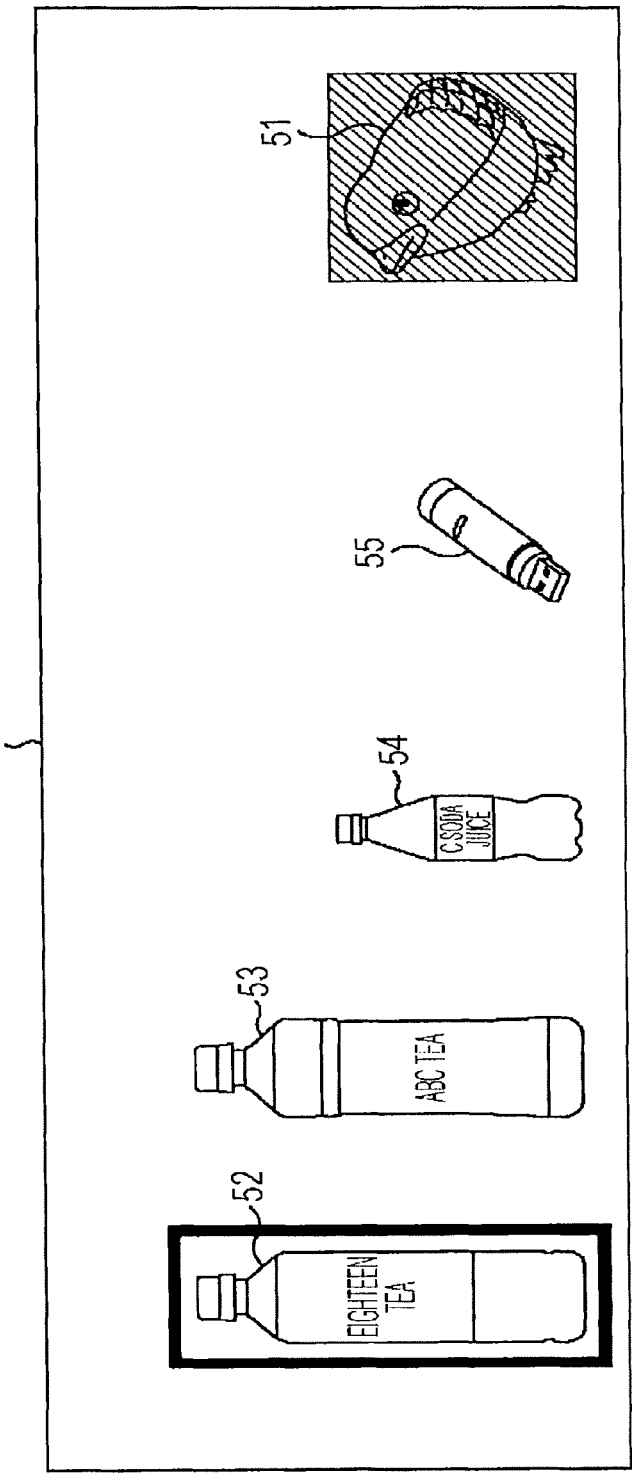
FIG. 13 is an eighth view illustrating an example of a display screen on which a display based on information from a robot is displayed.

That is, thereafter, for example, the display screen 21*a*, as shown in FIG. 12, is updated to newly display an object image 53 representing an object "ABC tea" in response to the behavior of the robot 22. Further, the display screen 21*a*, as shown in FIG. 13, is updated to newly display an object image 54 representing an object "C soda juice" and an object image 55 representing m object "USB memory" in response to the behavior of the robot 22. In addition, for example, the display screen 21*a*, as shown in FIG. 14, is updated to the one in which the positions of the object images are changed in accordance with the scores in response to the behavior of the robot 22.

Figure 14:
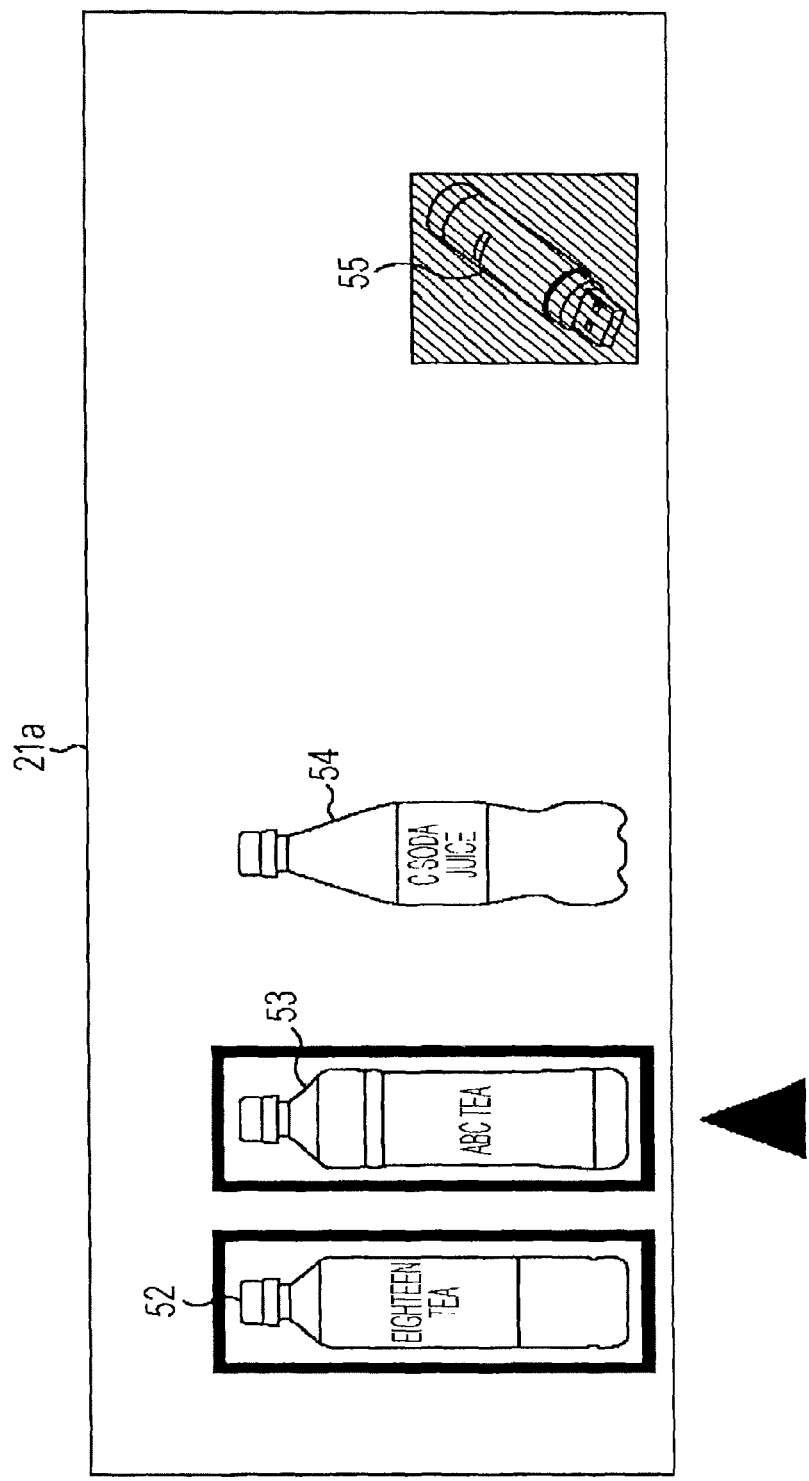
FIG. 14 is a ninth view illustrating an example of a display screen on which a display based on information from a robot is displayed.

Further, on the display screen 21*a* of FIG. 14, the object image 51 that is displayed on the display screen 21*a* of FIG. 13 is not displayed.

In FIG. 14, as an object is displayed on the farther left side of the display screen 21*a*, the score of the object is higher.

Therefore, the score of the object may be represented by the position at which the object image is displayed.

Therefore, when the object images 52 to 55 are displayed in positions according to the scores of the corresponding objects, the object image 51 may not be displayed due to the size of the display screen 21a or the object images.

Further, in FIG. 14, the score of the object, "bird figurine" of the object image 51 is set to be significantly lower than the score of the object "USB memory" of the object image 55.

In addition, in FIG. 14, the score of the object "ABC tea" of the object image 53 is set to be lower than the score of the object "eighteen tea" of the object image 52.

However, the triangle indicates fee object "ABC tea" of the object image 53 and the robot 22 intends to return with the object "ABC tea". This means that the robot 22 determines an object to bring in consideration of the position of the object or a user's preference in addition to the score of the object.

Note that, in the first embodiment, as shown in FIGS. 6 to 14, the object images are displayed in the order of higher scores of the objects from the left to the right of the display screen 21a side by side. However, the object images may be displayed in an arbitrary direction other than the rightward direction (for example, right to left direction).

Further, for example, in the first embodiment as shown in FIGS. 6 to 14, the object images are displayed in the order of higher scores of the objects in an arbitrary direction side by side, and the object images are also displayed at positions corresponding to the scores of the objects.

However, the object images may be displayed on the display screen 21a only using the order of the scores. Alternatively, for example, the object images may be displayed on the display screen 21a at positions corresponding to the scores of the objects without using the order of the scores.

Further, for example, the object images may be displayed by changing at least one of the order, the position, the size, the brightness, the definition, and the color of the object images in accordance with the scores of the objects.

In addition, for example, the scores of the objects may be displayed in association with the object images. Also, the scores, for example, may be represented by a bar graph or a circle graph. When the score is represented by the circle graph, a percentage for a score of an object having the highest score may be represented in the circle graph.

Further, for example, the changes in the scores of the objects may be represented by an arrow in the display screen 21a.

Figure 15:
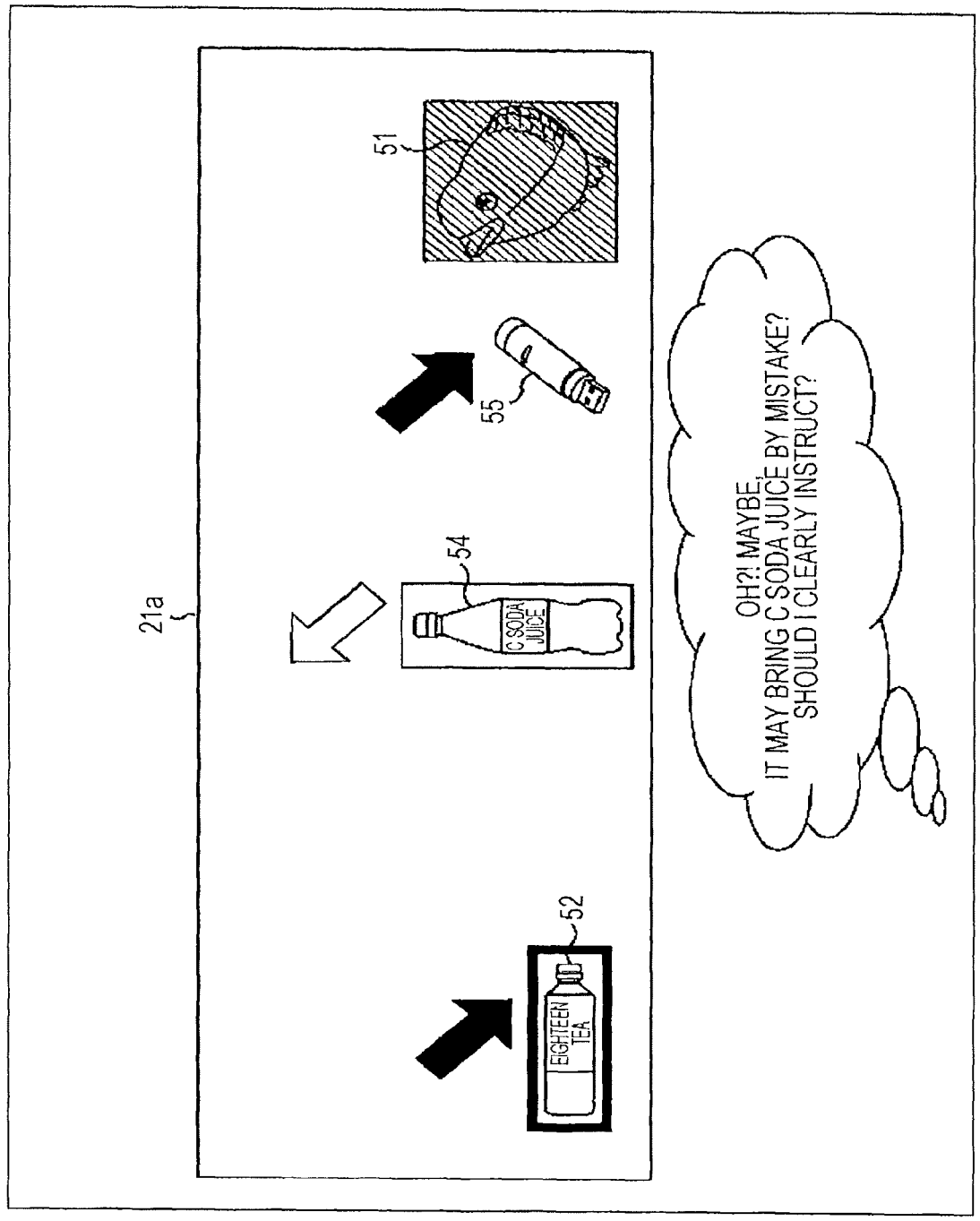
FIG. 15 is a first view illustrating an example where the change in scores of an object is denoted by arrows.

Specifically, for example, as shown in FIG. 15, if the score of the object "C soda juice" corresponding to the object image 54 is changed to be increased, a white arrow indicating the increase in the score of the object "C soda juice" is associated with the object image 54 and displayed on the display screen 21a.

Further, as shown in FIG. 15, if the score of the object "eighteen tea" corresponding to the object image 52 is changed to be decreased, a black arrow indicating the decrease in the score of the object "eighteen tea" is associated with the object image 52 and displayed on the display screen 21a.

In addition, for example, as shown its FIG. 15, if the score of the object "USB memory" corresponding to the object image 55 is changed to be decreased, a black arrow indicating the decrease in the score of the object "USB memory" is associated with the object image 33 and displayed on the display screen 21a.

When the contents as shown in FIG. 15 are displayed on the display screen 21a, the user may predict that the robot 22 will not bring the object "eighteen tea", but bring the object "C soda juice" by mistake. In this case, before the robot 22 brings the object "C soda juice" by mistake, the user may clearly instruct to bring, for example, the object "eighteen tea".

Figure 16:
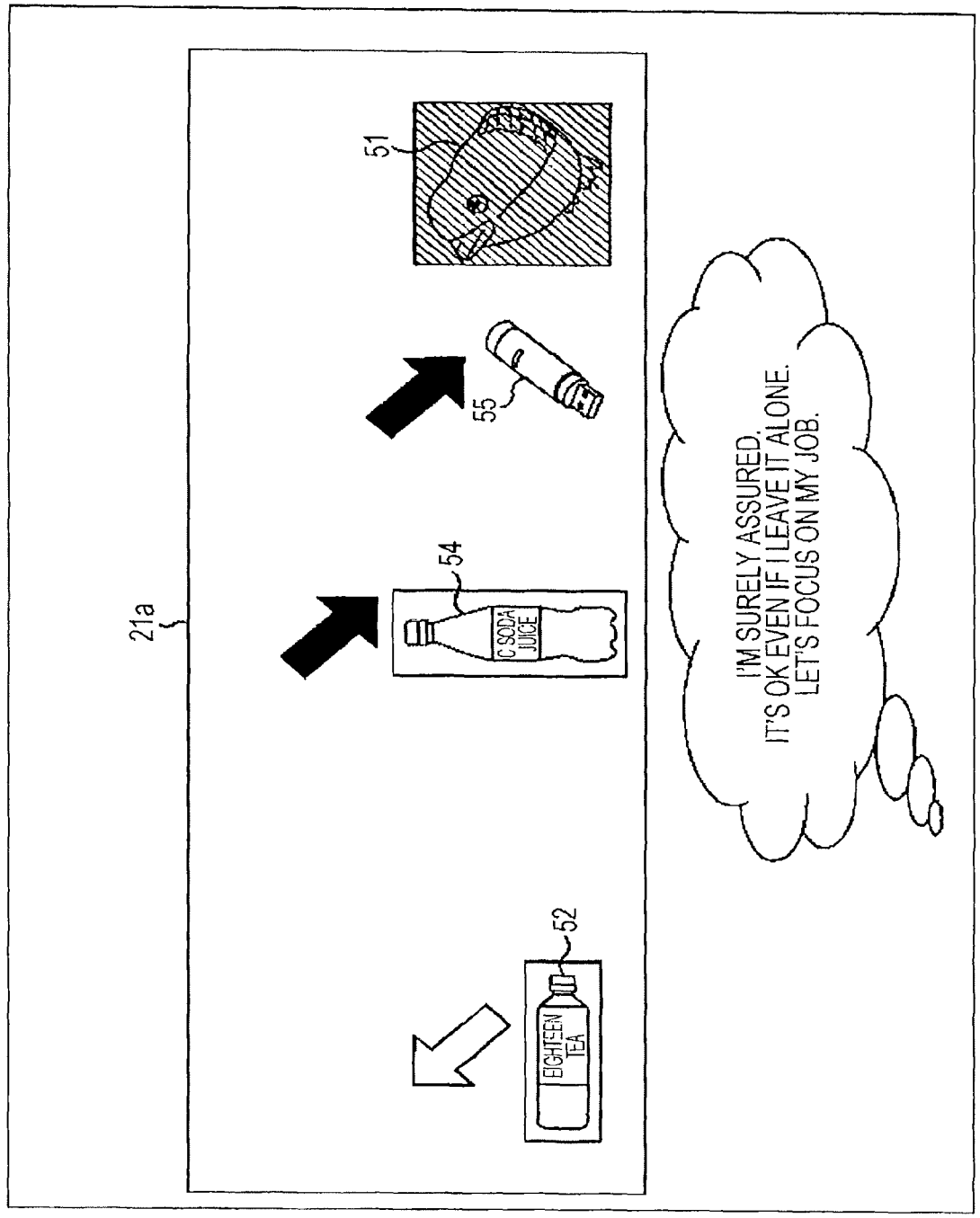
FIG. 16 is a second view illustrating an example where the change in scores of an object is denoted by arrows.

Further, when the contents as shown in FIG. 16 are displayed on the display screen 21a, the user may predict that the robot 22 will bring the object "eighteen tea" which is desired by the user. In this case, the user does not instruct the robot 22 and may focus on his/her job until the robot 22 brings the object "eighteen tea". In addition, since FIG. 16 has the same configuration as FIG. 15, the description of FIG. 16 will be omitted.

in addition, for example, on the display screen 21a, the change in the scores of the objects may be represented by the bar graph or a line chart instead of an arrow. Alternatively, for example, together with the change in the scores of the objects, or instead of the change in the scores of the object, a history of the scores may be displayed.

When the change or the history of the scores is displayed, the user may figure out the change or the history of the scores of the objects by referring to the display screen 21a and thus may easily predict foe change in the ranking of the scores and eventually predict the behavior of the robot 22 in advance.

The above-mentioned display is realized by the control unit 42 referring to the robot recognition information stored in the storage unit 45.

Further, if the ranking of the scores is changed in the instructing device 21, the user may be notified of the change by sound, vibration, or blinking of a lamp.

In the embodiment, as shown in FIGS. 6 to 14, an object image of an object that is recognized "as a target" by the robot 22 is enclosed by a heavy-lined rectangle, and an object image of an object that is recognized "as a possible target" by the robot 22 is displayed as it is.

Further, for example, an object image of an object that is recognized as "not sure yet" by the robot 22 is enclosed by a thin-lined rectangle, and an object image of an object that is recognized as "not a target" by the robot 22 is displayed with hatched lines.

However, the display method that represents the recognition statuses is not limited to the rectangle or the batched lines.

Further, for example, both, the display method that represents the recognition statuses and a display method that represents the scores of the objects may be used. Alternatively, only one of the display method that represents the recognition statuses and the display method that represents the scores of the objects may be used to display the object images on the display screen 21a.

Figure 17:
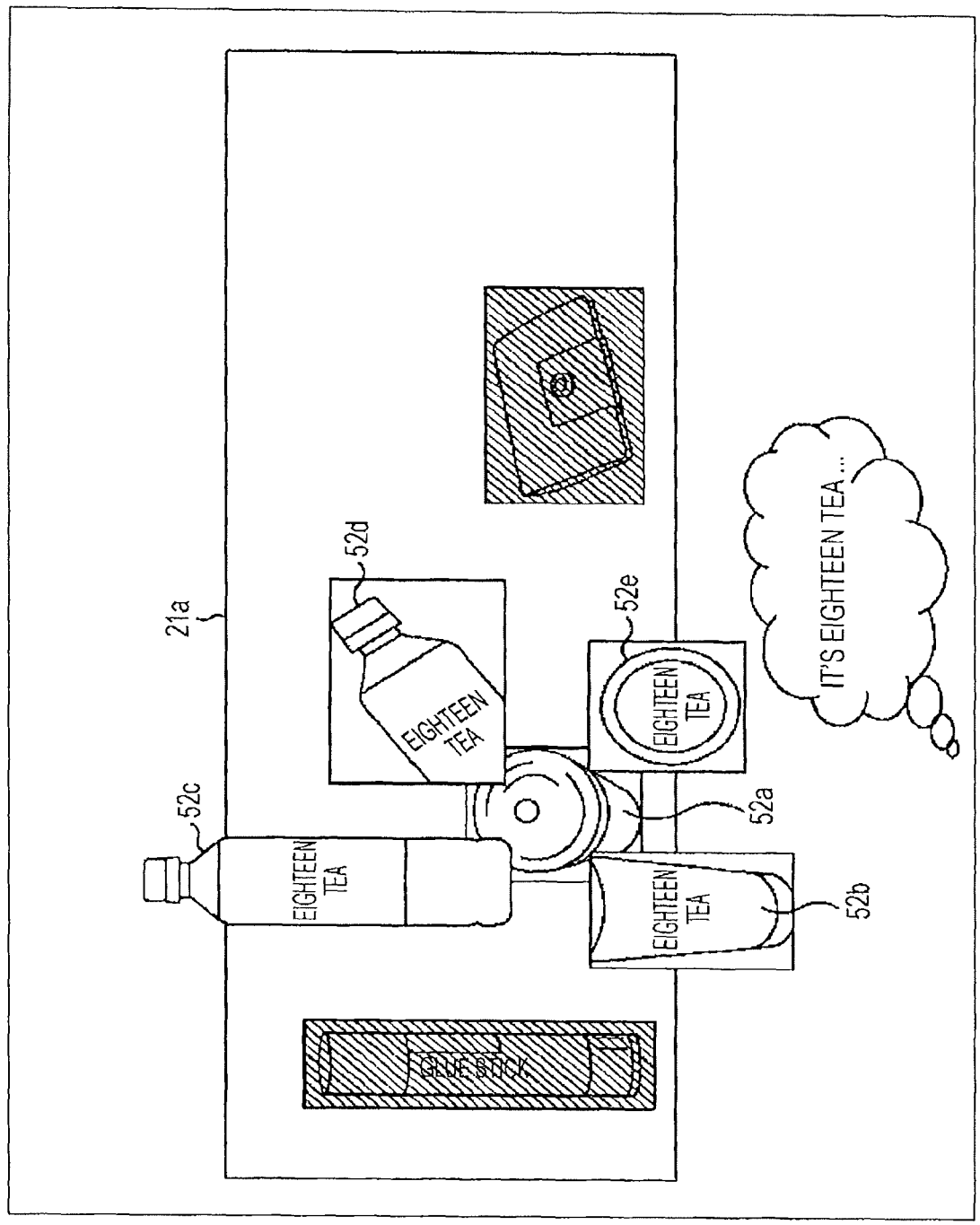
FIG. 17 is a tenth view illustrating an example of a display screen on which a display based on information from a robot is displayed.

Next, FIG. 17 illustrates an example where detailed information of a selected object image is displayed as the user selects the object image on the display screen 21a.

On the display screen 21a shown in FIG. 17, an object image 52a indicating a bottom of the object "eighteen tea" (PET bottle), and object images 52b to 52e obtained by capturing the object "eighteen tea" from different directions as the detailed information of the object "eighteen tea" are displayed.

For example, the robot 22 extracts an object image from the latest captured image obtained by capturing the object as an object image displayed on the display screen 21a and adds the object image to the robot recognition information to transmit the information to the instructing device 21.

Further, the robot 22 may use an object image extracted from a captured image having the highest resolution from a plurality of captured images in which the object is captured in addition to m object image extracted from latest captured image as an object image included in the robot recognition information.

In addition, as the object image included in the robot recognition information, among the plurality of object images, the robot 22 may use an extracted image that sufficiently represents the entire object or use a typical extracted image. Furthermore, as the typical extracted image, for example, an extracted image in which the object is captured at an angle of 45 degrees from above is considered.

For example, when the robot 22 obtains the captured image including parts of the object images 52b to 52e by the previous capturing, and obtains a captured image including a part of the object image 52a by the latest capturing, the robot recognition image including the object image 52a in which a bottom of the object "eighteen tea" is captured is transmitted to the instructing device 21.

Further, in the instructing device 21, as shown in FIG. 17, the object image 52a in which the bottom of the object "eighteen tea" is captured is displayed on the display screen 21a. In this case, the user may not figure out that the object represented by the object image 52a is the "eighteen tea" by watching the object image 52a displayed on the display screen 21a.

Therefore, the robot 22 transmits the robot recognition information including the object images 52b to 52e in addition to the object image 52a to the communicating unit 44 of the instructing device 21. In this case, the communicating unit 44 supplies the robot recognition information from the robot 22 to the control unit 42.

The control unit 42 allows, as shown in FIG. 17, an object image of an object "glue stick", the object image 52a of the object "eighteen tea", and an object image of an object "wallet" to be displayed on the display screen 21a of toe display unit 43 from the left side of the drawing based on the robot recognition information from the communicating unit 44.

Further, the control unit 42 supplies the robot recognition information from the communicating unit 44 to the storage unit 45 to be stored therein.

In the instructing device 21, when the user selects the object image 52a on the display screen 21a using the manipulating unit 41, the manipulating unit 41 supplies a manipulating signal corresponding to the selecting operation of the user to the control unit 42.

Further, the control unit 42 reads the object images 52b to 52e included in the robot recognition information stored in the storage unit 45 in accordance with the manipulating signal from the manipulating unit 41 and supplies the images to the display unit 43 to be displayed on the display screen 21a.

Accordingly, on the display screen 21a, as shown in FIG. 17, the object images 52b to 52e are displayed on the display screen 21a as the detailed information of the object "eighteen tea".

Therefore, even though the user cannot figure out the object on the object image 52a from the object image 52a, the user may easily figure out that the object captured in toe object image 52a is the "eighteen tea" by the object images 52b to 52e displayed in response to the selecting operation of the user.

Further, for example, when the selecting operation of the user is performed in accordance with the manipulating signal front the manipulating unit 41, the control unit 42 may display the enlarged object image 52a as detailed information. In this case, for example, the control unit 42 reads the object image 52a included in the robot recognition information stored in the storage unit 45 and enlarges the object image with a predetermined enlargement ratio and displays the object on the display screen 21a.

Alternatively, for example, the control unit 42 may display a three-dimensional position where the object "eighteen tea" on the object image 52a is detected on the display screen 21a as the detailed information of the object image 52a. In this case, the robot recognition information including the three-dimensional position of the object "eighteen tea" on the object image 52a is stored in the storage unit 45 together with the object image 52a.

Note that, for example, if the instructing device 21 is a personal computer to which a mouse is connected as the manipulating unit 41, the user performs a selecting operation (mouseover) by moving a cursor on the object image 52a on the display screen 21a using the mouse to select the object image 52a.

Further, only a predetermined number of object images corresponding to the screen size of the display screen 21a among the plurality of object images are displayed on the display screen 21a. Therefore, only an object image having a sufficiently high score, object images having top n-th scores, or an object image which is recognized as either "a target" or "a possible target" are displayed on the display screen 21a.

Therefore, there is an object image which is not displayed on the display screen 21a, so that such an object image is preferably displayed on the display screen 21a in response to the manipulation of the user, That is, for example, the user performs a scroll operation that rotates a scroll button provided in the mouse to reduce each object image displayed on the display screen 21a so as to display more object images on the display screen 21a.

In this case, as the manipulating signal in response to the scroll operation is supplied from the manipulating unit 41, the control unit 42 reads the robot recognition information stored in the storage unit 45. Also, the control unit 42 creates each object image reduced in response to the scroll operation based on the read robot recognition information and supplies die object images to the display unit 43 to the displayed on the display screen 21a.

Further, for example, the user may enlarge each object image displayed on the display screen 21a in response to the scroll operation and displays fewer object images on the display screen 21a.

In addition, the display screen 21a, for example, displays the object image of score x1 at the center thereof, an object image having a score higher than the score x1 at the left side, and an object image having a score lower than the score x1 at the right side.

On the display screen 21a, an object image having a score x2 (<x1) lower than the score x1 may be displayed at the center of the display screen 21a, an object image having a score higher than the score x2 may be displayed at the left side, and an object image having a score lower than the score x2 may be displayed at the right side.

That is, for example, when the user moves the cursor to a position where the object image having the score x2 is displayed and manipulates the manipulating unit 41 so that the position is located at the center position of the display screen 21a, the robot recognition image allowing the object image having the score x2 to be displayed at the center of the display screen 21a is created in the control unit 42 and then displayed on the display screen 21a of the display unit 43.

Further, for example, when the user manipulates the manipulating unit 41 so as to locate the position where the object image having the score x1 is displayed at the center of the display screen 21a, the display of the display screen 21a becomes the original display in which the object image having the score x1 is displayed at the center thereof.

In addition for example, when the user enlarges a predetermined area among the entire area of the display screen 21a to be displayed using the manipulating unit 41, the predetermined area on the display screen 21a is enlarged to be displayed.

[Description of Operation when Instructing Device 21 Displays Robot Recognition Image]

Figure 18:
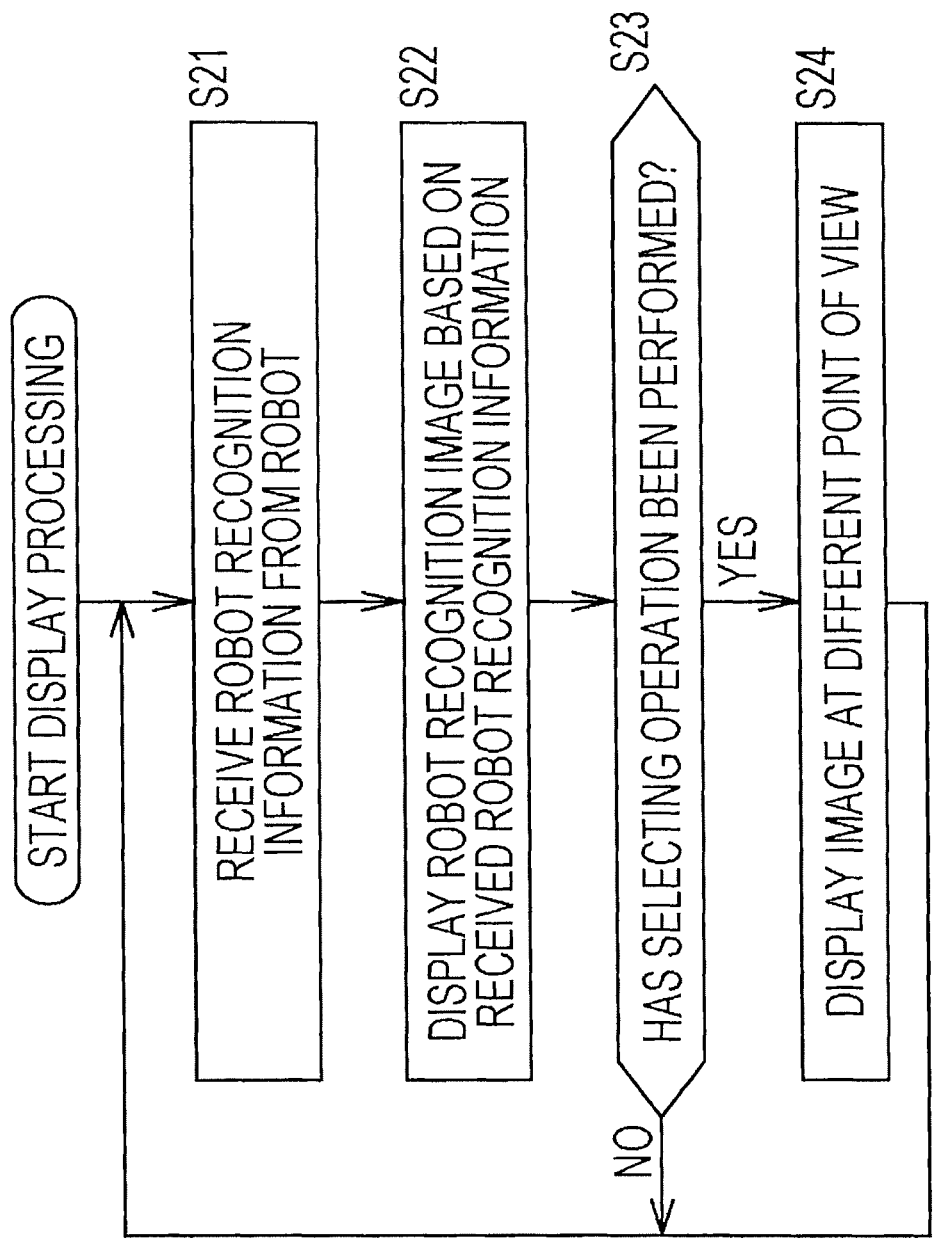
FIG. 18 is a flowchart for explaining display processing carried out by an instructing device.

Next, display processing performed by the instructing device 21 will be described with reference to a flowchart of FIG. 18.

For example, the display processing starts when the robot recognition information is transmitted from the robot 22.

In step S21, the communicating unit 44 receives the robot recognition information from the robot 22 in accordance with the control of the control unit 42 and supplies the information to the control unit 42.

In step S22, the control unit 42 creates a robot recognition image based on the robot recognition information from the communicating unit 44 and supplies the image to the display unit 43 to be displayed on the display screen 21a.

Further, the control unit 42 supplies the robot recognition information from the communicating unit 44 to the storage unit 45 to be stored therein.

In step S23, the control unit 42 judges whether the selecting operation has been performed by the user in accordance with whether the manipulating signal has been supplied from the manipulating unit 41 in response to the selecting operation by the user.

Further, in step S23, if it is judged that the selecting operation has not been performed by the user, the control unit 42 returns the processing to step S21 and then repeats the same processing.

In addition, in step S23, if it is judged that the selecting operation has been performed by the user in accordance with whether the manipulating signal has been supplied from the manipulating unit 41 its response to the selecting operation by the user, the control unit 42 causes the processing to proceed to step S24. In this case, for example, it is assumed that the selecting operation for displaying the detailed information of the captured image 52a shown in FIG. 17 has been performed.

In this case, in step S24, the control unit 42 reads the robot recognition information stored in the storage unit 45 and supplies the object images 52b to 52e included in the read robot recognition information to the display unit 43 to be displayed on the display screen 21a. Thereafter, the processing returns to step S21 and then the same processing is performed. Further, the display processing, for example, ends when the robot recognition information is not transmitted from the robot 22.

As described above, according to the display processing, the display screen 21a is displayed as shown in FIGS. 6 to 17 based on the robot recognition information from robot 22 so that it is possible to easily predict the behavior of the robot 22.

Further, according to the display processing, in step S23, for example, as the selecting operation that selects the object image 52a of FIG. 17 is performed, in step S24, an object captured in the object image 52a is displayed as the object images 52b to 52e as seen from different directions.

Therefore, the user may more precisely figure out an object of the object image displayed on the display screen 21a.

[Configuration Example of Robot 22]

Figure 19:
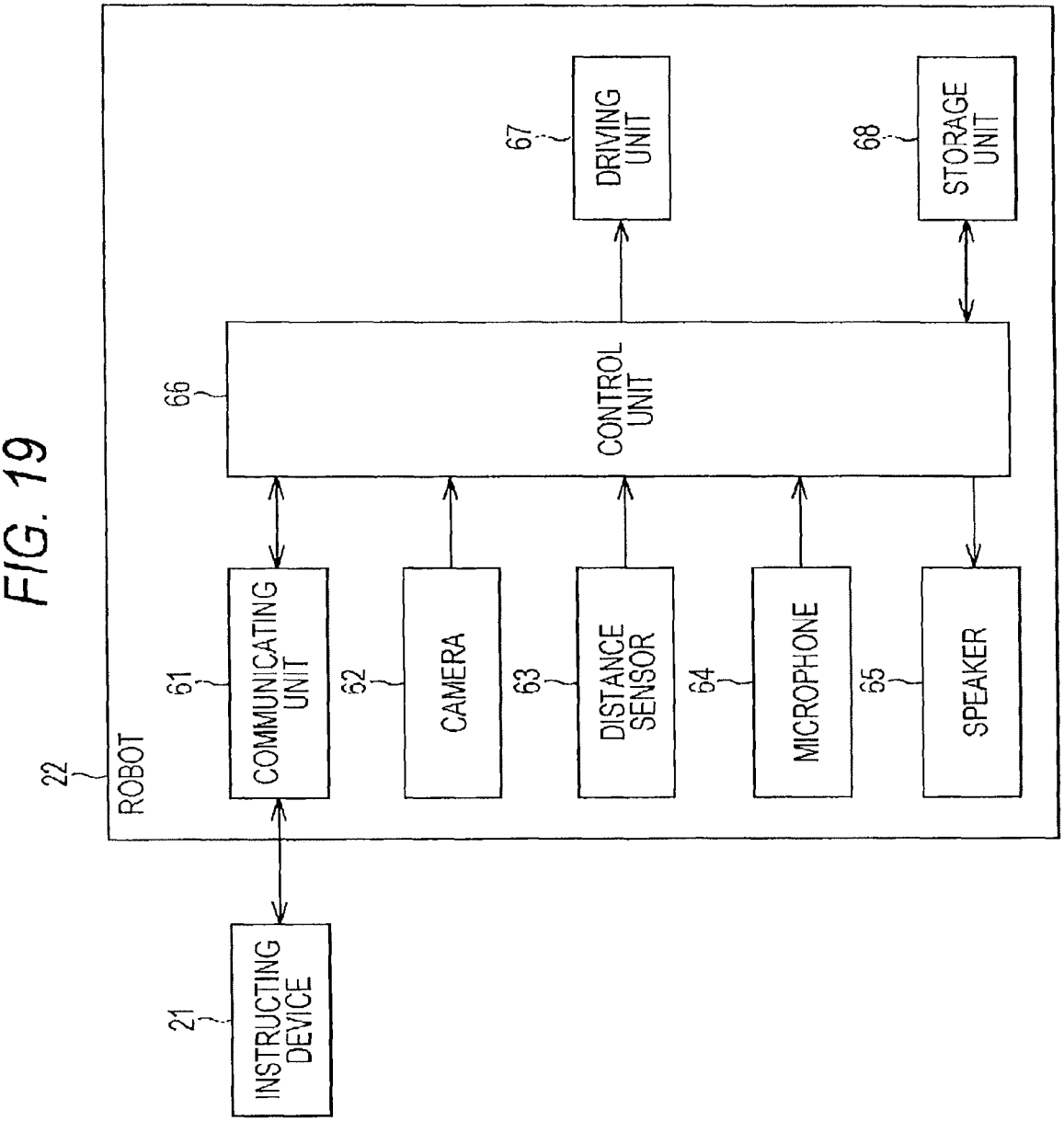
FIG. 19 is a block diagram illustrating a configuration example of a robot.

Next, FIG. 19 shows a configuration example of the robot 22.

The robot 22 includes a communicating unit 61, a camera 62, a distance sensor 63, a microphone 64, a speaker 65, a control unit 66, a driving unit 67, and a storage unit 68.

The communicating unit 61 receives instruction information, feedback information, and specified range information from the instructing device 21 and supplies the information to the control unit 66.

The communicating unit 61 transmits the robot recognition information from the control unit 66 to the instructing device 21.

The camera 62 corresponds to "eyes" that sense light and includes, for example, a CCD (charge coupled device) image sensor. The camera 62 captures surroundings of the robot 22 and supplies a captured image obtained by the capturing to the control unit 66.

The distance sensor 63 is a sensor that measures the distance from the robot 22 to the object and measures the distance to the object and supplies the measured distance to the control unit 66.

The microphone 64 corresponds to "ears" that sense sound and collects voice and supplies a voice signal obtained by collecting the voice to the control unit 66.

The speaker 65 corresponds to a "mouth" of the robot 22 and outputs predetermined voice in accordance with the control from the control unit 66.

The control unit 66 controls the communicating unit 61 to the speaker 65, and the driving unit 67. That, is, for example, the control unit 66 figures out the surrounding circumstances based on the captured image from the camera 62, the distance from the distance sensor 63, or the voice signal from the microphone 64 and controls the driving unit 67 in accordance with the figured out surrounding circumstances.

Further, the control unit 66 controls the driving unit 67 based an the instruction information from the communicating unit 61 and autonomously performs the behavior instructed by the user. That is, for example, the control unit 66 controls the driving unit 67 to allow the robot 22 to autonomously search as a target, an object belonging to a category indicated by category information included in the instruction information.

In addition, the control unit 66 detects an object on the captured images based on the captured images from the camera 62 and extracts an object image indicating the detected object. Furthermore, the control unit 66 calculates a score of the detected object based on the captured image from the camera 62.

That is, the control unit 66, for example, reads an identifier of an object which is a target, from the storage unit 68 based an the instruction information from the communicating unit 61. Further, the control unit 66 extracts a feature amount indicating a feature of the detected object from the captured images from the camera 62.

Further, the control unit 66 calculates the score of the detected object using the read identifier based on the extracted feature amount. In other words, for example, the control unit 66 may use the identification result (score) obtained from the identifier as it is as a score of the detected object or calculate a final score in time series manner by integratively judging the identification result obtained from the identifier, The control unit 66 determines the recognition status of the object based on the calculated score of the object. Further, the determination of the recognition status will be described below with reference to FIG. 20.

Further, the control unit 66 determines an object image to be displayed on the display screen 21a based on the calculated score of the object or the determined recognition status of the object. The method of determining the object image to be displayed on the display screen 21a will be described below with reference to FIG. 21.

The control unit 66, for example, changes an object image which is determined to be displayed on the display screen 21a in accordance with the recognition status of the object (for example, encloses with a rectangle or adds hatched lines) and creates robot recognition information including an object image after the change, a score of the object and display target information and supplies the information to the communicating unit 61.

Further, the control unit 66 controls the distance sensor 63 to measure the distance to the detected object. As a result, the distance sensor 63 supplies the distance to the object detected by the control unit 66 to the control unit 66.

The control, unit 66 detects a three-dimensional position of the camera 62 (robot 22) based on the captured, image from the camera 62 or the posture of the camera 62 (position and orientation). Further the details of a method of detecting the three-dimensional position of the robot 22 are disclosed in Japanese Patent Application Laid-Open No. 2008-304268.

Further, the control unit 66 may use a positioning technology that uses, for example, a GPS (global positioning system) or Wi-Fi to detect the three-dimensional position of the robot 22.

The control, unit 66 calculates the three-dimensional position of the sensed object based on the detected three-dimensional position and the distance supplied from the distance sensor 63, associates the position with the captured image in which the object is captured, and supplies the position to the storage unit 68 to be stored therein.

Further, the control unit 66 reads the captured image (for example, the surrounding image 31 or the partial image 35 of FIG. 3) stored in the storage unit 68 and creates a robot recognition image including evert the read captured image to be supplied to the communicating unit 61.

The control unit 66 detects the specified area indicating an area specified by the specifying operation of the user based on the specified range information from the communicating unit 61 and the captured image stored in the storage unit 68.

Further, the control unit 66 reads the three-dimensional position associated with the object on the detected specified area from the storage unit 68 and calculates a search range corresponding to the specified area based on the read three-dimensional position.

In addition, the control unit 66 controls the driving unit 67 to drive portions corresponding to hands or feet of the robot 22 to perform, m operation of searching a target (object belonging to the category indicated by the category information) within the calculated search range.

The driving unit 67 drives the portions corresponding to "hands" or "feet" of the robot 22 in accordance with the control from the control unit 66 so that the robot 22 autonomously behaves.

The storage unit 68, for example, holds a control program that is executed by the control unit 66 in advance and further stores (holds) data that is instructed to be written from the control unit 66.

Further, the storage unit 68 stores an identifier for identifying the object for each object of a plurality of items. The identifier is a function that has the feature amount of the object as an input and outputs the score of the object. In addition, the identifier is generated by being learned in advance and stored.

In addition, the storage unit 68 stores the captured image (the captured image associated with the three-dimensional position of the object on the captured image, for example, the surrounding image 31 or the partial image 35) from the control unit 66.

Figure 20:
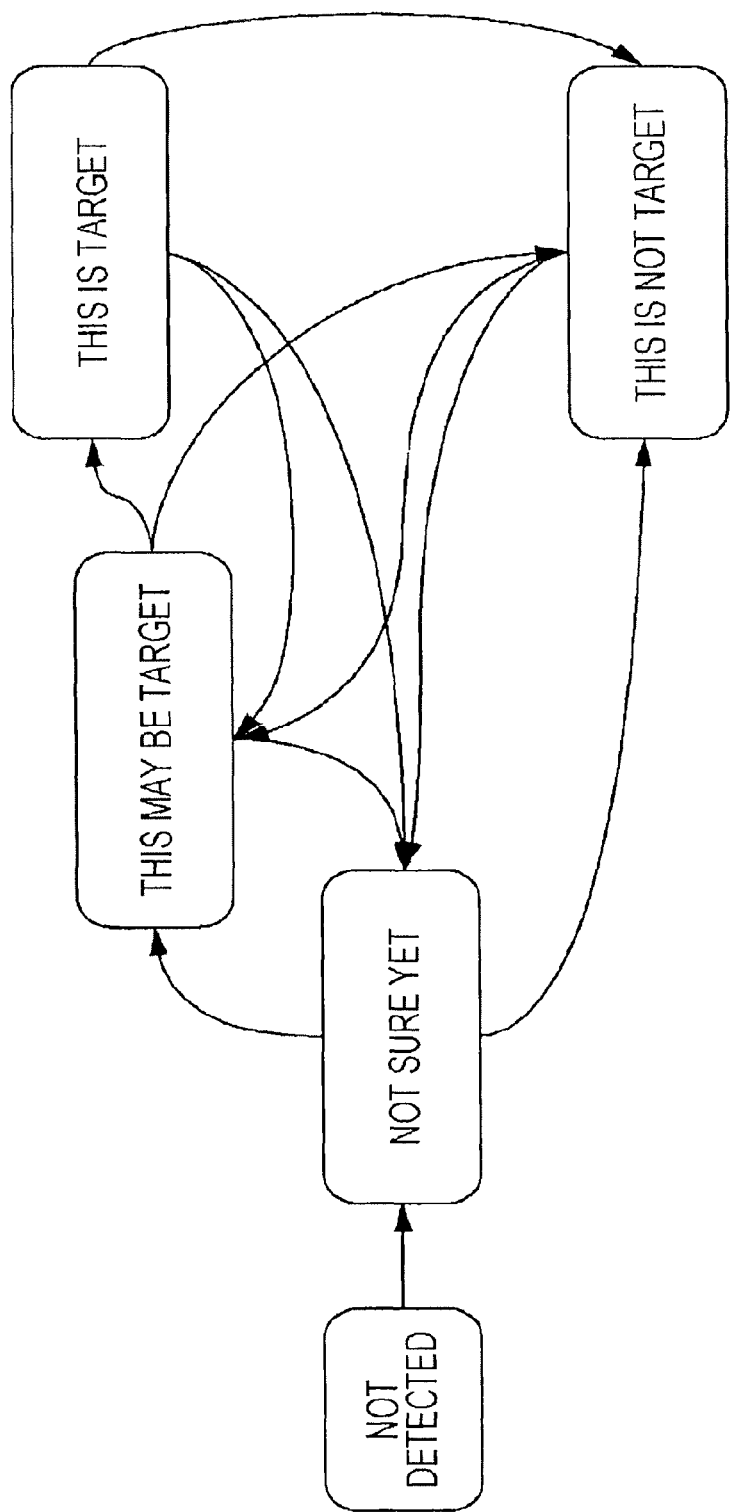
FIG. 20 is a state transition diagram illustrating an example of transition of a recognition status of an object.

Next, FIG. 20 shows an example of a transition diagram of the recognition status of the object.

In FIG. 20, as the recognition status that is recognized by the control unit 66, "not detected (sensed)", "not sure yet", "this may be a target", "this is a target", and "this is not a target" are shown.

The control unit 66 recognizes the object as any one status of "not sure yet", "this may be a target", "this is a target", and "this is not a target" in accordance with the calculated score of the object.

That is, for example, if the score of the object is equal to or higher than the threshold th1, the control unit 66 recognizes that the object a "is a target". If the score of the object is lower than the threshold th1 and equal to or higher than a threshold th2 (<th1), the control unit 66 recognizes that the object "may be a target".

Further, for example, if the score of the object is lower than the threshold th2 and equal to or higher than a threshold th3 (<th2), the control unit 66 recognizes the status of object as "not sure yet" whether the object is a target. If the score of the object is lower than the threshold th3, the control unit 66 recognizes that the object "is not a target".

In addition, except when the feedback operation is performed by the user, the control unit 66 recognizes that the object "is a target" always through the status that recognizes that this "may be a target".

Accordingly, on the display screen 21a, it is possible to prevent an object that is recognized as "not sure yet" whether the object is a target (corresponding to an object image enclosed by a thin-lined rectangle) from being suddenly changed into an object that is recognized "as a target" (corresponding to an object image enclosed by a heavy-lined rectangle).

Therefore, the user may pay attention to only an object that is recognized on the display screen 21a that "this may be a target" (corresponding to an object image displayed as it is) whether there is an object that does not correspond to a target.

As described above, when the object is recognized "as a target", the control unit always goes through the status that recognizes that this "may be a target". This is because, if an object that is recognized on the display screen 21a as "not sure yet" whether the object is a target is suddenly changed into an object that is recognized "as a target", this is inconvenient for the user because the user should pay attention to all objects on the display screen 21a.

Figure 21:
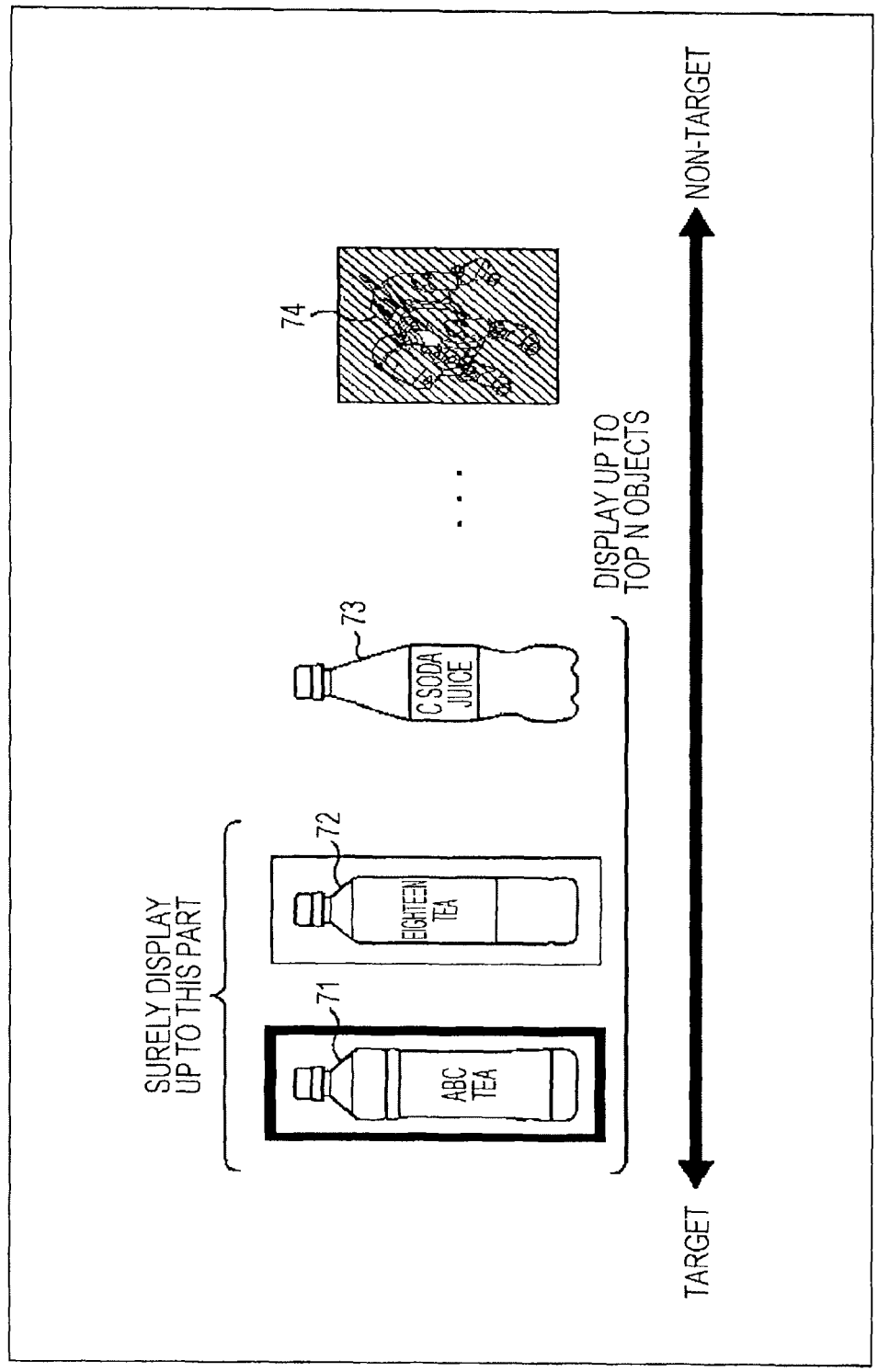
FIG. 21 is a view for explaining a creating method that creates robot recognition information in accordance with a recognition status of an object.

Next, FIG. 21 illustrates an example of a determining method by which the control unit 66 determines an object image to be displayed on the display screen 21a in accordance with the score of the object.

In FIG. 21, art object 71, an object 72, an object 73, ... an object 74 are shown from the left side of the drawing in the order of higher scores.

The control unit 66 recognizes the object 71 "as a target" based on the calculated score of the object 71. Further, the control unit 66 recognizes that the object 72 "may be a target" based on the score of the object 72.

In addition, the control unit 66 recognizes the status of the object as "not sure yet" whether the object 73 is a target based on the score of the object 73. Furthermore, the control unit 66 recognizes that the object 74 "is not a target" based on the score of the object 74.

For example, the control unit 66, as shown in FIG. 21, may determine to display the object images corresponding to top N objects having a high score among the plurality of detected objects on the display screen 21a of the instructing device 21.

Further, for example, the control unit 66, as shown in FIG. 21, may determine to display at least the object images corresponding to objects recognized as "this is a target" or "this may be a target" among the plurality of detected objects on the display screen 21a of the instructing device 21.

[Description of Operation when Robot 22 Calculates Score]

Figure 22:
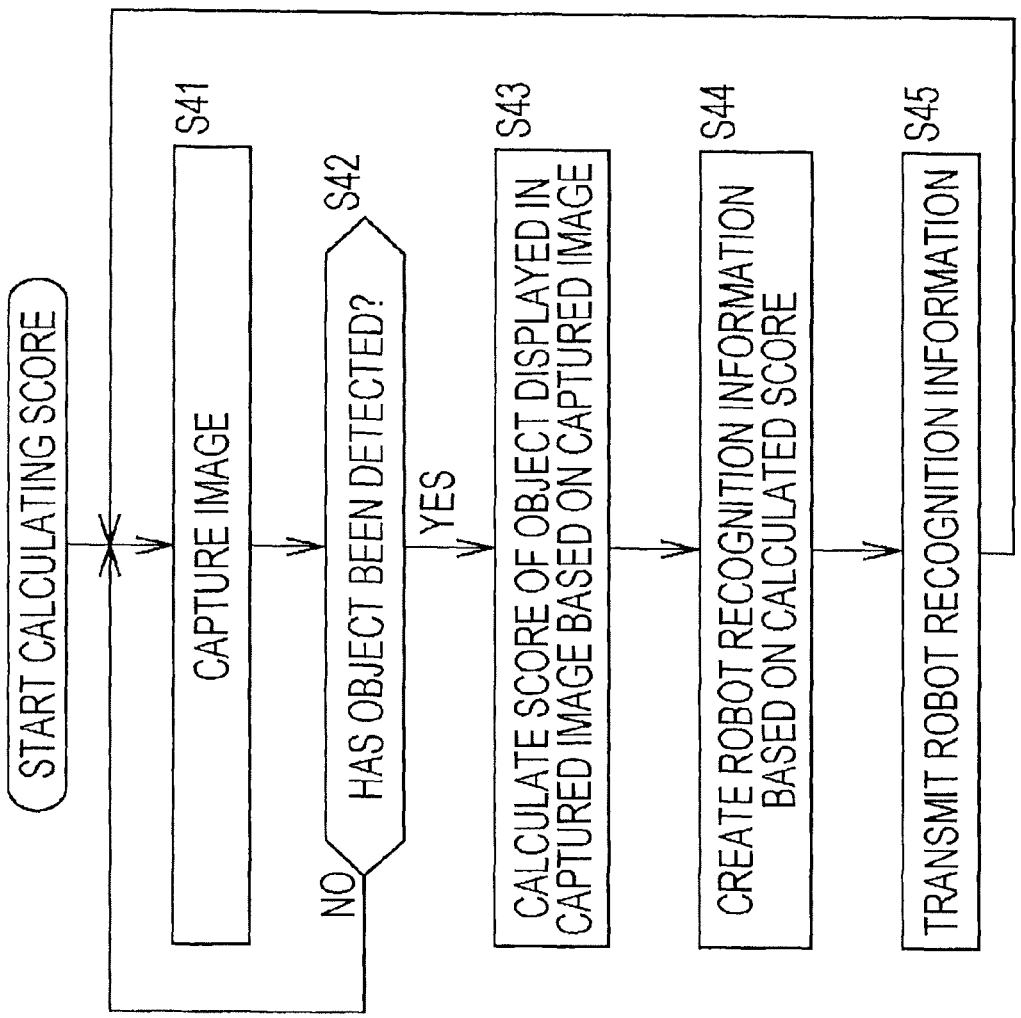
FIG. 22 is a flowchart for explaining score calculation processing earned out by a robot.

Next, with reference to a flowchart of FIG. 22, the score calculation processing that is performed by the robot 22 will be described.

The score calculation processing, for example, starts when the robot 22 explores the room based on the instruction information from the instructing device 21.

In step S41, the camera 62 captures the surroundings of the robot 22 and supplies the captured image obtained by the capturing to the control unit 66.

In step S42, the control unit 66 tries to detect an object on the captured image based on the captured image from the camera 62.

Further, when the object is detected from the captured image, the control unit 66 causes the processing to proceed to step S43 based on the captured image from the camera 62. In addition, when an object is not detected from the captured image, based on the captured image from the camera 62, the control unit 66 returns the processing to step S41 and then performs the same processing.

The control, unit 66 judges a target indicating a subject to be processed by the robot 22 based on the instruction information supplied through the communicating unit 61 from the instructing device 21 and reads an identifier for the judged target from the storage unit 68.

In step S43, the control unit 66 calculates a feature amount of the detected object from the captured image from the camera 62. Next, the control unit 66 calculates a score of the object based on the calculated feature amount using the identifier read from the storage unit.

IN step S44, the control unit 66 creates robot recognition information including the calculated score or the captured image stored in the storage unit 68 and supplies the information to the communicating unit 61.

In step S45, the communicating unit 61 transmits the robot recognition information from the control unit 61 to the instructing device 21. The processing returns to step S41 and then the same processing is performed.

Further, the score calculating processing, for example, ends when the robot 22 finds the target and brings the object to the user.

As described above, according to the score calculation processing, the score of the detected object is calculated and the robot recognition information including the calculated score is transmitted to the instructing device 21.

Therefore, on the display screen 21a of the instructing device 21, the robot recognition image may be displayed as shown in FIGS. 6 to 17 so that the user may easily predict the behavior of the robot 22.

2. Modified Example of First Embodiment

[Another Display Example of Robot Recognition Image]

Referring to FIGS. 6 to 17, the robot recognition images in which the object having a higher score is displayed at farther left side of the display screen 21a have been described, but are not limited thereto.

Figure 23:
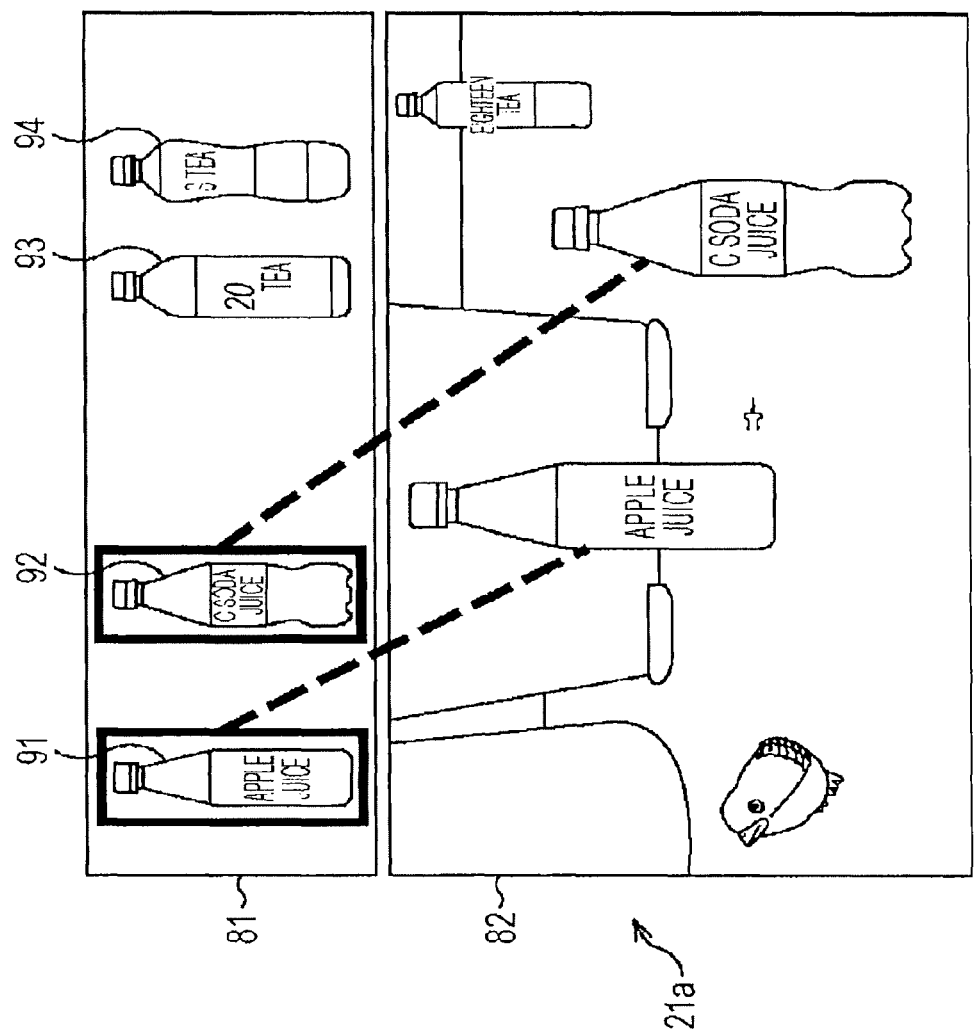
FIG. 23 is an eleventh view illustrating an example of a display screen on which a display based on information from a robot is displayed.

Next, FIG. 23 illustrates another display example of the robot recognition images.

In FIG. 23, on a upper screen 83 that indicates a screen located at the upper side of the display screen 21a, as a score of m object represented by an object image becomes higher, a robot recognition image that is disposed at farther left of the display screen 21a is displayed. In this case, objects 91, 92, 93, and 94 have high scores in descending order.

Further, a latest captured image obtained by capturing with the camera 62 is displayed on a lower screen 82 that represents a screen located at the upper side of the display screen 21a. As shown in FIG. 23, the object 91 ("apple juice") and the object 92 ("C soda juice") displayed on the upper screen 81 are captured in the captured image.

On the display image 21a, the object 91 on the upper screen 81 and the object 91 ("apple juice") on the lower screen 83 are connected by a dotted line so that the correspondence relationship of the objects 91 displayed on the upper screen and the lower screen 82 may be understood.

The same applies to the object 92. Further, in this case, a latest captured image obtained by capturing with the camera 62 is included in the robot recognition information.

That is, in FIG. 23, the latest captured image obtained by capturing with the camera 62 is displayed on the lower screen 82, unlike the case described with reference to FIGS. 6 to 17.

In FIG. 23, on the upper screen 81, the object images of the objects 91 and 92 are enclosed by a heavy-lined rectangle. Therefore, it is predicted that the robot 22 recognizes the objects 91 and 92 as the target. Further, referring to the lower screen 82 in FIG. 23, it is predicted that the robot 22 exists near the objects 91 and 92.

Therefore, as compared with the case of referring to only the upper screen 81 of FIG. 23, by referring to the upper screen 81 and the lower screen 82 of FIG. 23, the user may easily predict that the robot 22 brings one of the objects 91 and 92 as a target.

Further, in FIG. 23, on the lower screen 82, the latest captured image obtained by capturing with the camera 62 is displayed. However, for example, a captured image obtained by capturing with the camera 62 at a predetermined time may be displayed. In addition, a composite image (image such as a panoramic view) created by composing a plurality of captured images obtained by capturing with the camera 62 may be displayed, In addition, for example, on the display screen 21a, the captured image obtained by capturing with the camera 62 may be displayed so as to overlap a heavy-lined rectangle (for example, the apple juice on the captured image is enclosed by a heavy-lined, rectangle). In this case, in the display screen 21a, an image that is displayed on the upper screen 81 shown in FIG. 23 is not displayed, but only the captured image is displayed.

Figure 24:
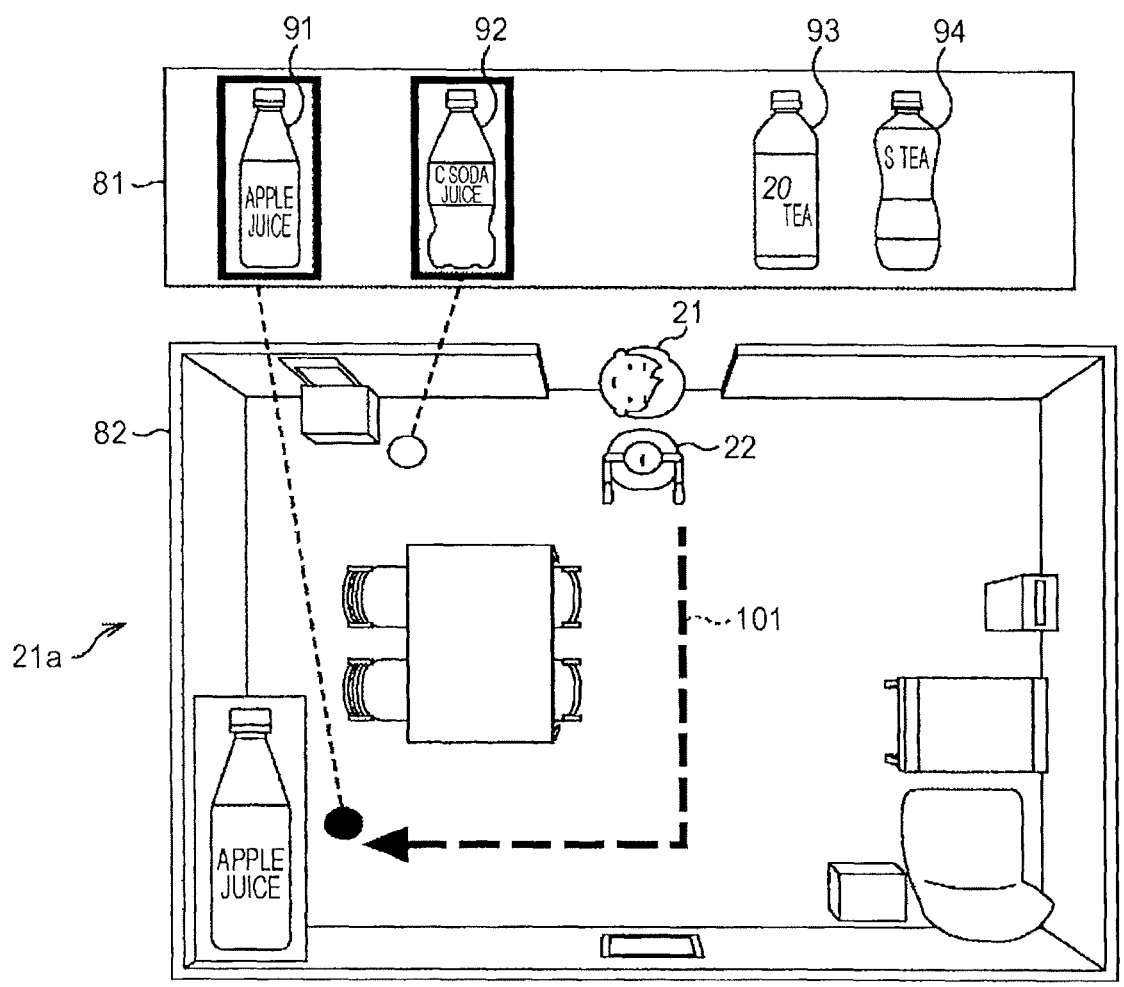
FIG. 24 is a twelfth view illustrating an example of a display screen on which a display based on information from a robot is displayed.

Further, (for example, as shown in FIG. 24, instead of the latest captured image obtained by capturing with the camera 62, a space diagram showing a space in the room may be displayed on the lower screen 82 of the display screen 21a. In this case, the robot recognition information includes space information indicating the space diagram of the room. In addition, the space information, for example, is stored in the storage unit 68 of the robot 22 in advance.

In addition, as shown in FIG. 24, in the space diagram displayed on the lower screen 82, a path where the robot 22 moves from now is indicated by a dotted line 101. In addition, in FIG. 24, the object displayed on the upper screen 81 and the position on the space diagram in which the object exists are connected by a dotted line, so that the correspondence relationship can be understood.

Therefore, as compared with the case of referring to only the upper screen 81 of the display screen 21a of FIG. 24 by referring to the upper screen 81 and the lower screen 82 of the display screen 21a of FIG. 24, the user may predict that the robot 22 will return with the object 91 ("apple juice") as the target.

Further, when the display screen 21a shown in FIGS. 23 and 24 is displayed, it is preferable to preferentially display the object present near the robot 22 (object present in a predetermined range from the position of the robot 22) as the object image.

In addition, for example, on the display screen 21a, the captured image is displayed on the lower screen 82 shown inn FIG. 23 and the space diagram is displayed on the upper screen 82 shown in FIG. 24. However, for example, both the captured image and the space diagram: may be displayed on the display screen 21a.

In this ease, for example, on the display screen 21a, the space diagram including the dotted line 101 indicating the path where the robot 22 moves from now is displayed together with the display shown in FIG. 21.

Next, 25 illustrates another display example of the robot recognition image.

Figure 25:
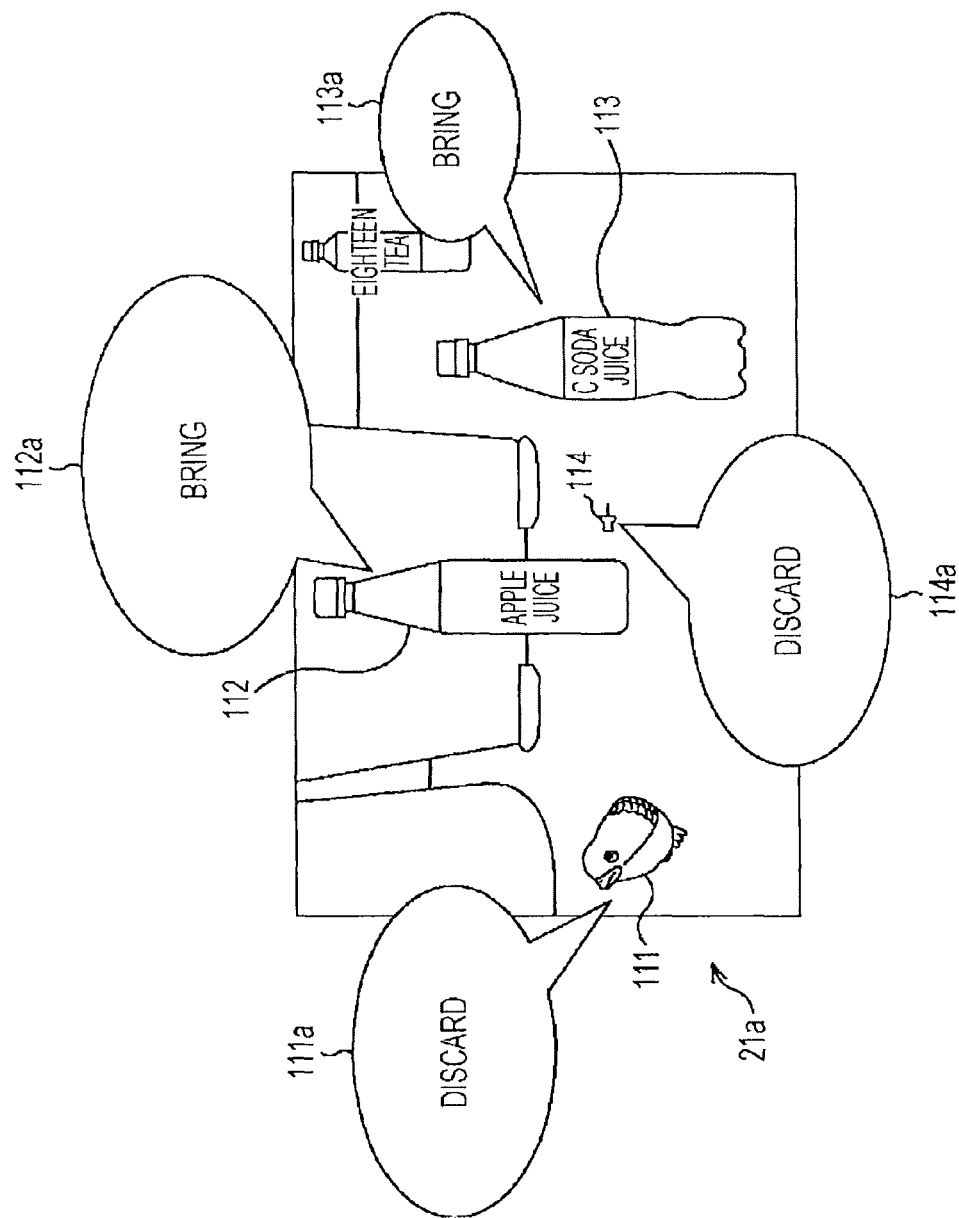
FIG. 25 is a thirteenth view illustrating an example of a display screen on which a display based on information from a robot is displayed.

In FIG. 25, the latest captured, image obtained by capturing with the camera 62 of the robot 22 is displayed on the display screen 21a. Objects 111 to 114 detected by the robot 22 are mainly captured in the captured images.

Further, in the objects 113 and 113, the behaviors to be performed with respect to the objects by the robot 22 are displayed by balloons 111a to 113a.

The behavior "discard" is displayed in the balloon 111a the behavior "bring" is displayed in the balloon 112a, the behavior "bring" is displayed in lite balloon 113a, and the behavior "discard" is displayed in a balloon 114a. Further, when the display screen 21a is displayed as shown in FIG. 25, processing information indicating processing (for example, "discard") of the robot 22 having an object (for example, "bird figurine") as a target to be processed is included in the robot recognition information from the robot 22.

Further, the sixes of the balloons 111a to 113a, for example, correspond to the scores of the objects with the balloons. In addition, the score may be indicated by the color of the balloons instead of the size of the balloons.

In the first embodiment, the user uses the instructing device 21 to instruct the robot 22 to bring a "tea" as a target. However, the instruction is not limited thereto. The user may instruct, for example, to discard the target in a trash bin.

For example, the user may use the instructing device 21 to instruct to "seize", "pick up" or "clean up" the target.

For example, FIG. 25 is a display example that is displayed on the display screen 21a of the instructing device 21 when the user uses the instructing device 21 to instruct the robot 22 to bring "juice" and discard a "small object" in the trash bin.

That is, the robot recognition image displayed on the display screen 21a may be displayed by any display method as long as the user may instinctively predict the behavior of the robot 22.

Further, for example, the user may use the instructing device 21 to select a person as a target other than the "tea" as a target. In this case, the user may use the instructing device 21 to "call" a person as a target.

In this case, for example, the detected person may be displayed on the display screen 21a together with the name of the person. Further, the name of the person, for example, is stored in the storage unit of the robot 22 in advance in association with an identifier for identifying the person.

Further, if as the name of the detected person, a name of a different person is displayed on the display screen 21a, the user may use the manipulating unit 41 to change the name into the name of the detected person.

Figure 26:
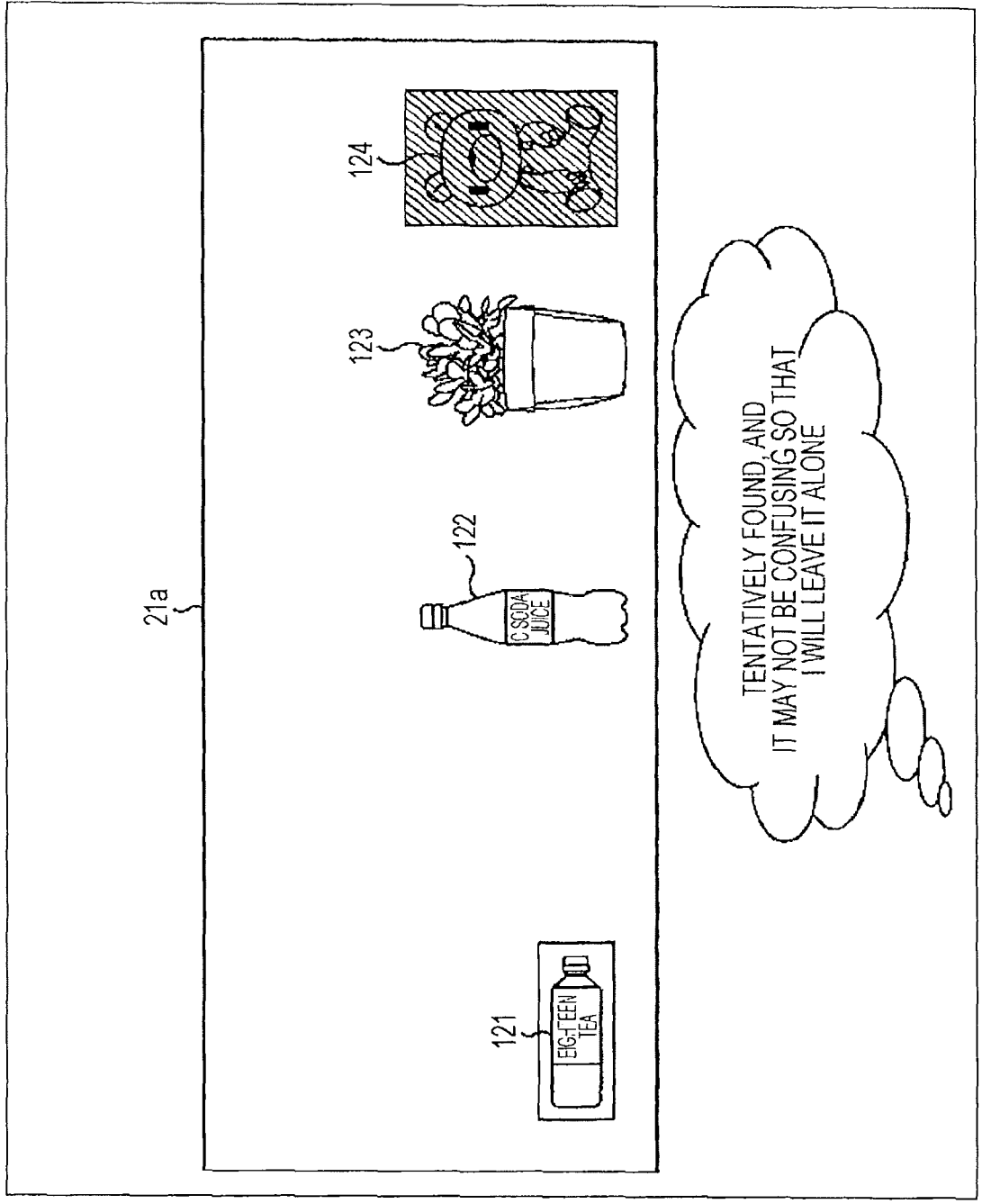
FIG. 26 is a fourteenth view illustrating an example of a display screen on which a display based on information from a robot is displayed.

For example, the instructing device 21, as shown in FIG. 26, allows the robot recognition image including object images 121 to 124 to be displayed on the display screen 21a based on the robot recognition information from the robot 22.

On the display screen 21a shown in FIG. 26, it is displayed that the robot 22 recognizes that the object "eighteen tea" corresponding to the object image 121 "may be a target".

It is also displayed that the robot 22 is "not sure yet" whether the object "C soda juice" corresponding to the object image 122 and the object "potted plant" corresponding to the object image 123 are a target respectively and the robot recognizes that the object "stuffed animal" corresponding to the object image 124 is "not a target".

Therefore, the user may predict the behavior of the robot 22 as described below by referring to the display screen 21a shown in FIG. 26. That is, for example, the user may predict that the robot 22 eventually recognizes, "as a target", the object "eighteen tea" that has been recognized by the robot as "a possible target" and will bring the object "eighteen tea", In this case, it is considered that the user may wait until the robot 22 brings the object "eighteen tea".

Figure 27:
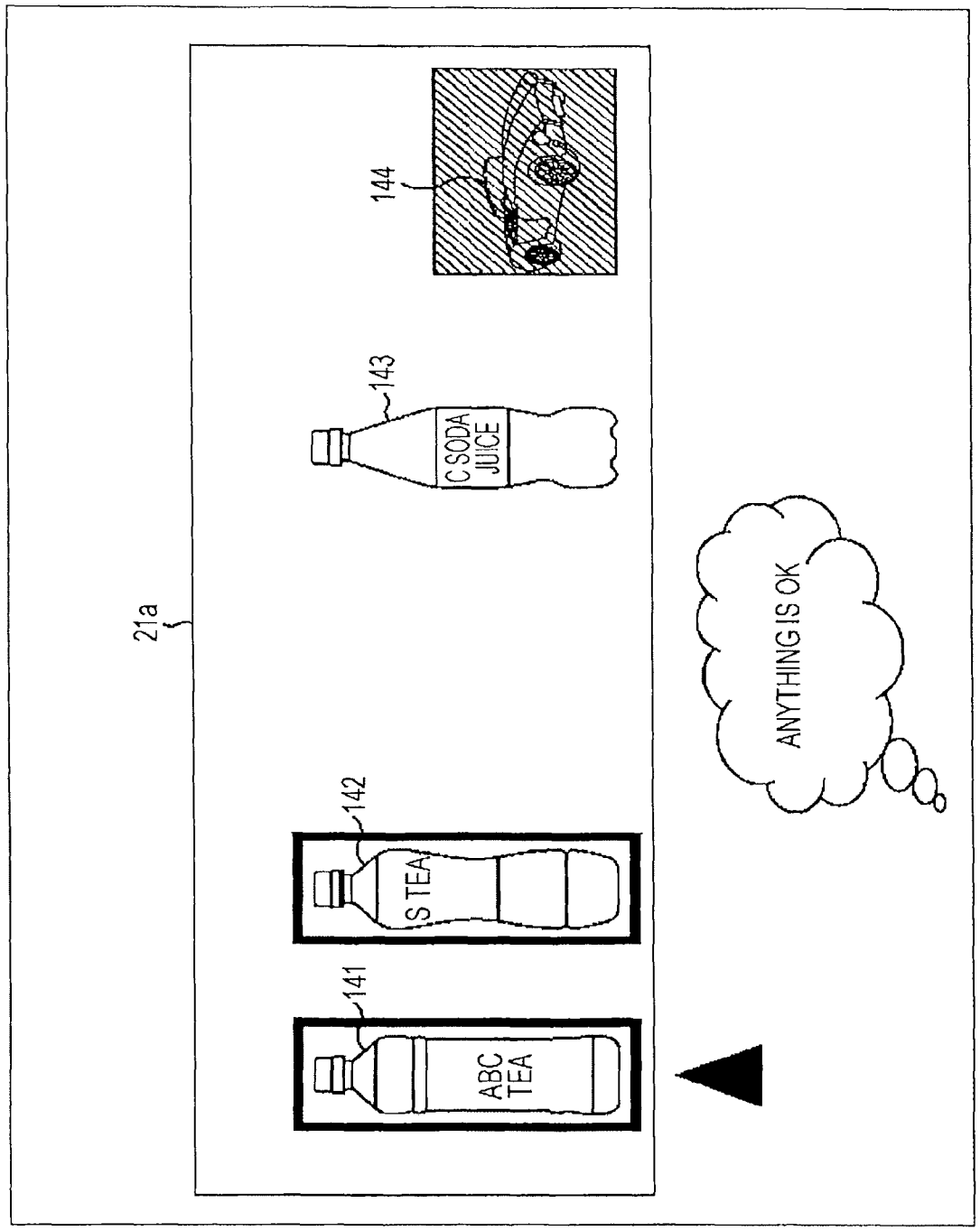
FIG. 27 is a fifteenth view illustrating an example of a display screen on which a display based on information from a robot is displayed.

Further, for example, on the display screen 21a shown in FIG. 27, a heavy-lined rectangle indicating that the robot 22 recognizes both the object "ABC tea" corresponding to the object image 141 and the object "S tea" corresponding to the object image 142 as targets is displayed.

In addition, for example, on the display screen 21a shown in FIG. 27, a triangle indicating that the robot 22 is going to return with the object "ABC tea" is displayed.

Therefore, the user predicts that the robot 22 is wondering which object "ABC tea" or "S tea" to bring but is going to tentatively return with the object "ABC tea".

If the object "ABC tea" or the object "S tea" makes no difference to the user, the user does not need to manipulate the instructing device 21 and just waits until the robot 22 brings the object "ABC tea" or the object. "S tea".

Further, for example, on the display screen 21a of FIG. 27, since the triangle is not displayed and the object "ABC tea" or the object "S tea" makes no difference to the user, if the user wants to have the object quickly, it is preferable that the user instruct die robot 22 to bring the object "ABC tea".

Figure 28:
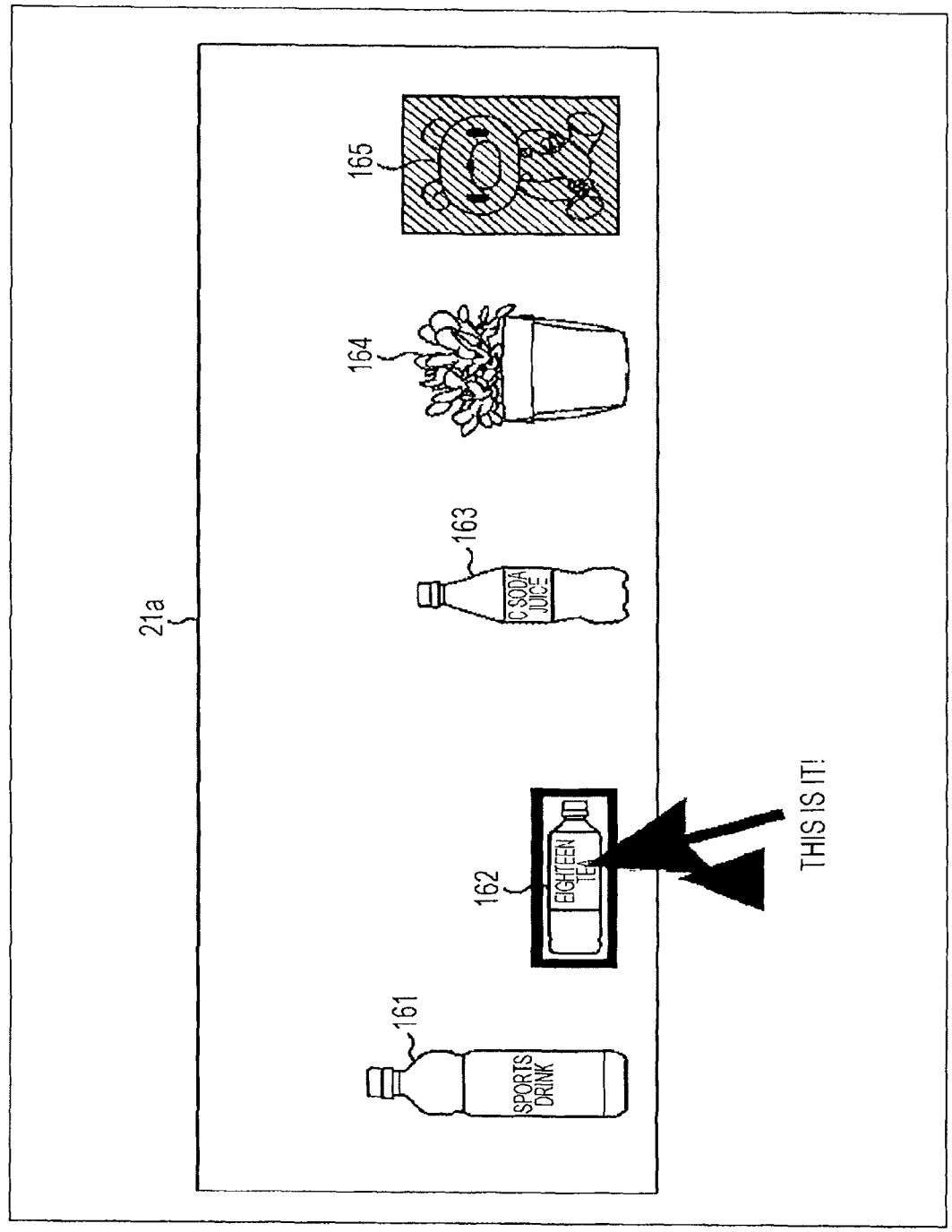
FIG. 28 is a sixteenth view illustrating an example of a display screen on which a display based on information from a robot is displayed.

Therefore, for example, the instructing device 21, as shown in FIG. 28, may indicate the object image 162 corresponding to the object "eighteen tea" that the user wants to have by the user's manipulation, among the object images 161 to 165 displayed on the display screen 21*a*.

Further, in FIG. 28, for example, when the triangle is not displayed, as the object image 162 corresponding to the object "eighteen tea" that the user wants to have is indicated by the user's manipulation, the object image 162 enclosed by the heavy-lined, rectangle and indicated by the triangle is displayed on the display screen. 21*a*.

Figure 29:
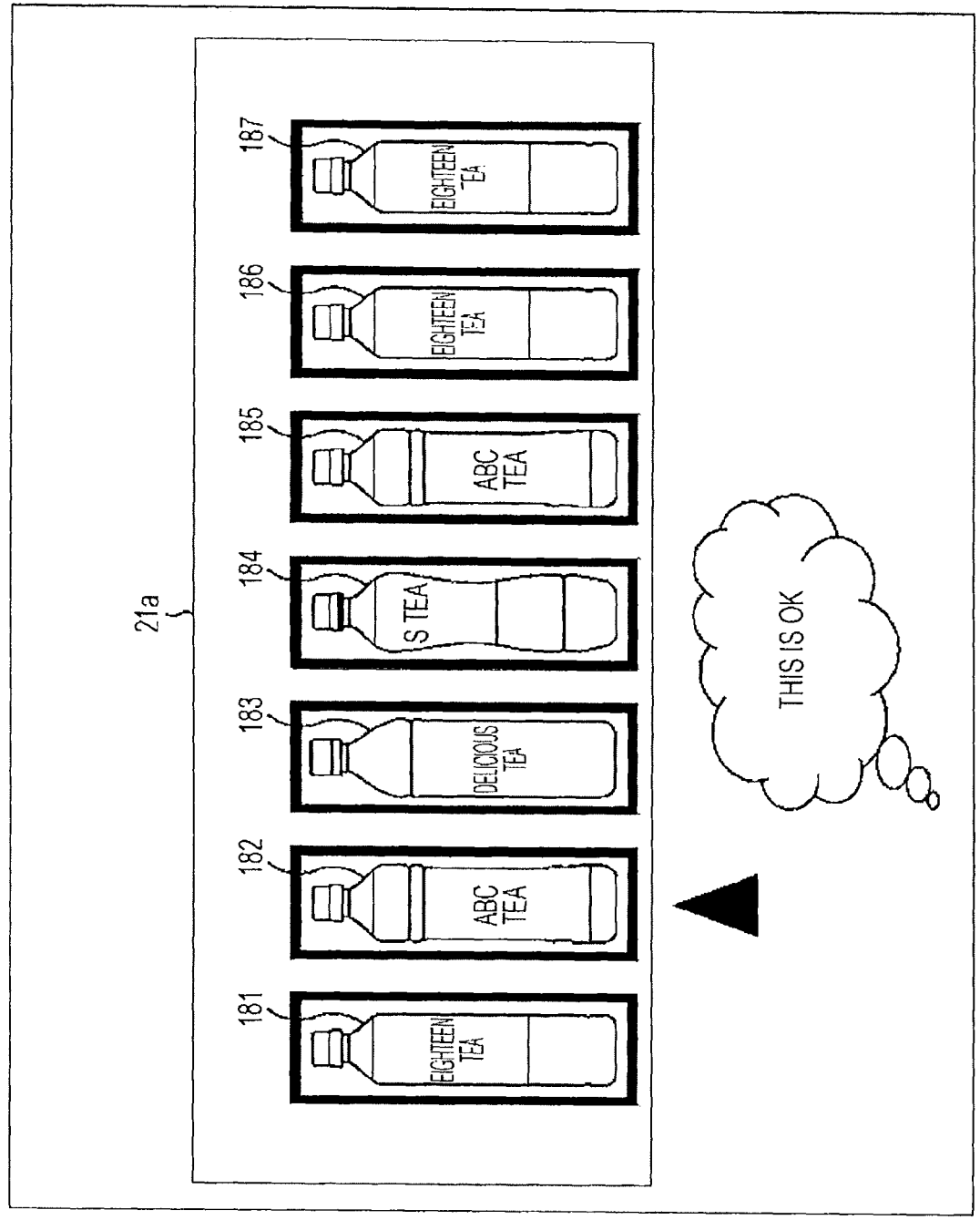
FIG. 29 is a seventeenth view illustrating an example of a display screen on which a display based on information from a robot is displayed.

In addition, for example, if the triangle indicating foe object "ABC tea" corresponding to the object image 182 among the object images 181 to 187 is displayed on the display screen 21*a* shown in FIG. 29, it is predicted that the robot 22 returns with the object "ABC tea".

If the user wants to have the object "S tea", not the object "ABC tea", the user manipulates the manipulating unit 41 of the instructing device 21 to instruct the robot 22 to bring the object "S tea" corresponding to the object image 184 instead of the object "ABC tea".

Figure 30:
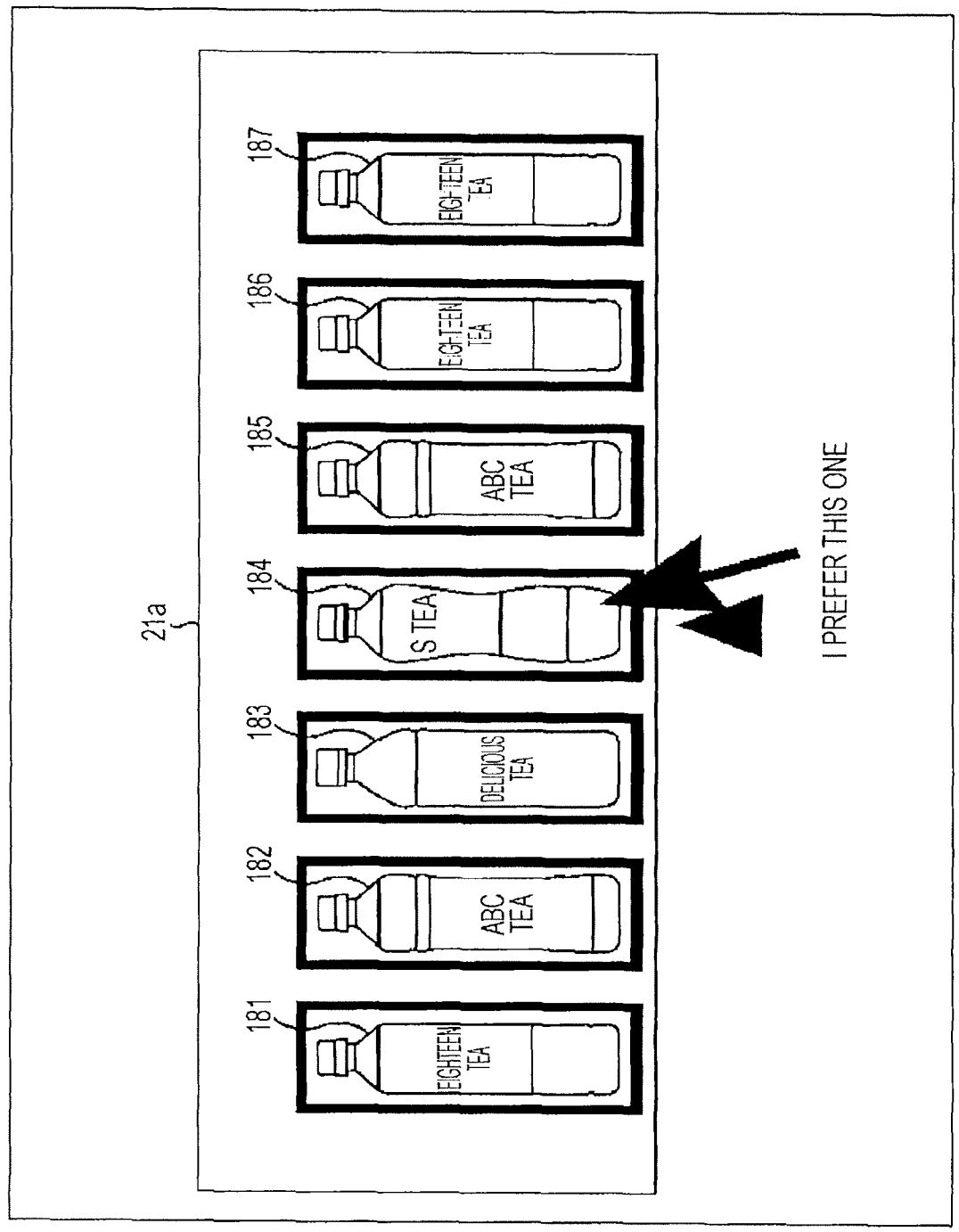
FIG. 30 is an eighteenth view illustrating an example of a display screen on which a display based on information from a robot is displayed.

That is, for example, as shown in FIG. 30, the user may specify the object image 184 on the display screen 21*a* using a pointer (arrow) to instruct the robot 22 to bring the object "S tea" corresponding to the object image 184.

As a result, on the display screen 21*a*, instead of the triangle (FIG. 29) indicating the object "ABC tea" corresponding to the object image 182, a triangle (FIG. 30) indicating the object "S tea" corresponding to the object image 184 is displayed.

3. Second Embodiment

[Example when user who watches display screen 21*a* instructs robot 22]

Next, FIGS. 31 to 38 illustrate an example where the user performs a feedback operation for instructing the robot 22 by manipulating the manipulating unit 41 of the instructing device 21.

Figure 31:
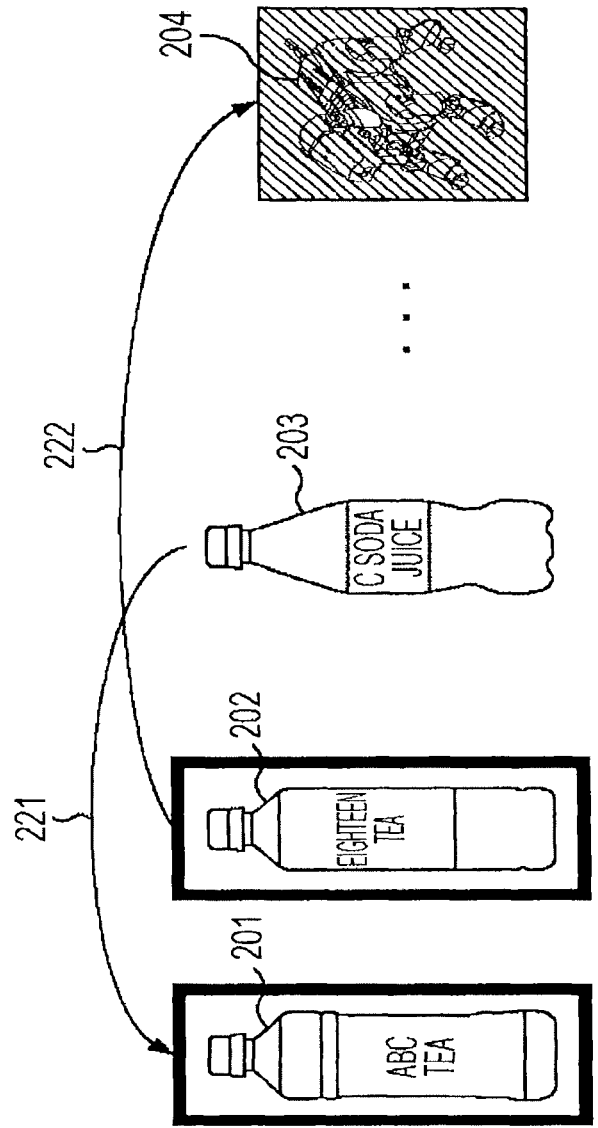
FIG. 31 is a view for explaining a feedback operation by a user.

FIG. 31 illustrates an example where the user performs the feedback operation using the manipulating unit 43 of the instructing device 21 by referring to the display screen 21*a* of the instructing device 21.

In FIG. 31, the object images 201 to 204 displayed on the display screen 21*a* are shown. Further, the object images 201 to 202 are enclosed by a rectangle indicating that the robot 22 recognizes the object, "as a target".

Further, the object image 203 is displayed as it is, and the recognition status of the robot 22 for the object "C soda juice" is "not sure yet". In addition, hatched lines indicating that the recognition status of the robot 22 is "the object is not a target" are added to the object image 204.

The user may use the manipulating unit 41 of the instructing device 215 for example, to perform a feedback operation that changes the recognition status of the object "C soda juice" indicated by the object image 203 from "not sure yet" into "this is a target" as shown by an arrow 221.

Further, for example, the user may use the manipulating unit 41 of the instructing device 21 to perform a feedback operation that changes the recognition status of the object "eighteen tea" indicated by the object image 202 from "this is a target" into "this is not a target" as shown by an arrow 222.

The control unit 42 creates corresponding feedback information in accordance with the manipulating signal from the manipulating unit 41 corresponding to the feedback operation and supplies the information to the communicating unit 44. The communicating unit 44 supplies the feedback information front the control unit 42 to the robot 22.

The robot 22 recalculates the score of the object based on the feedback information from the communicating unit 44 and changes the recognition status of the objects based on the score obtained from the result.

Figure 32:
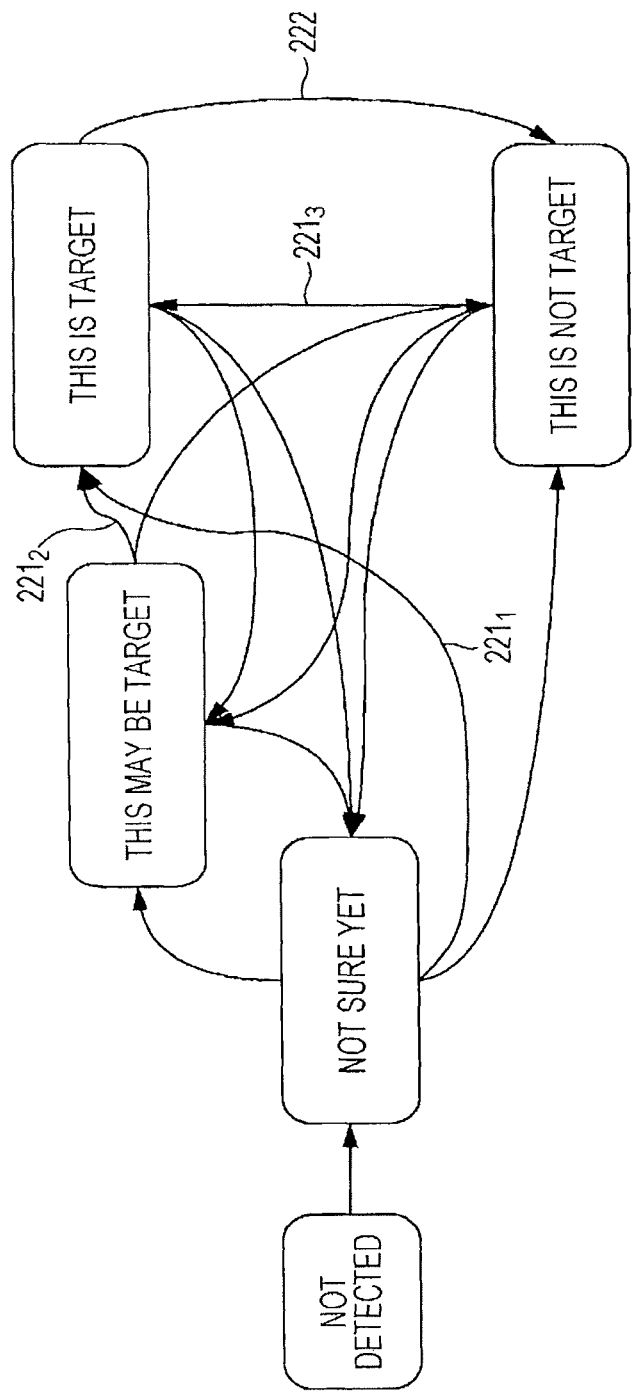
FIG. 32 is a view illustrating an example where a recognition status of an object is transited in response to the feedback operation.

Next, FIG. 32 illustrates an example where the control unit 66 of the robot 22 changes the recognition status of the object in accordance with the feedback information from the instructing device 21.

For example, in the instructing device 21, if the user uses the manipulating unit 41 to perform the feedback operation the manipulating unit 41 supplies the manipulating signal corresponding to the feedback operation to the control unit 42.

The control unit 42 creates the feedback information based on the manipulating signal from the manipulating unit 41 and supplies the information to the communicating unit 44. The communicating unit 44 transmits the feedback information from the control unit 42 to the robot 22.

In this case, as shown in FIG. 31, for example, it is considered that the user uses the manipulating unit 41 of the instructing device 21 to perform the feedback operation that changes the recognition status of the object "C soda juice" indicated by the object image 203 from "not sure yet" into "this is a target" as shown by an arrow 221.

In this case, in the robot 22, the control unit 66 recalculates the score of the object "C soda juice" based on the feedback information supplied through the communicating unit 61 from the communicating unit 44 of the instructing device 21.

As a result, the control unit 66 determines (changes) the recognition status of the object "C soda juice" from "not sure yet" into "this is a target" as shown by an arrow $221_1$ based on a new score obtained by recalculation.

Further, when the feedback operation that changes the recognition status of the object from "this may be a target" into "this is a larger" is performed as a feedback operation, the control unit 66 performs the following processing. That is, for example, the control unit 66 determines the recognition status of the object from "this may be a target" into "this is a target" as shown by an arrow $221_2$ based on the feedback information from the communicating unit 61.

In addition, when the feedback operation that changes the recognition status of the object from "this is not a target" into "this is a target" is performed as a feedback operation, the control unit 66 performs the following processing. That is, for example, the control unit 66 determines the recognition status of the object from "this is not a target" into "this is a target" as shown by an arrow $221_3$ based on the feedback information from the communicating unit 61.

Further, for example, as shown in FIG. 31, it is considered that the user uses the manipulating unit 41 of the instructing device 21 to perform the feedback operation that changes the recognition status of the object "eighteen tea" indicated by the object image 202 from "this is a target" into "this is not a target" as shown by the arrow 222.

So this case, as shown in FIG. 32, the control unit 66 determines the recognition status of the object "eighteen tea" from "this is a target" into "this is not a target" as shewn by the arrow 222 based on the feedback information from the communicating unit 61.

[Example of Feedback Operation]

Next, referring to FIGS. 33 to 38, an example where a user performs the feedback operation by referring to the display screen 21*a* of the instructing device 21 will be described.

Figure 33:
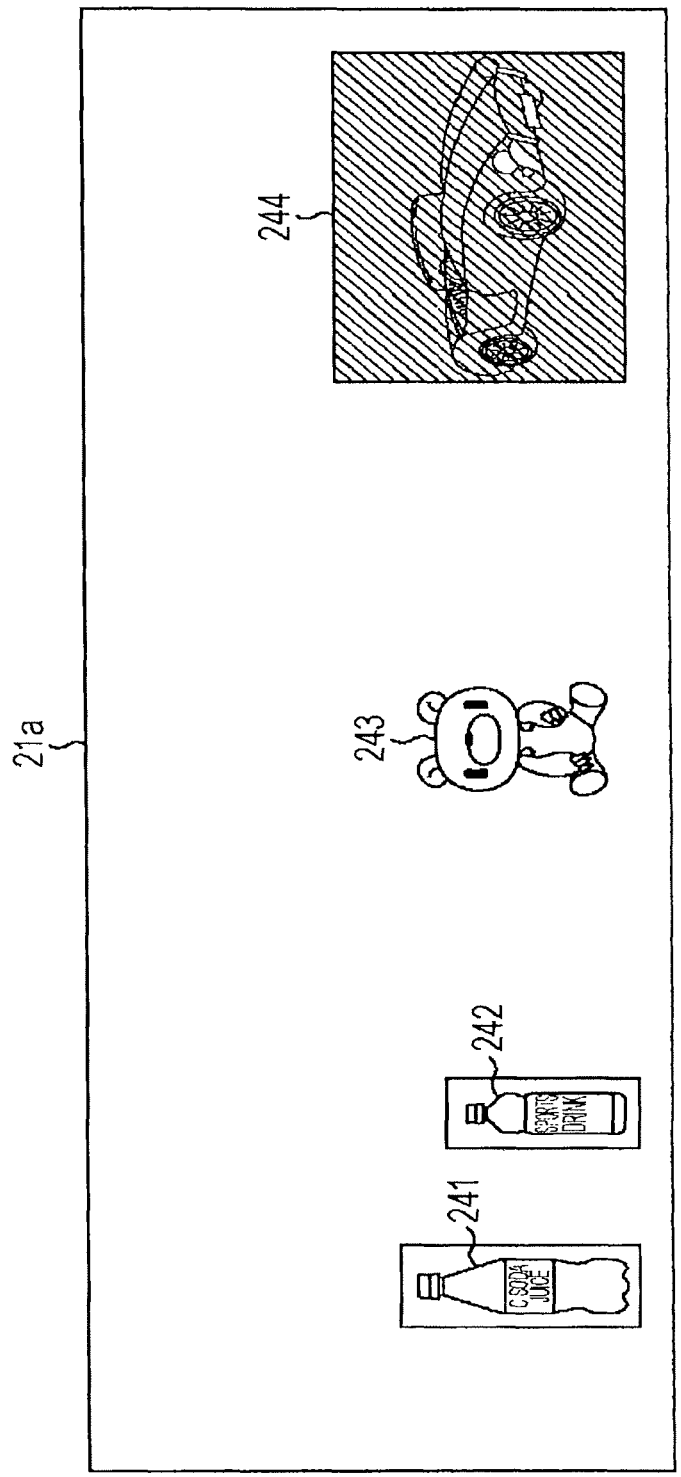
FIG. 33 is a nineteenth view illustrating an example of a display screen on which a display based on information from a robot is displayed.

In the instructing device 21, the control unit 42 allows the robot recognition image including, for example, object images 241 to 244 to be displayed on the display screen 21*a* of the display unit 43, as shown in FIG. 33, based on the robot recognition information supplied through the communicating unit 44 from the robot 22.

Further, when the robot 22 recognizes an object "sports drink" indicated by the object image 242 "as a target", the control unit 42 allows the robot recognition image to be displayed on the display screen 21a based on the robot recognition information transmitted through the communicating unit 44 from the robot 22.

Figure 34:
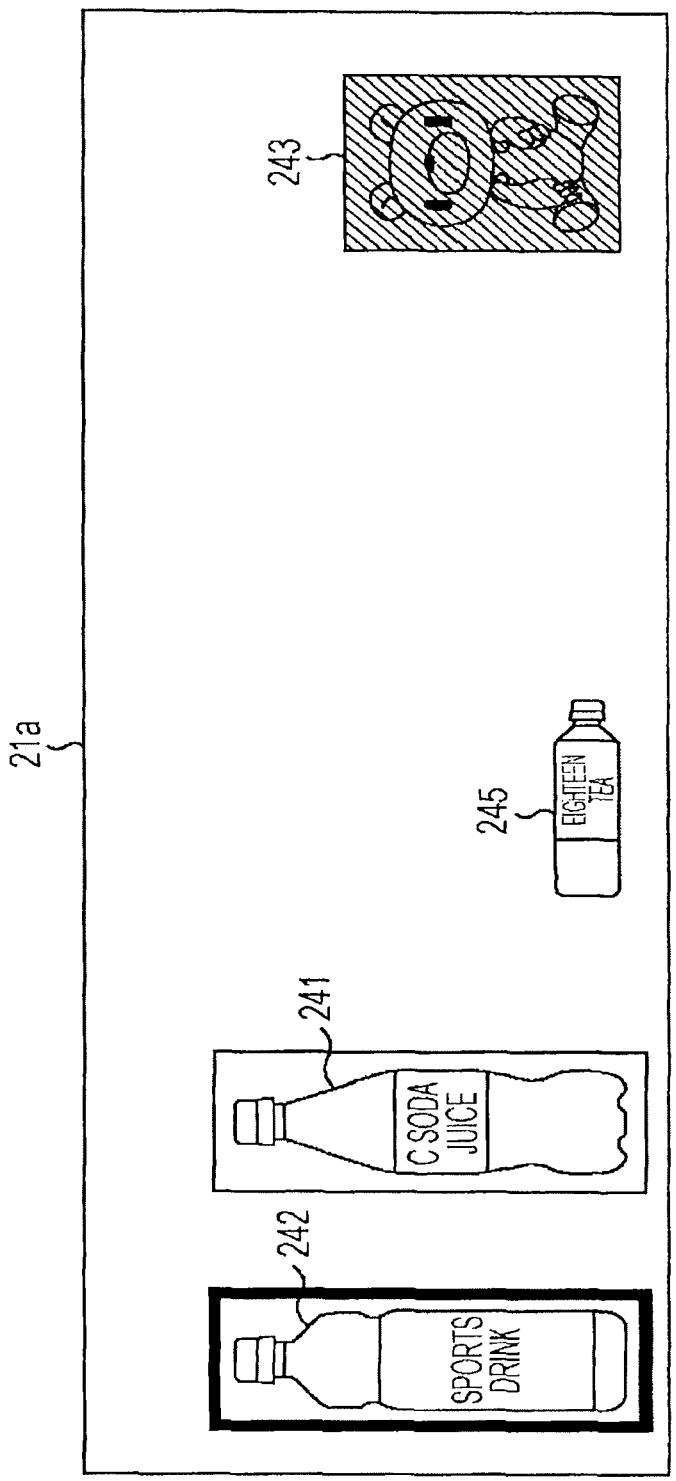
FIG. 34 is a twentieth view illustrating an example of a display screen on which a display based on information from a robot is displayed.

As a result, on the display screen 21a, as shown in FIG. 34, a robot recognition image including the object images 241 to 244 is displayed.

On the display screen 21a shown in FIG. 34, it is predicted that the robot 22 recognizes, as a target, the object "sports drink" (an object indicated by the object image 242), which is different from the object "eighteen tea" (object indicated by the object image 245) that the user wants to have.

Further, when the robot 22 behaves to bring the object "sports drink" as a target, the control unit 42 allows the robot recognition image to be displayed on the display screen 21a based on the robot recognition information transmitted through the communicating unit 44 from the robot 22.

Figure 35:
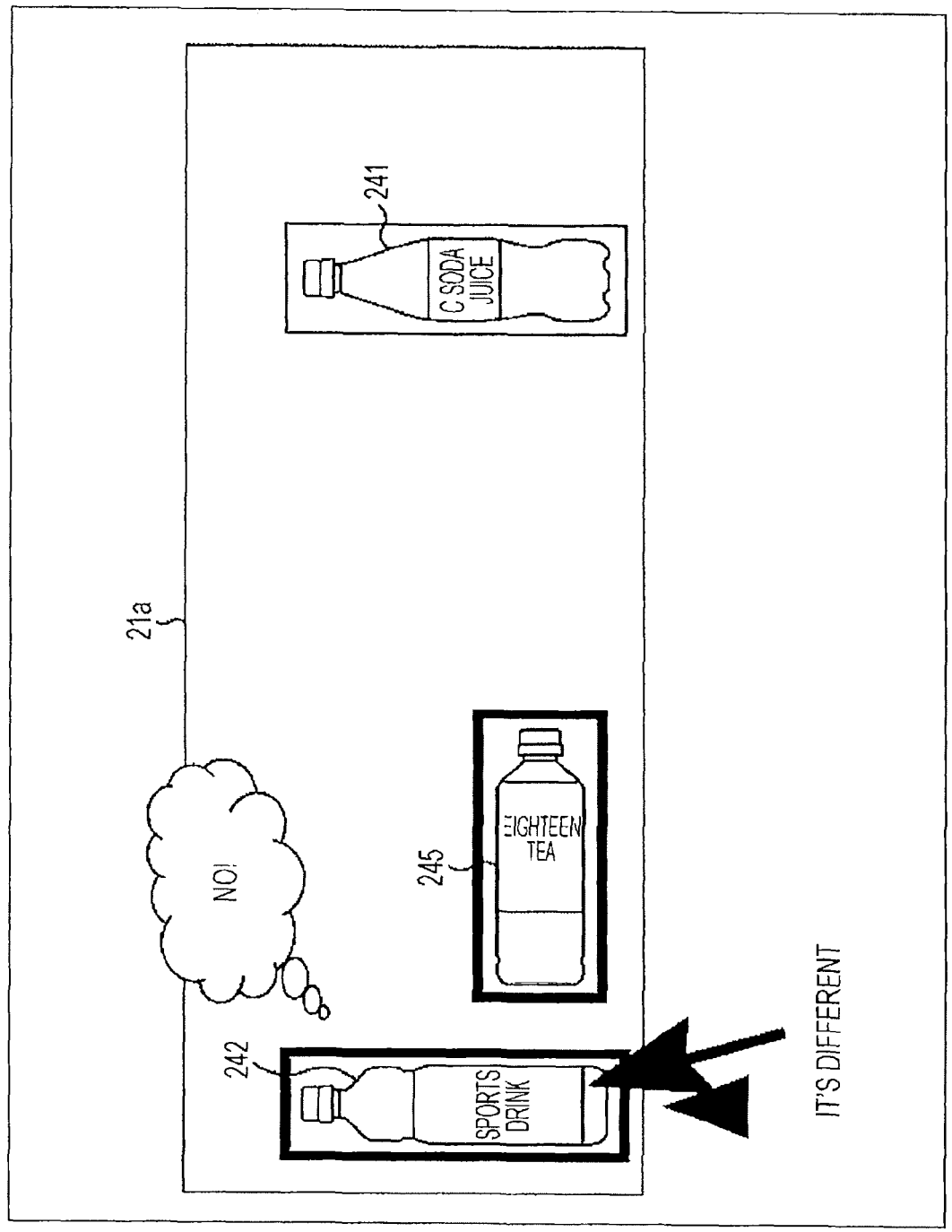
FIG. 35 is a twenty-first view illustrating an example of a display screen on which a display based on information from a robot is displayed.

As a result, the display screen 21a, as shown in FIG. 35, displays the object image 242 added with a triangle indicating that the robot 22 brings the object "sports drink" as a target.

In this case, as shown in FIG. 35, the user uses the manipulating unit 41 of the instructing device 21 to perform the feedback operation indicating that the object "sports drink" is not a target, in this case, the manipulating unit 41 supplies the manipulating signal corresponding to the feedback operation of the user to the control unit 42.

The control unit 42 creates the feedback information based on the manipulating signal from the manipulating unit 41 and supplies the information to the communicating unit 44. The communicating unit 44 transmits the feedback information from the control unit 42 to the robot 22. In this case, for example, the robot 22 (control unit 66) recalculates a score of the object "sports drink" based on the feedback information from the communicating unit 44.

As a result, the score of the object "sports drink" is lower than, for example, the score of the object "eighteen tea" and the robot 22 behaves to bring the object "eighteen tea" as a target. Further, the robot 22 changes the recognition status of the object "sports drink" from "this is a target" to "this is not a target" based on the recalculated score.

In this case, in the instructing device 21, the control unit 42 allows the robot recognition image to be displayed m the display screen 21a based on the robot recognition information transmitted through the communicating unit 44 from the robot 22. Further, the robot recognition information includes at least the score recalculated based on the feedback information in accordance with the feedback operation of the user.

Figure 36:
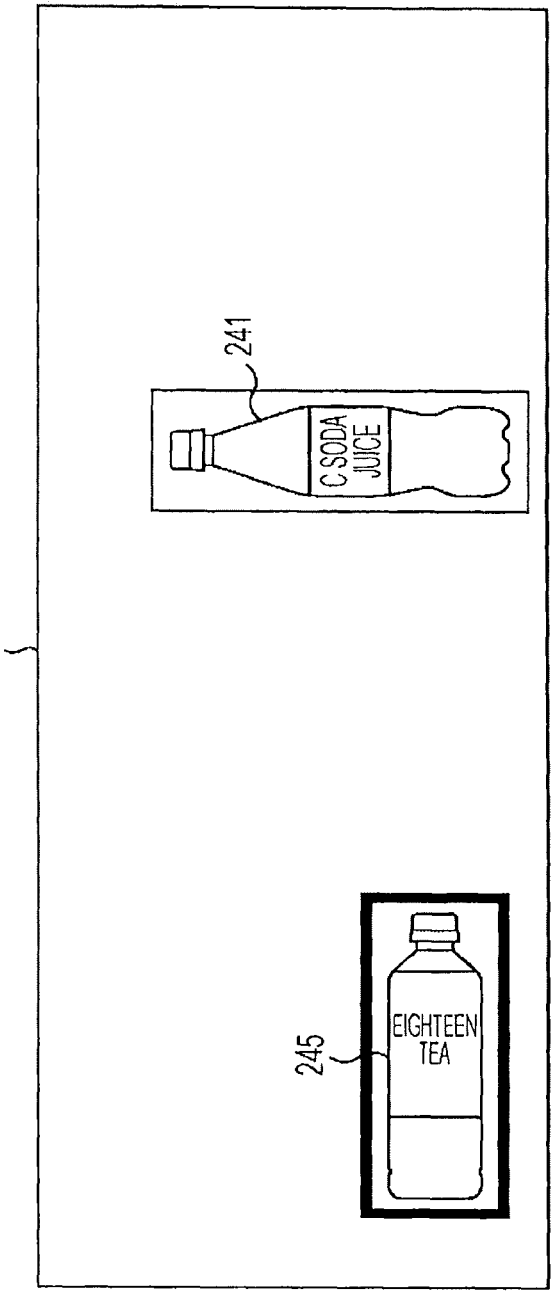
FIG. 36 is a twenty-second view illustrating an example of a display screen on which a display based on information from a robot is displayed.

As a result, the display screen 21a, as shown in FIG. 36, displays the object image 245 added with the triangle indicating that the robot brings the object "eighteen tea" as a target.

Figure 37:
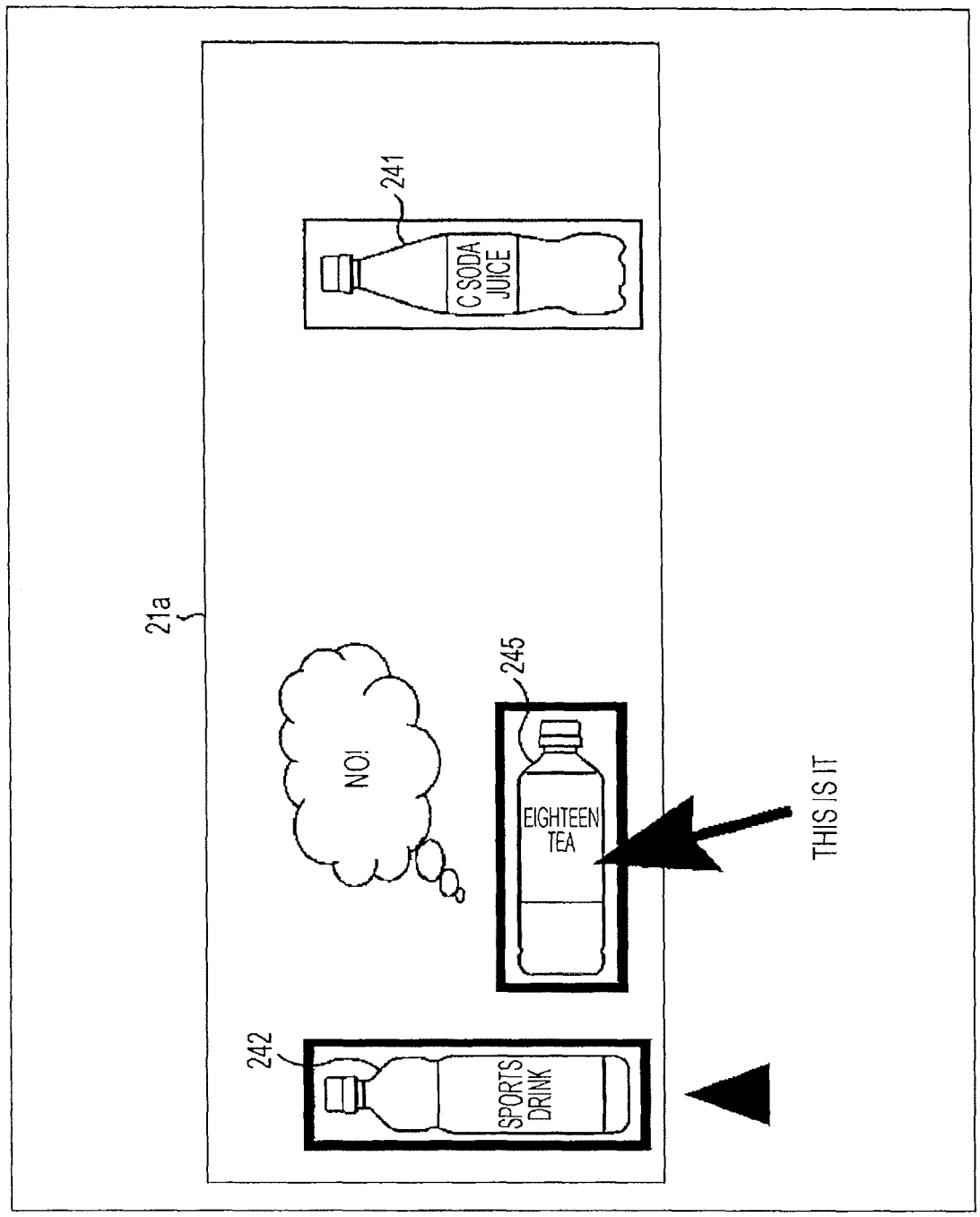
FIG. 37 is a twenty-third view illustrating an example of a display screen on which a display based on information from a robot is displayed.

Further, the user may perform, for example, a feedback operation indicating that the object "eighteen tea" is a target, as shown in FIG. 37, in addition to the feedback operation indicating that the object "sports drink" is not a target, In this case, for example, the robot 22 (control unit 66) recalculates the score of the object "eighteen tea" based on the feedback information from the communicating unit 44. As a result, the score of the object "eighteen tea" is higher than, for example, the score of the object "sports drink" and the robot 22 behaves to bring the object "eighteen tea" as a target.

In contrast the control unit 42 of the instructing device 21 allows the robot recognition image to be displayed on the display screen 21a based on the robot recognition information transmitted through the communicating unit 44 from the robot 22.

Figure 38:
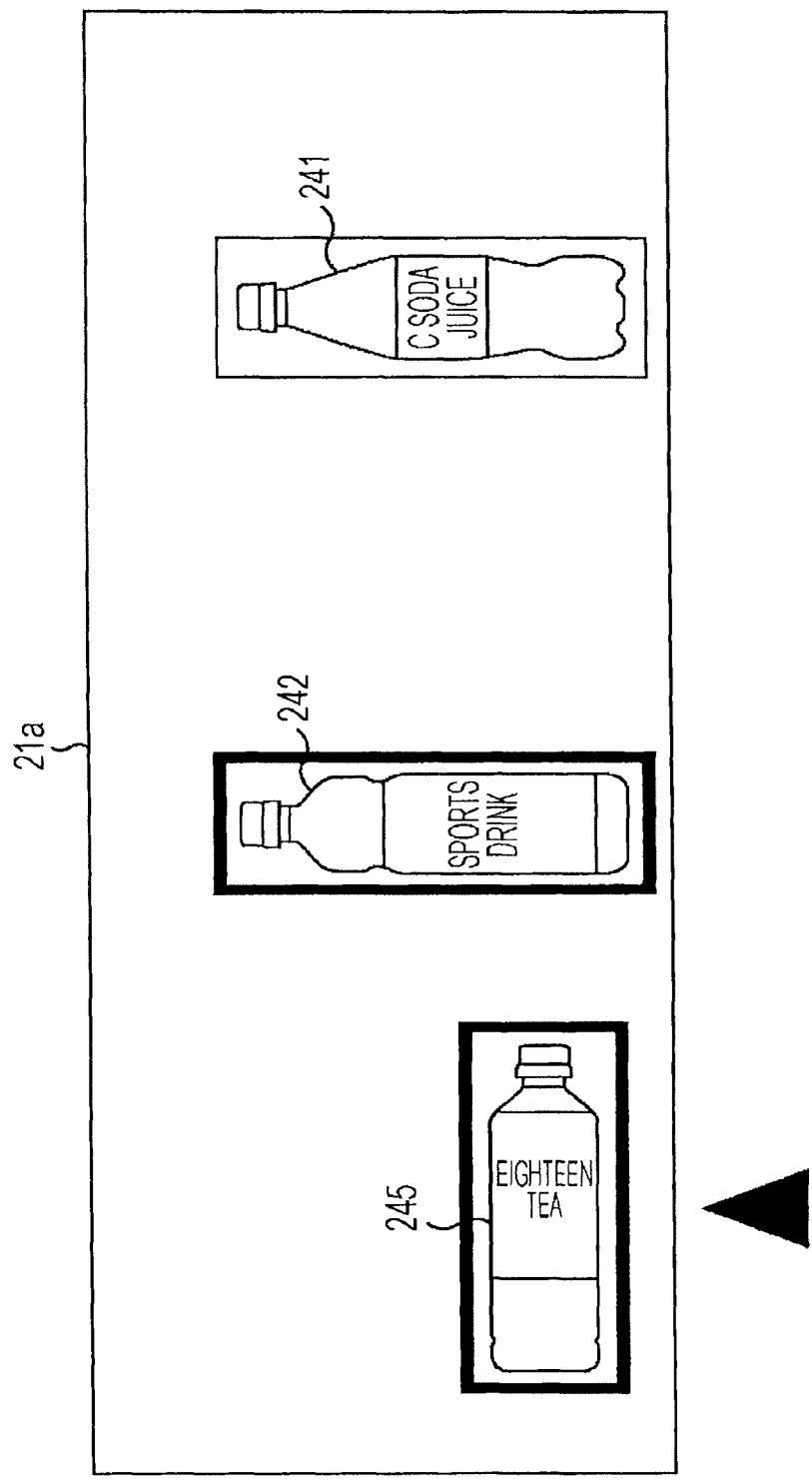
FIG. 38 is a twenty-fourth view illustrating an example of a display screen on which a display based on information from, a robot is displayed.

As a result the display screen 21a, as shown in FIG. 38, displays the object image 245 added with the triangle indicating that the robot brings the object "eighteen tea" as a target.

Further, for example, if it is indicated that the object is not a target by the feedback operation, it is considered that the user uses die manipulating unit 41 to designate the object (object Image thereof) which is not a target and make the designated object as a target.

In this case, the control unit 42 creates feedback information indicating that the object designated by the user is not a target.

Further, for example, if it is indicated that the object is not a target by the feedback operation, it is considered that the user uses the manipulating unit 41 to designate the object (object image thereof) which is a target and make the object that is not designated an object that is not a target.

In this case, the control unit 42 creates feedback information indicating that the object that is not designated by the user is not a target.

Further, the object may be designated by enclosing, with a frame, the object on the display screen 21a that is wanted to be designated. In addition, when the manipulating unit 41 includes a mouse, the user moves a cursor or the like to the object on the display screen 23a to be designated and clicks the left button of the mouse (single clicking or double clicking) to designate the object.

In addition, if the instructing device 21 is a personal computer, and a control key and a shift key are provided as the manipulating unit 41, the control key and the shift key are used together to click the left button to designate a plurality of objects.

Further, for example, after designating the object, the user may select an option "this is not a target" among the displayed options "this is a target", "this is not a target", and the like by clicking a right button of a mouse and perform the feedback operation indicating that the designated object is not a target.

In addition, for example, the user may click the designated object again with the left button of the mouse to cancel the designation of the object. In addition, for example, the user may select an object by clicking the left button to perform a dumping operation that dumps the object outside the frame of die display screen 21a as the feedback operation indicating that the object is "not a target".

For example, when the manipulating unit 41 includes an "Enter" key, a pressing operation that presses the "Enter" key while the object is designated may be adopted as the feedback operation indicating that tire designated object is a target.

Further, for example, when the manipulating unit 41 includes a "Delete" key, a pressing operation that presses the "Delete" key while the object is designated may be adopted as the feedback operation indicating that the designated object is not a target.

In addition, for example, when the manipulating unit 41 includes a "Tab" key, whenever the user presses the "Tab" key, the focus displayed on the display screen 21a may be moved.

The same applies to a case where the feedback operation indicating that the designated object is a target is performed.

[Regarding Feedback Processing Performed By Instructing Device 21]

Figure 39:
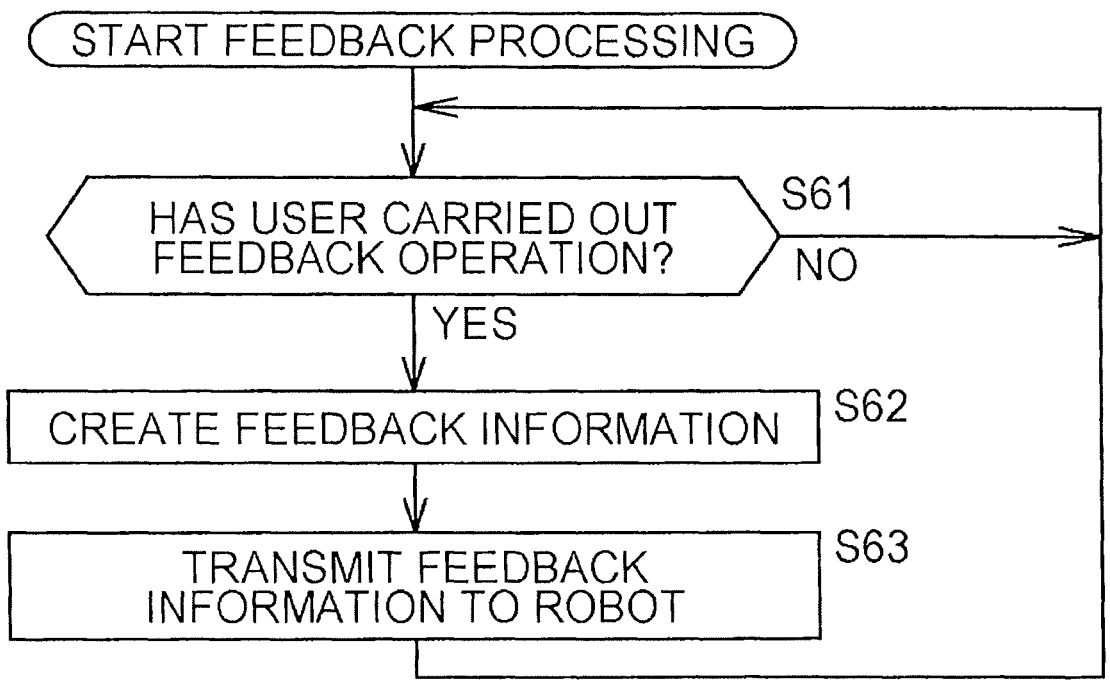
FIG. 39 is a flowchart for explaining feedback processing carried out by an instructing device.

Next, referring to the flowchart of FIG. 39, the feedback processing performed by the instructing device 21 will be described.

Further, the feedback processing, for example, starts when the power of the instructing device 21 is turned on. In addition, the object image is displayed on the display screen 21a.

In step S61, the control unit 42 judges whether the feedback operation by the user has been performed based on whether the manipulating signal corresponding to the feedback operation has been supplied from the manipulating unit 41. The control unit 42 repeats the processing of step S61 until it is judged that the feedback operation by the user has been performed.

In step S61, if it is judged that the feedback operation by the user has been performed based on whether the manipulating signal corresponding to the feedback operation has been supplied, the control unit 42 causes the processing to proceed to step S62.

In step S62 the control unit 42 creates the feedback information based on the feedback operation by the user and supplies the information to the communicating unit 44.

In step S63, the communicating unit 44 transmits the feedback information from the control unit 42 to the robot 22 using the wireless communication or the like and returns the processing to step S61 and then repeats the same processing. Note that the feedback processing, for example, ends when the power of the instructing device 21 is turned off.

As described above, according to the feedback processing, in accordance with the feedback operation by the user, it is possible to indicate that the object displayed on the display screen 21a is a target.

Therefore, for example, if the robot 22 recognizes an object that is not a target as a target, it is possible to feed back to the robot 22 that the object is not a target using the instructing device 21.

[Regarding Score Recalculation Processing That Is Performed By Robot 22]

Figure 40:
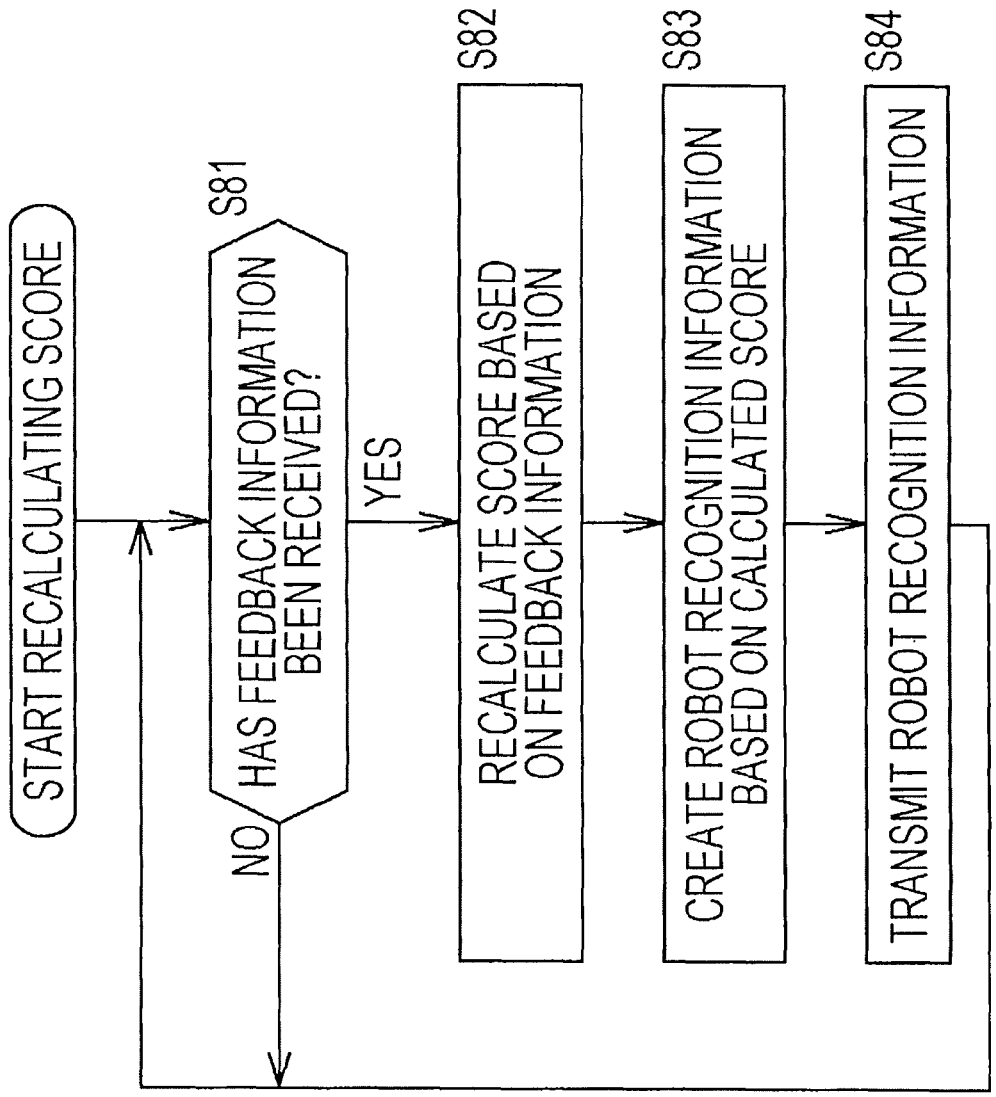
FIG. 40 is a flowchart for explaining score recalculation processing carried out by a robot.

Next, referring to the flowchart of FIG. 40, the score recalculation processing performed by the robot 22 will be described.

The score recalculation processing, for example, starts when the power of the robot 22 is turned on.

In step S81, the communicating unit 61 repeats the processing of step S81 until the feedback information from the instructing device 21 is received. In step S81, when, the communicating unit 61 receives the feedback information from the instructing device 21, the communicating unit 61 supplies the received feedback information to the control unit 66 and causes the processing to proceed to step S82.

In step S82, the control unit 66 recalculates the score of the object based on the feedback information from the communicating unit 61 and causes the processing to proceed to step S83.

In step S83, the control unit 66 creates the robot recognition information based on the recalculated score and supplies the information to the communicating unit 61 and causes the processing to proceed to step S84.

In step S84, the communicating unit 61 transmits the robot recognition information front the control unit 66 to the instructing device 21 using the wireless communication or the like and returns the processing to step S81 and then repeats the same processing. Further, the score recalculation processing, for example, ends when the power of the robot 22 is turned off.

As described above, according to the score recalculation processing, the score is recalculated based on the feedback information from the instructing device 21 so that the score to which the feedback from the user is reflected may be calculated.

4. Modified Example of Second Embodiment

In the second embodiment, referring to the display screen 21a, the user performs a feedback operation indicating that a predetermined object is a target or is not a target. However, the feedback operation by the user is not limited thereto.

Figure 41:
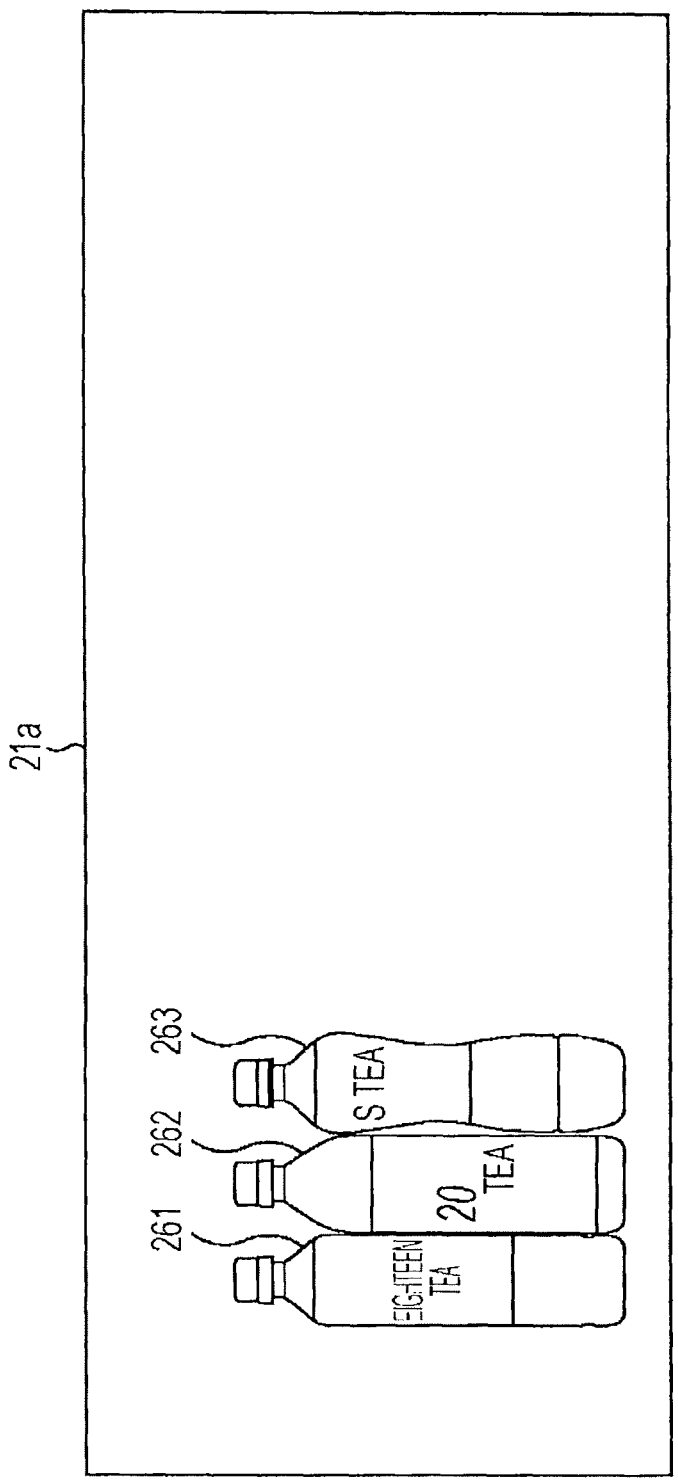
FIG. 41 is a twenty-fifth view illustrating an example of a display screen on which a display based on information from a robot is displayed.

That is, for example, when objects 261 to 263 are displayed, as shown in FIG. 41, on the display screen 21a as one object, the robot 22 recognizes the objects 261 to 263 as one object.

In this case, the user may use the manipulating unit 41 of the instructing device 21, for example, to perform the feedback operation specifying an area on which one object is displayed and allow the robot 22 to recognize the objects 261 to 263 as one object, Further, if the manipulating unit 41 includes a mouse, the feedback operation specifying an area on which one object is displayed, for example, is performed using the mouse to specify the area on which one object is displayed and select an option "separate" to be displayed by clicking the right button.

Then, the control unit 42 creates die feedback information as the manipulating signal corresponding to the feedback operation is supplied from the manipulating unit 43 and supplies the information to the communicating unit 44. The communicating unit 44 transmits the feedback information from the control with 42 to the robot 22 by the wireless communication or the like.

In the robot 22, the communicating unit 61 supplies the feedback information from foe communicating unit 44 to the control unit 66. The control unit 66 recognizes each of the objects 261 to 263, which have been recognized as one object, as one object 261, 262, or 263 based on the feedback Information from the commentating unit 61.

Further, the control unit 66 calculates the scores of the objects 261, 262, and 263 each recognized as one object and creates the robot recognition information based on the calculation result and transmits the information to the instructing device 21 through the communicating unit 61.

Figure 42:
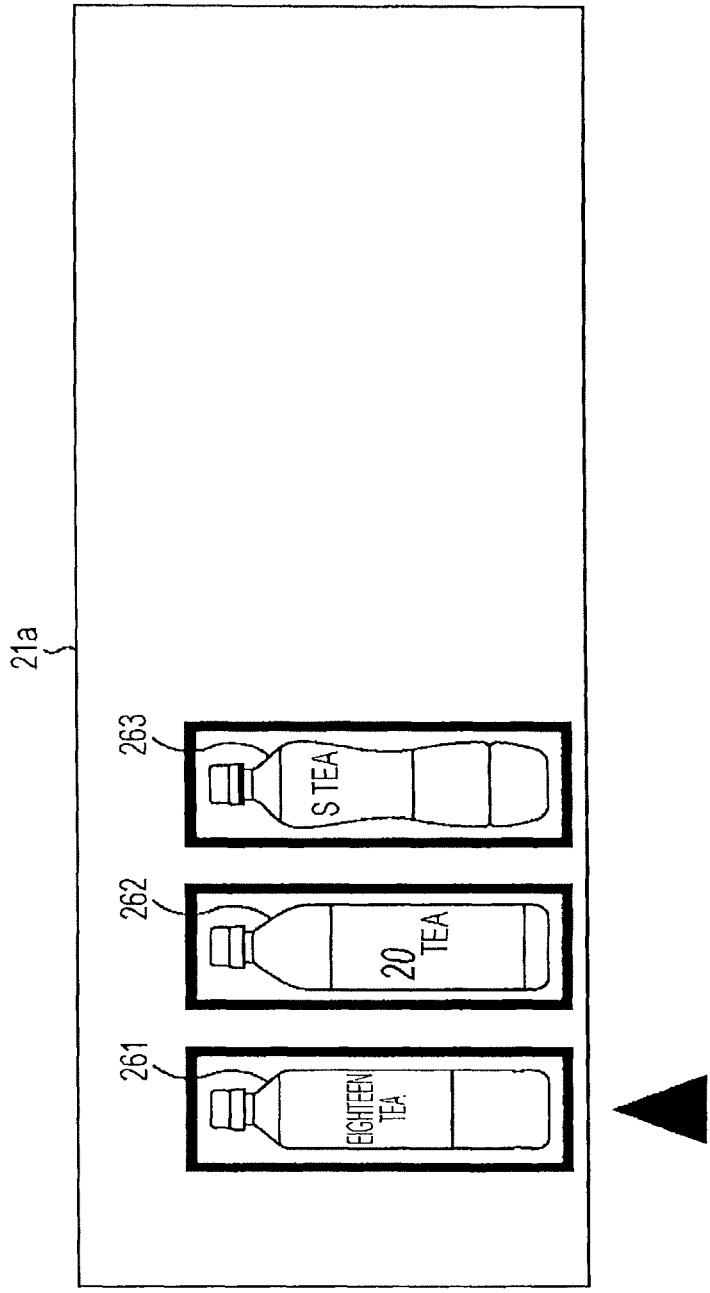
FIG. 42 is a twenty-sixth view illustrating an example of a display screen on which a display based on information from a robot is displayed.

In the instructing device 21, the control unit 42 allows the robot recognition image as shown in FIG. 42 to be displayed on the display screen 21a of the display unit 43 based on the robot recognition information transmitted through the communicating unit 44 from the communicating unit 61 of the robot 22.

Further, for example, when something that should be recognized as one object (for example, a set of knife, fork, and spoon that are simultaneously used) is separated and displayed on the display screen 21a as a plurality of objects, the user may use the manipulating unit 41 of the instructing device 21, for example, to perform the feedback operation specifying the area including the plurality of objects separated and displayed so as to allow the robot 22 to recognize the plurality of objects separated and displayed as one object.

In addition, when the manipulating unit 41 includes a mouse, the feedback operation specifying the area including the plurality of objects separated and displayed, for example, designates the areas on which the objects are displayed using the mouse to select the option "merge" displayed by clicking the right button.

Note that for example, in the second embodiment, the feedback operation is performed on the object that is displayed on the display screen 21a.

However, for example, when the object on the captured image is not detected by the control unit 66, by the area specifying operation specifying an area including an undetected object on the captured image, the robot 22 may detect (recognize) the undetected object as an object.

Figure 43:
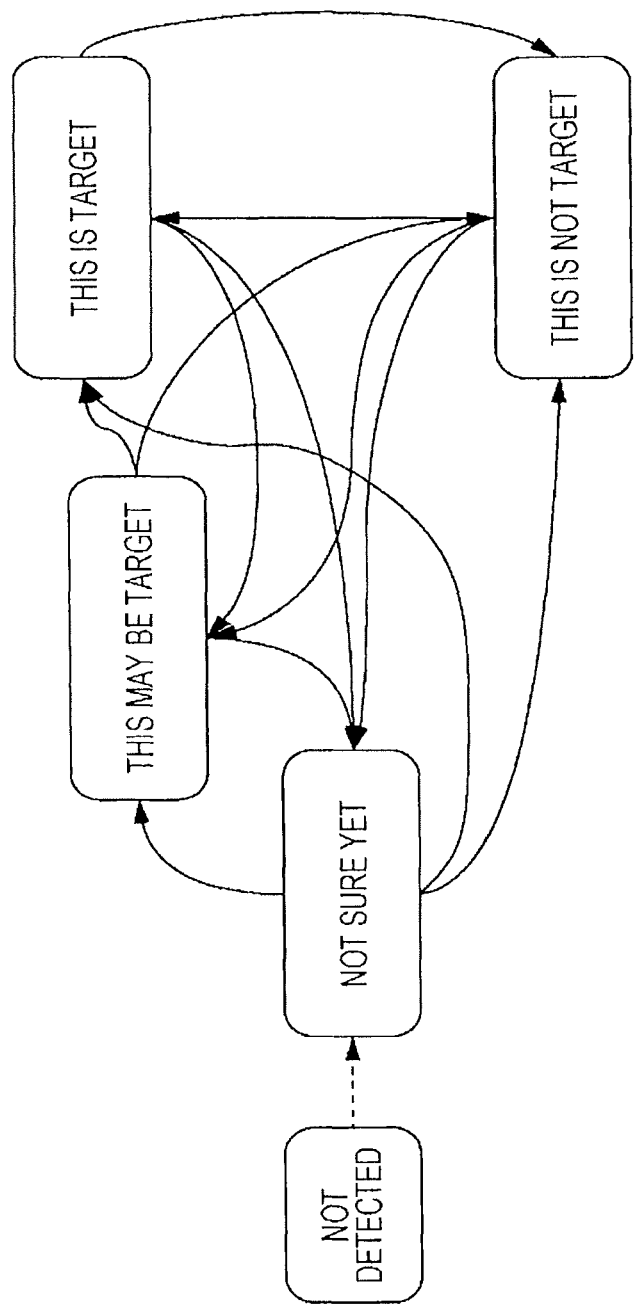
FIG. 43 is a view illustrating an example where non-detected recognition state is transited into another state.

As a result the robot 22, as shown in FIG. 43, detects the unsensed (detected) object and determines the recognition status of the detected object from "undetected" to "not sure yet".

That is, for example, the user may use the manipulating unit 41 of the instructing device 21 to perform the area specifying operation specifying the search range for the robot 22 to search the object to allow the robot 22 to search the object in the search range.

5. Third Embodiment

Figure 44:
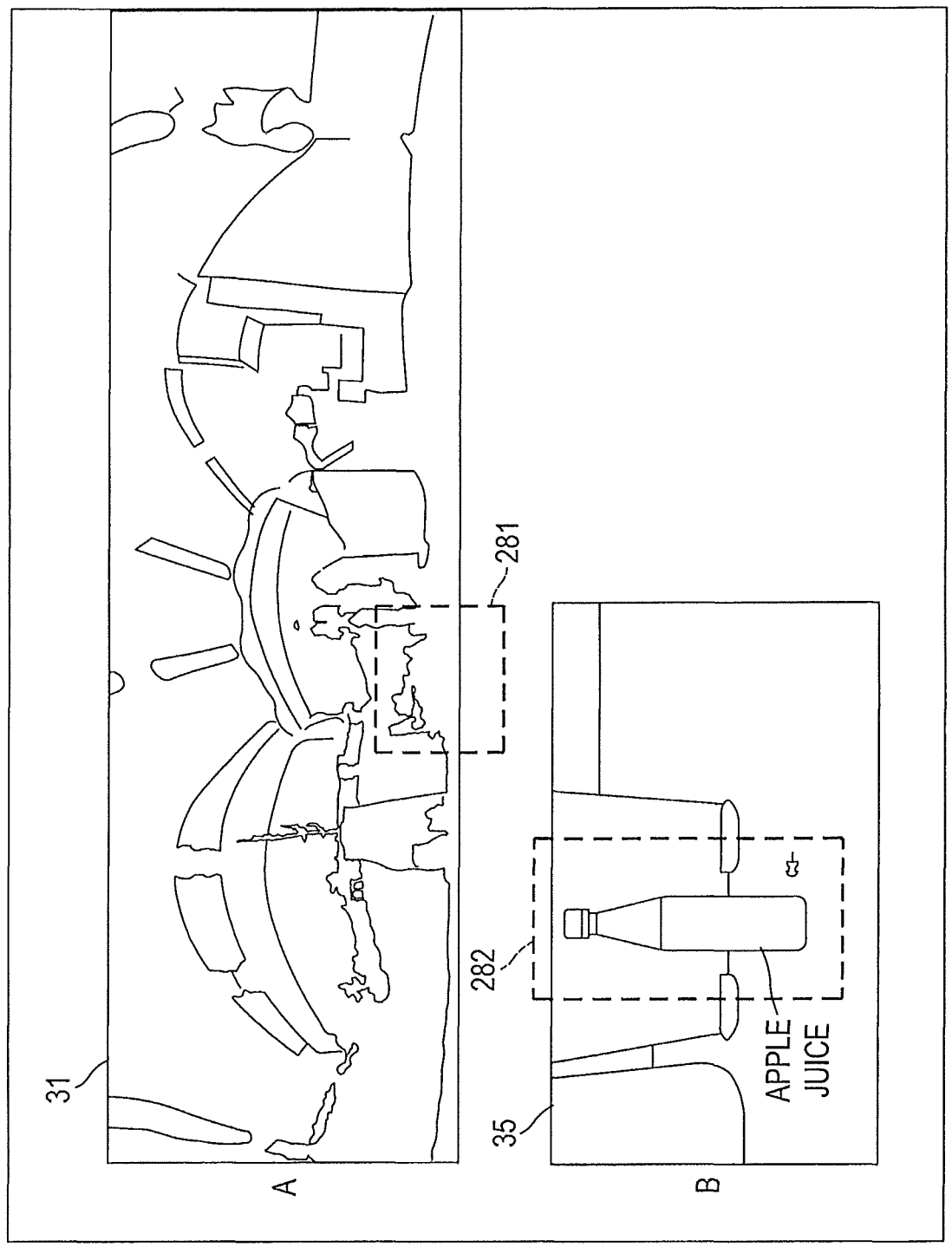
FIG. 44 is a view illustrating an example where a searching range or an object is specified using a captured image.

Next, FIG. 44 illustrates an example where the search range is specified using the captured image.

For example, when the surrounding image 31 as shown in FIG. 44A is included in the robot recognition information as the captured image, the control unit 42 of the instructing device 21 allows the surrounding image 31 to be displayed on the display screen 21a based on the robot recognition information.

In this case, the user may use the manipulating unit 41 of the instructing device 21, as shown in FIG. 44A, to perform the area specifying operation specifying a partial area 281 on the surrounding image 31 displayed on the display screen 21a as an area corresponding to the search range where the target is searched.

As a result, the manipulating unit 41 supplies the manipulating signal corresponding to the area specifying operation, of the user to the control unit 42.

The control, unit 42 creates the specified range information, indicating the partial area 281 specified by the area specifying operation of the user among all the areas on the surrounding image 31 in accordance with the manipulating signal from the manipulating unit 41 and supplies, the information to the communicating unit 44. The communicating unit 44 transmits the specified range information from the control unit 42 to the robot 22.

In contrast, the communicating unit 61 of the robot 22 receives the specified range information from the communicating unit 44 of the instructing device 21 and supplies die information to the control unit 66. The control unit 66 detects the partial area 281 on the surrounding image 31 stored in the storage unit 68 based on the specified range information from the communicating unit 61.

Then, the control unit 66 reads a plurality of three-dimensional positions associated with the objects on the partial area 281 from the storage unit 68 and calculates (specifies) the search range for searching the target based on the plurality of read three-dimensional positions.

Further, the calculating method by which the control unit 66 calculates the search range is not limited thereto. That is, for example, even though the three-dimensional positions are not associated with the partial area 281, the control unit 66 may calculate the search range from the partial area 281 or parameters indicating an effective viewing angle, an effective pixel number, a position, and an orientation of the earners 62.

In this case, a first parameter indicating the position and the orientation of the camera 62 at a capturing timing is stored in the storage unit 68 by the control unit 66 together with the capturing timing when the surrounding image 31 is obtained by capturing at the time when the camera 62 captures the image so as to be associated with the surrounding image 31. Further, a second parameter indicating the effective viewing angle and the effective pixel number of the camera 62 is stored in the storage unit 68 in advance.

That is, for example, the control unit 66 reads the first parameter indicating the position and the orientation of the camera 62 at the capturing timing when the surrounding image 31 is obtained by capturing and the second parameter indicating the effective viewing angle and the effective pixel number of the camera 62 from the storage unit 68.

Then, the control unit 66 uses the first and second parameters to specify an area on a real, space captured as the partial area 281 in a three-dimensional viewing range corresponding to the partial area 281, that is, at the capturing timing, from the partial area 281 that occupies the surrounding image 31.

Further, as the search range, the area where the robot 22 can move is adopted among the viewing range.

The control unit 66 controls lite driving unit 67 to drive the portions corresponding to the hands or feet of the robot 22 and perform the operation for searching the target in the calculated search range.

Further, for example, when the robot recognition information includes the partial image 35 as shown in FIG. 44B, the control unit 42 of the instructing device 21 displays the partial image 35 on the display screen 21a based on the robot recognition information.

in this case, foe user may manipulate the manipulating unit 41 of the instructing device 21 to perform the area specifying operation specifying the partial area 282 on the partial image 35 so as to detect the object "apple juice" on the partial image 35 displayed cm the display screen 21a.

As a result, the robot 22 performs the operation of searching the target within the search range corresponding to the partial area 282 on the partial image 35. Therefore, the robot 22 may detect the object "apple juice".

Figure 45:
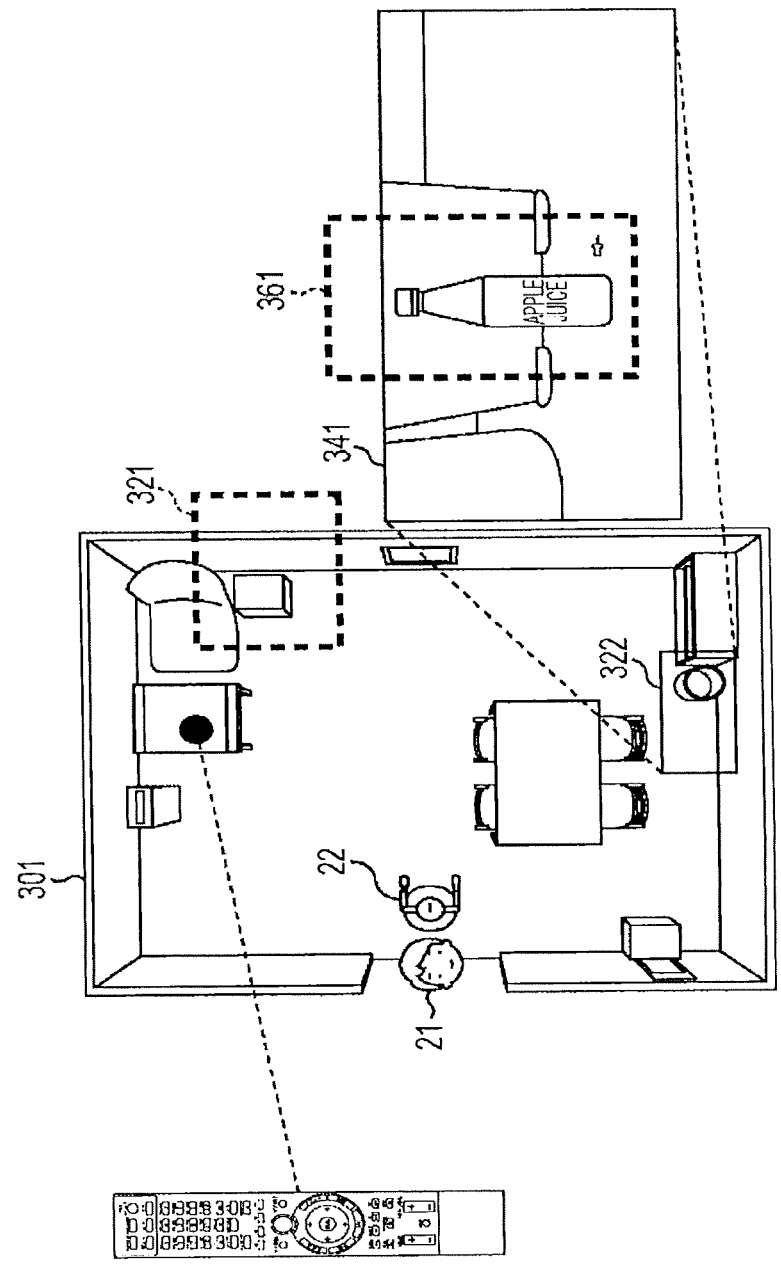
FIG. 45 is a view illustrating an example where a searching range is specified using an indoor space diagram.
Figure 46:
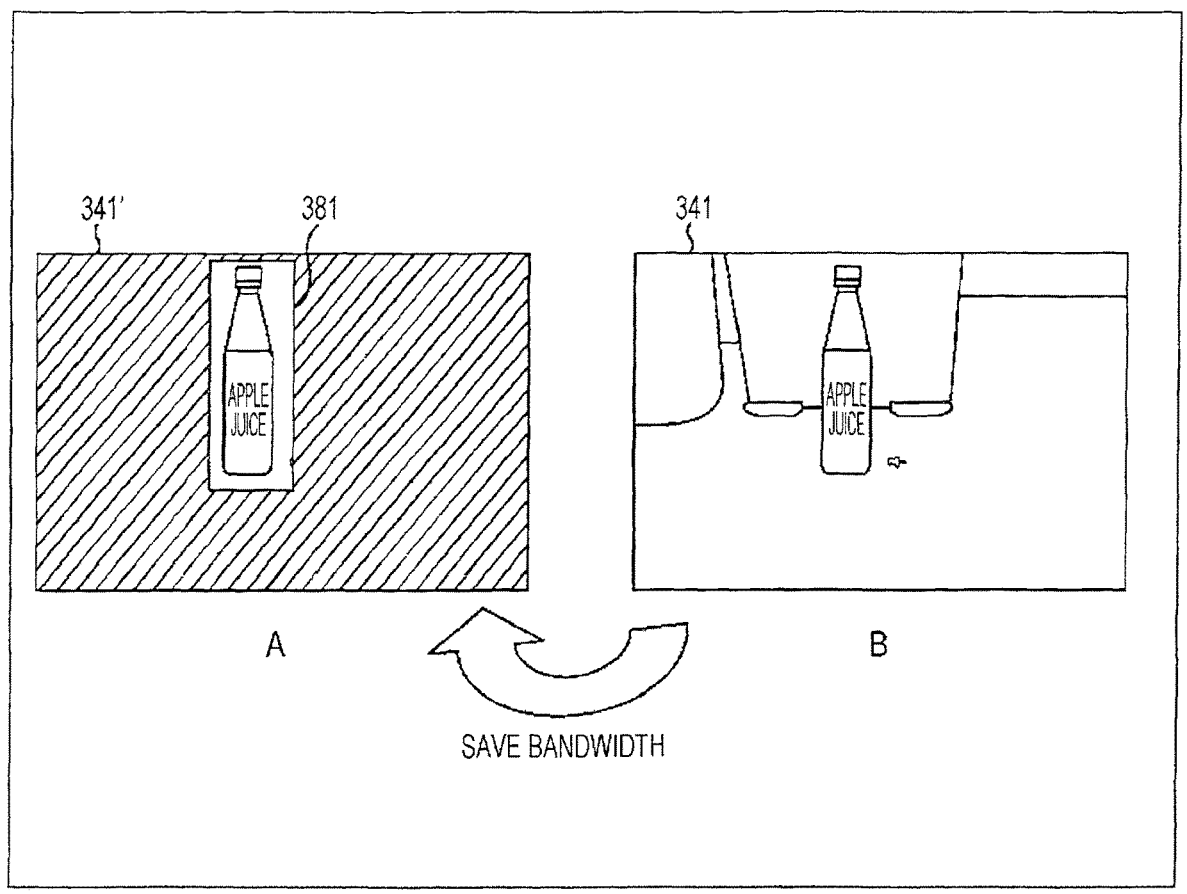
FIG. 46 is a view illustrating an example where an amount of data of a captured image transmitted from a robot to an instructing device is reduced.

Further, as the partial image 35, for example, a captured image obtained when the sires specified by the area specifying operation of the user is captured in a nearer range or a partial image of the captured image obtained by capturing in the past may be adopted, Next, FIG. 45 illustrates an: example where the search range is specified using the space diagram of the room.

For example, when the robot recognition information includes a space image 301 as shown in FIG. 45 (image indicating a space diagram of the room), the control unit 42 of the instructing device 21 displays the space image 301 on the display screen 21a based on the robot recognition information. Further, if the storage unit 45 is configured so as to store the space image 301 in advance, the control unit 42 reads the space image 301 from the storage unit 45 and displays the image on the display screen 21a.

In this case, the user may manipulate the manipulating unit 41 of the instructing device 21 to perform the area specifying operation specifying a partial area 321 on the space image 301 displayed on the display screen 21a as the search range.

As a result, the manipulating unit 41 supplies she corresponding manipulating signal to the control unit 42 in accordance with the area specifying operation of the user.

The control unit 42 creates the specified range information indicating the partial area 321 specified by the area, specifying operation of the user among all the areas on the space image 301 in accordance with the manipulating signal from the manipulating unit 41 and supplies the information to the communicating unit 44. The communicating unit 44 transmits the specified range information from the control unit 42 to the robot 22. Further, the specified range information may be used as specific information to specify (figure out) the search range for the robot 22 to search the target.

In contrast, the communicating unit 61 of the robot 22 receives the specified range information from the communicating unit 44 of the instructing device 21 and supplies the information to the control unit 66. The control unit 66 detects the partial area 321 on the space image 301 stored in the storage unit 68 based on the specified range information from the communicating unit 61.

Then, the control unit 66 reads a plurality of three-dimensional positions that, are associated with sub areas configuring the partial area 321 from the storage unit 68 and calculates the search range based on the plurality of read three-dimensional positions.

The control unit 66 controls the driving unit 67 to drive the portions corresponding to hands or feet of the robot 22 to perform an operation for searching a target within the calculated search range. Further, the control unit 66 performs an operation for searching an object belonging to the category indicated by the category information included in the instruction information as a target within the search range based on the instruction information from the communicating unit 61. Further, for example, when the control unit 66 does not receive the instruction information through the communicating unit 61 from the instructing device 21 the control unit 66 allows the robot to autonomously determine the target to perform the operation of searching within the search range.

As a result the robot 22 performs the operation of searching a target within the search range corresponding to the partial area 321 on the space image 301.

Further, if the space image 301 is displayed on the display screen 21 at when the user uses the manipulating unit 41, for example, to select a partial area 322 among all the areas on the space image 301, a captured image 341 obtained by capturing in the partial area 322 may be displayed on the display screen 21a.

That is, for example, in the instructing device 21, the control unit 42 supplies the robot recognition information that is transmitted through the communicating unit 44 from the robot 22 to the storage unit 45 to be stored therein.

Accordingly, the captured image 341 is stored in the storage unit 45 so as to be associated with the partial area 322 on the space image 301 together with the space image 301 as shown in FIG. 45.

Therefore, when the user selects the partial area 322, the control unit 42 reads the captured image 341 corresponding to the partial area 322 selected by the user from the storage unit 45 and displays the image on the display screen 21a as shown in FIG. 45.

Then, the user may use the manipulating unit 41 to perform the area specifying operation for specifying a partial area 361 on the captured image 341 with respect to the captured image 341 displayed on the display screen 21a in the same manner as shown in FIG. 44B.

As a result, the robot 22 performs an operation for searching the target within the search range corresponding to the partial area 361 on the captured image 341.

Further, the captured image 341 is transmitted from the robot 22 to the instructing device 21 in a state included in the robot recognition information.

However, the amount of data for the robot recognition information transmitted from the robot 22 to the instructing device 21 is preferably small in order to avoid the convergence of data in the wireless communication or the like.

Accordingly, for example, when the robot 22 transmits the captured image 341 to be included in the robot recognition information, a low quality captured image 341, as shown in FIG. 46A which is obtained by reducing the amount of the data of the high quality captured image 341 shown in FIG. 46B may be transmitted. Further, the captured image 341', is not used for specifying the area by the user, but used, for example, when the object image of the object "apple juice" is displayed on the display screen 21a. In addition, preferably, the captured image used for specifying the area by the user is transmitted as a high quality image as it is and displayed on the display screen 21a.

Since among all the areas on the captured image 341' an area 381 where the object (PET bottle of "apple juice") is captured is used as the object image, the captured image 341' becomes a high quality image and other area than the captured image 341' (a portion indicated by hatched lines) becomes a low quality image.

That is, for example, the partial area 381 becomes a high resolution area or a color area and other area than the partial area 381 becomes a low resolution area or monochrome area.

[Regarding Area Specifying Processing Performed By Instructing Device 21]

Figure 47:
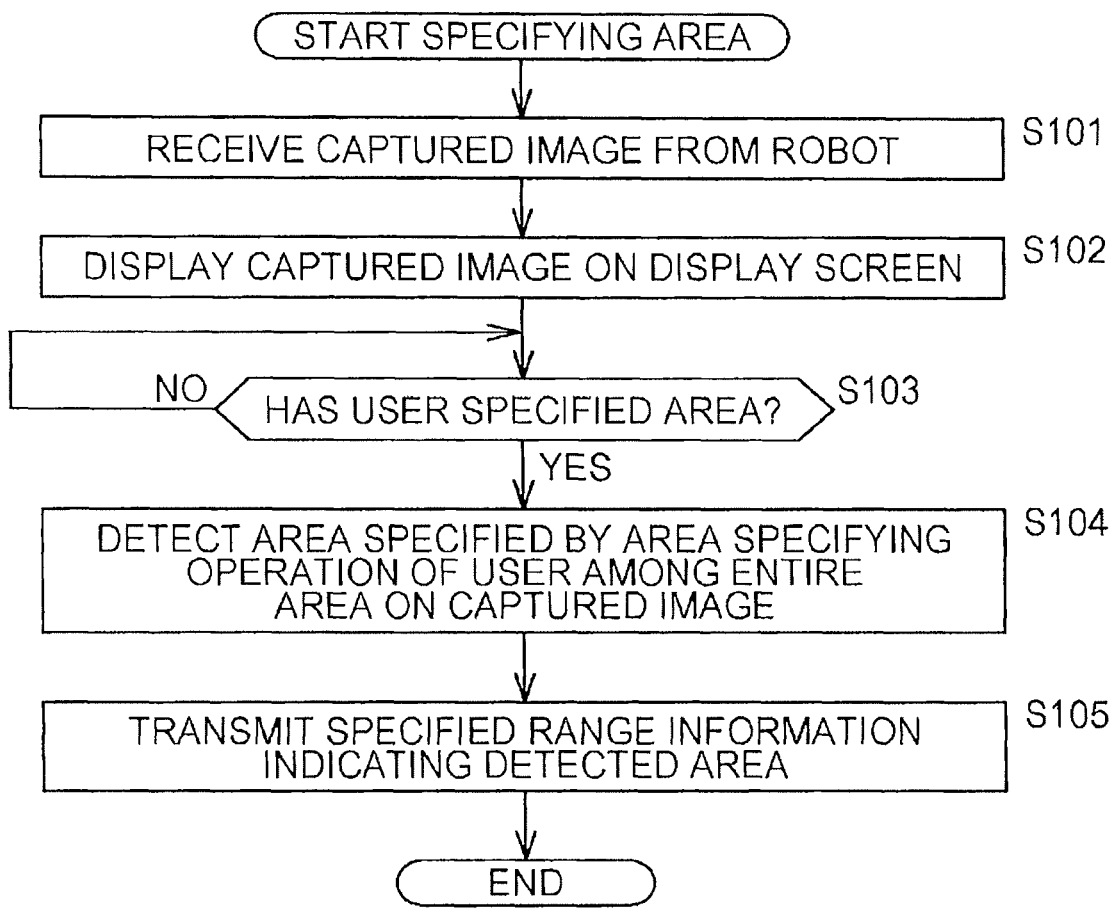
FIG. 47 is a flowchart for explaining area specification processing earned out by an instructing device.

Next, referring to the flowchart of FIG. 47, the area specifying processing performed by the instructing device 21 wilt be described.

In step S101, the communicating unit 44 receives the robot recognition information from the robot 22 and supplies the information to the control unit 42. Further, the robot recognition information, for example, includes the surrounding image 31 as the captured image.

In step S102, the control unit 42 supply the surrounding image 31 included in the robot recognition information from the communicating unit 44 to the display unit 43 to be displayed on the display screen 21a of the display unit 43.

In step S103, the control unit 42 judges whether the area specifying operation has been performed by the user in accordance with whether the manipulating signal corresponding to the area specifying operation of the user has been supplied from the manipulating with 41. Further, the area specifying operation, for example, refers to an operation that specifies a predetermined partial sires 281 among all the areas on the surrounding image 31 displayed on the display screen 21a.

In step S103, the control unit 42 repeals the processing of step S103 until it is judged that the area specifying operation of the user has been performed in accordance with the manipulating signal from the manipulating unit 41.

In step S103, when it is judged that the area specifying operation of the user has been performed, the control unit 42 causes the processing to proceed to step S104. In this ease, a manipulating signal corresponding to the area specifying operation of the user is supplied from the manipulating unit 41 to the control unit 42.

In step S104, the control unit 42 creates the specified range information indicating the partial area 281 on the surrounding image 31 specified by the area specifying operation in accordance wish fee manipulating signal from the manipulating unit 41 and supplies the information to (be communicating unit 44. Further the specified range information is used as specific information to specify (FIG. out) the search range for the robot 22 to search the target In step S105, the communicating unit 44 supplies the specified range information from the control unit 42 to the robot 22 using the wireless communication or the like and allows the robot 22 to search within the search range. By doing as described above, the area specifying processing ends.

As described above, according to the area specifying processing, the search range in which the robot 22 searches the target may be specified by the area specifying operation by the user. Therefore, for example, it is possible to allow the robot 22 to search a target within a range desired by a user.

Specifically, for example, by specifying a range including at least an object that is not detected by the robot 22 as a search range by the area specifying operation by the user. It is possible to allow the robot 22 to search the undetected object.

[Regarding Search Processing Performed By Robot 22]

Figure 48:
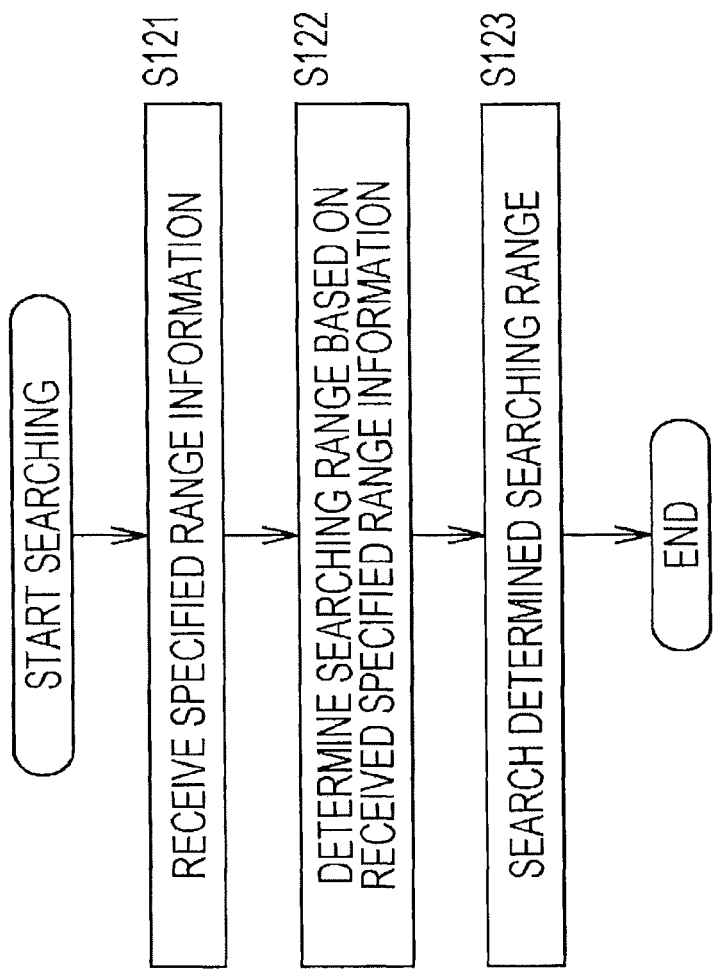
FIG. 48 is a flowchart for explaining search processing carried out by a robot.

Next, referring to the flowchart of FIG. 48, the search processing performed by the robot 22 will be described.

in step S121, the communicating unit 61 receives the specified range information from the communicating unit 44 of the instructing device 21 and supplies the information to the control unit 66. Step S121 may be performed along with steps S122 and S123 which will be described below. That is, for example, the communicating unit 61 may receive the specified range Information from the communicating unit 44 of the instructing device 21 while performing the processing of steps S122 or S122.

In step S122, the control unit 66 detects the partial area 281 on the surrounding linage 31 stored in the storage unit 68 based on the specified range information, from the communicating unit 61.

Then, the control unit 66 reads a plurality of three-dimensional positions associated with the sub areas configuring the partial area 281 from the storage unit 68 and calculates (specifies) the search range based on the plurality of read three-dimensional positions.

In step S123, the control unit 66 drives the driving unit 67 so that the robot 22 can search the target in the calculated search range. Further, the control unit 66, for example, makes the object belonging to the category indicated by the category information included in the instruction information as a target based on the instruction information from the communicating unit 61. By doing as described above, the search processing ends.

As described above, in the search processing, the target is searched within the search range specified by the area specifying operation of the user.

Therefore, for example, when a range including at least an object that is not detected by the robot 22 is specified as a search range by the area specifying operation by the user, the robot 22 may detect the undetected object.

Further, the search range is specified by not the object itself, but the area specifying operation of the user because it is difficult to designate the object that is not detected by the robot 22.

Therefore, the user may allow the robot 22 to search the specified search range to detect the undetected object by specifying the search range including the object that is not detected by the robot 22.

Further, in step S103 of the area specifying processing, for example, the user specifies a predetermined partial area 281 among all the areas on the surrounding image 31 displayed on the display screen 21a to specify the search range. However, the method of specifying the search range is not limited thereto.

That is, for example, when the instructing device 21 may recognize a gesture or a posture of a user (hereinafter, referred to as gesture and the like) from the captured image obtained by capturing the user, the user may specify the search range by the gesture and the like.

Further, for example, if the instructing device 21 may recognize a voice, the user may specify the search range by the voice. In this case, for example, the user may specify the search range by speaking "kitchen" or "my room." as the search range.

In this case, for example, the user may designate (instruct) a category of the object to be a target by the voice, the gesture and the like. As a result, in the instructing device 21, instruction information including category information indicating a category designated by the user is created.

In addition, for example, when the robot 22 may recognize the gesture and the like from the captured image obtained by capturing the user, the user may directly specify the search range with respect to the robot 22 by the gesture and the like.

In this case, for example, the control unit 66 recognizes the gesture of the user based on the captured image front the camera 62 and obtains (creates) the recognition result as specific information used for specifying the search range. Then, the control unit 66 uses the obtained specific information to specify the search range and controls the driving unit 67 to allow the robot 22 to search a target in the specified search range.

Further, for example, when the robot 22 may recognize a voice, the user may directly specify the search range with respect to the robot 22 by the voice.

In this case, for example, foe control unit 66 recognizes the voice of the user based on the voice of the user input from the microphone 64 and obtains (creates) the recognition result as the specific information. Then, the control unit 66 uses the obtained specific information to specify the search range and controls the driving unit 67 to allow the robot 22 to search a target in the specified search range.

In this case, additionally, for example, the user may designate (instructs) the category of the object to be a target directly with respect to tire robot 22 by the voice, the gesture and the like.

As a result, in the control unit 66, instruction information including category information indicating the category specified by the user is created and the robot 22 searches the object belonging to the category indicated by the category information included in the created instruction information as a target.

As the instructing device 21, for example, a personal computer may be used.

Further, the technology may have the following configuration.

(1) A control system for an autonomous robot, comprising:

an interface that receives recognition information from the autonomous robot, said recognition information including candidate target objects to interact with the autonomous robot; and a display control unit that causes a display image to be displayed on a display of candidate target objects, wherein (1) the candidate target objects is displayed with an associated indication of a target object score.

(2) The control system of (1), wherein the display image includes an overhead space diagram of a room that includes a location of the autonomous robot and respective locations of the candidate target objects.

(3) The control system of (1), further comprising: the autonomous robot, wherein the autonomous robot includes in the recognition information the candidate target objects based on distance to the respective candidate target objects.

(4) The control system of (1), further comprising the autonomous robot, wherein the autonomous robot includes in the recognition information a score for respective of the candidate target objects.

(5) The control system of (4), wherein the autonomous robot includes in the recognition information object images of the candidate target images arranged in order of score.

(6) The control system of (2), further comprising: the autonomous robot, wherein the autonomous robot includes in the recognition information space Information regarding a space diagram of the room, and object images of the candidate target objects.

(7) The control system of (1), further comprising:
a control unit that receives user input and generates a command to the autonomous robot that provides user feedback to the autonomous robot regarding user selection of one or more of the candidate target objects.

(8) The control system of (7), further comprising: the autonomous robot, wherein the autonomous robot is configured to identify non-target objects.

(9) The control system of (7), further comprising: the autonomous robot, wherein the autonomous robot is configured to identify a default selection of one or more of the candidate target objects.

(10) The control system of (1), further comprising: at least one of a tablet computer and a smartphone that includes said interface and display control unit.

(11) The control system of (1), further comprising: a scoring mechanism that identifies respective scores for said candidate target objects.

(12) The control system of (1), wherein the interface is configured to receive as input a category of a target object, and transmit an indication, of said category of target object to the autonomous robot and
the autonomous robot configured to identity within the scene one or more target objects in said category.

(13) The control system of (1), further comprising: the autonomous robot wherein the autonomous robot assigns degree information for candidate target objects, the degree information being an indication of a likelihood of correct detection of respective target objects in said category.

(14) The control system of (1), wherein the interface is configured to receive voice or gesture input commands.

(15) The control system of (11), further comprising: a display that displays candidate target objects identified by the autonomous robot and user feedback sent, via said communications interface to assist in controlling said autonomous robot.

(16) A control method for an autonomous robot, comprising: receiving through an interlace recognition information from the autonomous robot, said recognition information including candidate target objects to interact with the autonomous robot; and
displaying a display image on a display of candidate target objects, wherein at feast two of the candidate target objects are displayed with an associated indication of a target object score.

(17) The method of (16), wherein the displaying includes displaying an overhead space diagram of a room that includes a location of the autonomous robot and respective locations of the candidate target objects.

(18) The method of (16), further comprising: receiving user input and generating a command to the autonomous robot that provides user feedback to the autonomous robot regarding user selection of one or more of the candidate target objects.

(19) The method of (16), further comprising receiving voice or gesture input commands.

(20) A non-transitory computer readable storage medium having instructions stored therein that when executed by a processing circuit execute a control method for an autonomous robot, comprising:
receiving through an interlace recognition Information from the autonomous robot said recognition information including candidate target objects to interact with the autonomous robot and
displaying a display image on a display of candidate target objects, wherein at least two of the candidate target objects are displayed with an associated indication of a target object score.

Note that a series of processing described above may be executed by hardware or software. If the series of processing is executed by the software, the program configuring the software may be installed in a computer embedded in the dedicated hardware or a general purpose computer that may execute various functions by installing various programs from a program recording medium. With regard to a processor used for executing programs, the processor circuitry may be one or more processors (including CPUs, ASICs, PAL's, etc) working together or separately.

[Configuration Example of Computer]

FIG. 49 is a block diagram illustrating a configuration example of hardware of a computer that executes the above-mentioned series of processing by a program.

A CPU (central processing unit) 501 executes various processing in accordance with programs stored in a ROM (read only memory) 502 or a storage unit 508. A program or data that is executed by the CPU 501 is appropriately stored in a RAM (random: access memory) 503. The CPU 501, the ROM 502, and the RAM 503 are connected to each other by a bus 504.

An input/output interface 505 is connected to the CPU 501 through the bus 504. An input unit 506 including a keyboard, a mouse, and a microphone and an output unit 507 including a display and a speaker are connected to the input/output interface 505. The CPU 501 executes various processing in accordance with the commands input from the input unit 506. Thereafter, the CPU 501 outputs the processing result to the output unit 507.

The storage unit 508 connected to the input-output interface 505 includes, for example, a hard disk and stores a program or various data to be executed by the CPU 501. A communicating unit 509 communicates with external devices through a network such as the Internet or a local area network.

Further, the program may be obtained through the communicating unit 509 and then stored in the storage unit 508.

When a removable medium 511 such as a magnetic disk, an optical disk, a magnetic optical disk or a semiconductor memory is installed, a drive 510 that is connected to the input/output interface 505 drives the removable medium and obtains the program or data, recorded therein. The obtained program or data are transmitted to and stored in the storage unit 508 if necessary.

The recording medium that records (stores) a program, that is installed in the computer and is in an executable state by the computer; as shown in FIG. 49, may include the removable medium 511 which is a package medium including a magnetic disk (including a flexible disk), an optical disk (including a CD-ROM (compact disc-react only memory), and DVD (digital versatile disc)), a magnetic optical disk (including MD (mini-disc)) or a semiconductor memory, the ROM 502 that temporally or permanently stores the program or a hard disk that configures the storage unit 508. If necessary, the program may be recorded in the recording medium through the communicating unit 599 which is an interface such as a router or a modem using a wired or wireless communicating medium such as a local area network, the Internet, or digital satellite broadcasting.

Further, in the present specification, the step that disclose the above-mentioned series of processing may be performed sequentially in accordance with the described order. However, the steps may not be performed sequentially, but may be performed in parallel or individually.

In addition, in the present specification, the system refers to a whole apparatus including a plurality of devices.

Furthermore, the present disclosure is not limited to the first to third embodiments, but various modifications are available without departing from the scope of the present disclosure.

REFERENCE SIGNS LIST

1 Robot control system
21 Instructing device
21a Display screen
22 Robot
41 Manipulating unit
42 Control unit
43 Display unit
44 Communicating unit
45 Storage unit
61 Communicating unit
62 Camera
63 Distance sensor
64 Microphone
65 Speaker
66 Control unit
67 Driving unit
68 Storage unit

The invention claimed is:

1. A movable apparatus comprising:
driving circuitry that controllable drives a movement of the movable apparatus;
a camera configured to capture a captured image and produce image data; and
circuitry configured to
generate current location information of the movable apparatus to a target position based on a GPS,
transmit to an instructing device the current location information of the movable apparatus, the image data, and object information regarding a candidate target object detected by the movable apparatus in the image, the instructing device displaying a map indicating a planned travel route of the movable apparatus, the current location along the planned travel route of the movable apparatus based on the current location information and an indicator that indicates a target object in the display,
receive from the instructing device feedback information that indicates the candidate target object is correctly identified as the target object in the captured image based on the object information, the feedback information relating to detected user gesture information that is received to control an operation of the movable apparatus, the indicator being displayed based on the feedback information, and
control the movement of the movable apparatus based on the feedback information.

2. The movable apparatus according to claim 1, wherein the feedback information is generated based on a command input indicating a selection of the target object.

3. The movable apparatus according to claim 1, wherein the driving circuitry controls the movable apparatus to move towards the target object.

4. The movable apparatus according to claim 1, wherein the circuitry is further configured to:
obtain image data of an image captured by the camera continuously, the image including the target object recognized based on the feedback information.

5. The movable apparatus according to claim 4, wherein the circuitry is further configured to:
transmit the image data of the image including the target object.

6. The movable apparatus according to claim 1, wherein the circuitry is further configured to:
control the driving circuitry of the movable apparatus to move the movable apparatus.

7. The movable apparatus according to claim 1, wherein the circuitry is further configured to:
control a moving range of the movable apparatus based on at least the current location information.

8. The movable apparatus according to claim 1, wherein the circuitry is further configured to:
control a moving range of the movable apparatus based on at least the feedback information.

9. The movable apparatus according to claim 8, wherein the movable apparatus is controlled based on the moving range of the movable apparatus.

10. The movable apparatus according to claim 1, wherein the circuitry is further configured to:
obtain a distance from the movable apparatus to the target object by a distance sensor of the movable apparatus.

11. The movable apparatus according to claim 10, wherein the circuitry is further configured to:
calculate location information of the target object based on the current location information of the movable apparatus and the distance.

12. The movable apparatus according to claim 1, wherein the movable apparatus is controlled based on location information of the target object.

13. A method for operating a movable apparatus comprising:
controllably driving a movement of a movable apparatus;
capturing with a camera a captured image and producing image data;
generating GPS information as current location information of the movable apparatus;
transmitting to an instructing device the current location information of the movable apparatus and the image data, and object information regarding a candidate target object detected by the movable apparatus in the image, the instructing device displaying a map indicating a planned travel route of the movable apparatus, the current location along the planned travel route of the movable apparatus based on the current location information and an indicator that indicates a target object in the display;

receiving from the instructing device feedback information that indicates the candidate target object is correctly identified as the target object in the captured image based on the object information, the feedback information relating to detected user gesture information that is received to control an operation of the movable apparatus, the indicator being displayed based on the feedback information; and controlling the movement of the movable apparatus and an operation of the camera based on the feedback information.

14. The method according to claim 13, wherein the movable apparatus is controlled to move towards the target object.

15. The method according to claim 13, further comprising:
obtaining image data of an image captured by the camera continuously, the image including the target object recognized based on the feedback information.

16. The method according to claim 15, further comprising:
transmitting the image data of the image including the target object.

17. The method according to claim 13, further comprising:
controlling driving circuitry of the movable apparatus to move the movable apparatus.

18. The method according to claim 13, further comprising:
controlling a moving range of the movable apparatus based on at least the current location information.

19. The method according to claim 13, further comprising:
controlling a moving range of the movable apparatus based on at least the feedback information.

20. The method according to claim 19, wherein the movable apparatus is controlled based on the moving range of the movable apparatus.

21. The method according to claim 13, further comprising:
obtaining a distance from the movable apparatus to the target object by a distance sensor of the movable apparatus.

22. The method according to claim 21, further comprising:
calculating location information of the target object based on the current location information of the movable apparatus and the distance.

23. The method according to claim 13, wherein the movable apparatus is controlled based on location information of the target object.

24. A non-transitory computer readable medium having a computer program recorded thereon, the computer program configured to perform a method when executed on a computer, the method comprising:
controllably driving a movement of a movable apparatus;
capturing with a camera a captured image and producing image data;
generating GPS information as current location information of the movable apparatus;
transmitting to an instructing device the current location information of the movable apparatus and the image data, and object information regarding a candidate target object detected by the movable apparatus in the image, the instructing device displaying a map indicating a planned travel route of the movable apparatus, the current location along the planned travel route of the movable apparatus based on the current location information and an indicator that indicates a target object in the display;

receiving from the instructing device feedback information that indicates the candidate target object is correctly identified as the target object in the captured image based on the object information, the feedback information relating to detected user gesture information that is received to control an operation of the movable apparatus, the indicator being displayed based on the feedback information; and controlling the movement of the movable apparatus and an operation of the camera based on the feedback information.

25. The non-transitory computer readable medium according to claim 24, wherein the movable apparatus is controlled to move towards the target object.

26. The non-transitory computer readable medium according to claim 24, further comprising:
controlling a moving range of the movable apparatus based on at least the current location information.

27. The non-transitory computer readable medium according to claim 24, further comprising:
controlling a moving range of the movable apparatus based on at least the feedback information.

28. The non-transitory computer readable medium according to claim 24, wherein the movable apparatus is controlled based on the moving range of the movable apparatus.

29. The non-transitory computer readable medium according to claim 24, further comprising:
calculating location information of the target object based on the current location information of the movable apparatus and a distance from the movable apparatus to the target object, and
wherein the movable apparatus is controlled based on the location information of the target object.

30. A method for operating an instructing device and a movable apparatus comprising:
generating a control signal for controlling the movable apparatus, the movable apparatus including a camera configured to controllable capture an image;
obtaining image data of the image captured by the camera;
generating current location information of the movable to a target position based on GPS;
transmitting the image data, the current location information of the movable apparatus, and object information regarding a candidate target object detected by the movable apparatus in the image, to the instructing device;
controlling reception of current location information of the movable apparatus to a target position, reception of the image data of the captured image from the movable apparatus, and reception of object information regarding a candidate target object detected by the movable apparatus in the image;
controlling a display to display a map indicating the planned travel route of the movable apparatus and the current location along the planned travel route of the movable apparatus based on the current location information;
generating feedback information to indicate the candidate target object is correctly identified as a target object in the image based on the object information, the feedback information relating to detected user gesture information that is received to control an operation of the movable apparatus;

controlling the display to display an indicator to indicate the target object in the display; and receiving the feedback information generated by the instruction device to recognize a target object in the captured image, the indicator being displayed based on the feedback information; and controlling the movable apparatus to move based on the feedback information and the current location information.

* * * * *